(12) United States Patent
McKibben et al.

(10) Patent No.: US 12,325,269 B2
(45) Date of Patent: Jun. 10, 2025

(54) TRAILER HOOKUP BREAKAWAY MITIGATION SYSTEMS AND METHODS

(71) Applicants: Hexagon Purus North America Holdings Inc., Lincoln, NE (US); Agility Fuel Systems LLC, Costa Mesa, CA (US)

(72) Inventors: Ethan J. McKibben, Kelowna (CA); Jordan C. Foster, Kelowna (CA); Chris Forsberg, Kelowna (CA); Andrew Taylor Gordon, Kelowna (CA); Momchil Yordanov, Kelowna (CA); Adam Attila Bosze, Kelowna (CA); Aaron Heffelfinger, Kelowna (CA)

(73) Assignees: Hexagon Purus North America Holdings Inc., Lincoln, NE (US); Agility Fuel Systems LLC, Lincoln, NE (US)

( * ) Notice: Subject to any disclaimer, the term of this patent is extended or adjusted under 35 U.S.C. 154(b) by 0 days.

(21) Appl. No.: 18/407,960

(22) Filed: Jan. 9, 2024

(65) Prior Publication Data

US 2024/0140154 A1    May 2, 2024

Related U.S. Application Data

(63) Continuation of application No. 18/330,967, filed on Jun. 7, 2023, now Pat. No. 11,919,343, which is a
(Continued)

(51) Int. Cl.
*B60D 1/28* (2006.01)
*B60D 1/62* (2006.01)
(Continued)

(52) U.S. Cl.
CPC .................. *B60D 1/28* (2013.01); *B60D 1/62* (2013.01); *B60L 1/00* (2013.01); *B60L 3/04* (2013.01);
(Continued)

(58) Field of Classification Search
CPC .... B60D 1/28; B60D 1/62; B60L 1/00; B60L 3/04; B60L 2200/28; B60L 2200/36;
(Continued)

(56) References Cited

U.S. PATENT DOCUMENTS 1,551,594 A   9/1925   Maurice
1,678,033 A   7/1928   Brumbaugh
(Continued)

FOREIGN PATENT DOCUMENTS

AU   2018232986   4/2019
CN   2647706   10/2004
(Continued)

OTHER PUBLICATIONS

Kenworth, "K270E, Zero Emissions", 2020, in 2 pages.
(Continued)

*Primary Examiner* — Anne Marie M Boehler
*Assistant Examiner* — Marlon A Arce
(74) *Attorney, Agent, or Firm* — Knobbe, Marten, Olson & Bear, LLP

(57) ABSTRACT

A breakaway mitigation system is provided for addressing breakaway between a tractor and a trailer unit of a truck. The breakaway mitigation system can include a spool assembly, a sensor, and a controller. The spool assembly has a spool body configured to deploy a length of a tether coupled with the spool body and configured to couple with an energy source supply conduit and to retract the length of the tether. The energy source supply conduit is configured to convey a source of energy for use by a motor or by a fuel cell. The
(Continued)

sensor is configured to detect the length of the tether that has been deployed. The controller is configured to receive an input corresponding to the detected length and to implement a countermeasure when the detected amount exceeds a threshold value. Mitigation can be provided by a coupler that decouples under a load over a threshold.

28 Claims, 35 Drawing Sheets

Related U.S. Application Data continuation of application No. PCT/US2021/062856, filed on Dec. 10, 2021.

(60) Provisional application No. 63/124,587, filed on Dec. 11, 2020.

(51) Int. Cl.
 *B60L 1/00* (2006.01)
 *B60L 3/04* (2006.01)

(52) U.S. Cl.
 CPC ....... *B60L 2200/28* (2013.01); *B60L 2200/36* (2013.01); *B60L 2250/10* (2013.01)

(58) Field of Classification Search
 CPC .. B60L 2250/10; B60L 15/2009; B60L 50/66; B60L 50/75; B60L 50/62; B60L 7/08; B60T 7/18; B60T 7/20; Y02T 10/72
 See application file for complete search history.

(56) References Cited

U.S. PATENT DOCUMENTS

| | | | |
|---|---|---|---|
| 3,760,134 A | 9/1973 | McCray | |
| 3,883,794 A | 3/1975 | Sivley | |
| 4,248,323 A | 2/1981 | Gaffney | |
| 4,317,497 A | 3/1982 | Alt et al. | |
| 4,365,681 A | 12/1982 | Singh | |
| 4,435,990 A | 3/1984 | Chalmers | |
| 5,421,600 A | 6/1995 | Jones et al. | |
| 5,460,234 A | 10/1995 | Matsuura et al. | |
| 5,558,949 A | 9/1996 | Iwatsuki et al. | |
| 5,585,205 A | 12/1996 | Kohchi | |
| 5,854,517 A | 12/1998 | Hines | |
| 6,148,928 A | 11/2000 | Spears | |
| 6,188,574 B1 | 2/2001 | Anazawa | |
| 6,443,253 B1 | 9/2002 | Whitehead et al. | |
| 6,547,020 B2 | 4/2003 | Maus et al. | |
| 6,575,258 B1 | 6/2003 | Clemmer | |
| 6,624,610 B1 | 9/2003 | Ono et al. | |
| 6,668,957 B2 | 12/2003 | King | |
| 6,926,027 B1 * | 8/2005 | Sorensen | B65H 75/425 137/355.23 |
| 6,971,657 B2 | 12/2005 | King et al. | |
| 7,051,825 B2 | 5/2006 | Masui et al. | |
| 7,144,039 B2 | 12/2006 | Kawasaki et al. | |
| 7,174,967 B2 | 2/2007 | Raimondo et al. | |
| 7,237,644 B2 | 7/2007 | Matsumoto et al. | |
| 7,398,849 B2 | 7/2008 | Yoshida | |
| 7,507,499 B2 | 3/2009 | Zhou et al. | |
| 7,543,454 B2 | 6/2009 | Harris | |
| 7,686,720 B2 | 3/2010 | Nikolai | |
| 7,854,443 B2 * | 12/2010 | Alguera | B60D 1/62 280/421 |
| 7,931,105 B2 | 4/2011 | Sato et al. | |
| 8,037,960 B2 | 10/2011 | Kiya | |
| 8,051,934 B2 | 11/2011 | Kiya et al. | |
| 8,096,708 B2 | 1/2012 | Harrington | |
| 8,122,989 B2 | 2/2012 | Burchett | |
| 8,127,876 B2 | 3/2012 | Phillips | |
| 8,276,697 B2 | 10/2012 | Takasaki | |
| 8,342,279 B1 | 1/2013 | Florus et al. | |
| 8,397,853 B2 | 3/2013 | Stefani et al. | |
| 8,464,817 B2 | 6/2013 | Usami et al. | |
| 8,474,559 B2 | 7/2013 | Sogabe | |
| 8,505,950 B2 * | 8/2013 | Kolda | B62D 53/08 280/421 |
| 8,517,126 B2 | 8/2013 | Atarashi | |
| 8,596,685 B2 | 12/2013 | Mauduit et al. | |
| 8,616,319 B2 | 12/2013 | Yokoyama et al. | |
| 8,672,354 B2 | 3/2014 | Kim et al. | |
| 8,701,842 B2 | 4/2014 | Anderson | |
| 8,764,469 B2 | 7/2014 | Lamb | |
| 8,776,927 B2 | 7/2014 | Akazawa et al. | |
| 8,778,527 B2 | 7/2014 | Lee | |
| 8,783,396 B2 | 7/2014 | Bowman | |
| 8,789,635 B2 | 7/2014 | Franzen et al. | |
| 8,794,361 B2 | 8/2014 | Lim et al. | |
| 8,839,901 B1 | 9/2014 | Bradshaw | |
| 8,905,170 B2 | 12/2014 | Kyoden et al. | |
| 9,033,078 B2 | 5/2015 | Fillion et al. | |
| 9,033,085 B1 | 5/2015 | Rawlinson | |
| 9,056,557 B2 | 6/2015 | Kedzierski | |
| 9,061,712 B2 | 6/2015 | Patberg et al. | |
| 9,077,019 B2 | 7/2015 | Kosaki et al. | |
| 9,085,226 B2 | 7/2015 | Matsuda et al. | |
| 9,103,092 B2 | 8/2015 | Ueda | |
| 9,108,497 B2 | 8/2015 | Harrison, III et al. | |
| 9,108,691 B2 | 8/2015 | Fanourakis et al. | |
| 9,205,749 B2 | 12/2015 | Sakamoto | |
| 9,227,582 B2 | 1/2016 | Katayama et al. | |
| 9,283,838 B2 | 3/2016 | Ohashi | |
| 9,315,173 B1 | 4/2016 | Gray et al. | |
| 9,321,352 B2 | 4/2016 | Pierce et al. | |
| 9,409,495 B2 | 8/2016 | Kobayashi | |
| 9,457,652 B2 | 10/2016 | Sloan et al. | |
| 9,586,490 B2 | 3/2017 | Yamamaru et al. | |
| 9,636,984 B1 | 5/2017 | Baccouche et al. | |
| 9,682,618 B2 | 6/2017 | Baik et al. | |
| 9,776,665 B2 | 10/2017 | Garay et al. | |
| 9,812,685 B2 | 11/2017 | Nozaki et al. | |
| 9,879,802 B2 * | 1/2018 | Getts | F16L 3/12 |
| 9,884,545 B1 | 2/2018 | Addanki et al. | |
| 9,884,552 B2 | 2/2018 | Sloan et al. | |
| 9,887,570 B2 | 2/2018 | Johnsen et al. | |
| 9,902,348 B2 | 2/2018 | Takeda | |
| 9,914,355 B2 | 3/2018 | Sloan et al. | |
| 10,000,908 B2 | 6/2018 | Ota et al. | |
| 10,017,037 B2 | 7/2018 | Newman et al. | |
| 10,121,609 B2 | 11/2018 | Coursol | |
| 10,160,344 B2 | 12/2018 | Newman | |
| 10,166,883 B2 | 1/2019 | Brendecke et al. | |
| 10,177,356 B1 | 1/2019 | Yang et al. | |
| 10,183,698 B2 | 1/2019 | Ta et al. | |
| 10,193,112 B2 | 1/2019 | Zimbru, Jr. et al. | |
| 10,199,781 B2 | 2/2019 | Deatherage | |
| 10,201,913 B2 | 2/2019 | McNeilus et al. | |
| 10,236,496 B2 | 3/2019 | Nakayama et al. | |
| 10,245,972 B2 | 4/2019 | Healy et al. | |
| 10,259,329 B2 | 4/2019 | Hosaka et al. | |
| 10,308,132 B2 | 6/2019 | Milton et al. | |
| 10,358,023 B2 | 7/2019 | Hegewald et al. | |
| 10,358,024 B2 | 7/2019 | Yugami et al. | |
| 10,414,351 B2 | 9/2019 | Katano | |
| 10,421,345 B2 | 9/2019 | Kerspe et al. | |
| 10,427,627 B2 | 10/2019 | Fukazu et al. | |
| 10,457,156 B2 | 10/2019 | Takizawa et al. | |
| 10,464,613 B2 | 11/2019 | Okura | |
| 10,486,515 B2 | 11/2019 | Saeki | |
| 10,493,837 B1 | 12/2019 | Angelo et al. | |
| 10,516,146 B2 | 12/2019 | Fees et al. | |
| 10,543,796 B2 | 1/2020 | Isafushi et al. | |
| 10,559,858 B2 | 2/2020 | Goitsuka et al. | |
| 10,569,634 B2 | 2/2020 | Dawley | |
| 10,583,746 B2 | 3/2020 | Ogaki et al. | |
| 10,589,788 B1 | 3/2020 | Milton et al. | |
| 10,589,797 B2 | 3/2020 | Milton et al. | |
| 10,604,188 B2 | 3/2020 | Yoshii | |
| 10,611,408 B2 | 4/2020 | Fritz et al. | |
| 10,641,431 B2 | 5/2020 | Mallick et al. | |

(56) References Cited

U.S. PATENT DOCUMENTS

| | | |
|---|---|---|
| 10,654,530 B2 | 5/2020 | Milton et al. |
| 10,661,680 B2 | 5/2020 | Milton et al. |
| 10,661,844 B2 | 5/2020 | Milton et al. |
| 10,668,807 B2 | 6/2020 | Milton et al. |
| 10,670,191 B2 | 6/2020 | Yeggy |
| 10,688,856 B2 | 6/2020 | Kasai et al. |
| 10,688,857 B2 | 6/2020 | Tsuyuzaki et al. |
| 10,696,155 B2 | 6/2020 | Sloan et al. |
| 10,696,251 B2 | 6/2020 | Muramatsu et al. |
| 10,703,416 B2 | 7/2020 | Okura et al. |
| 10,752,102 B2 | 8/2020 | Lampsa et al. |
| 10,823,333 B2 | 11/2020 | Criel et al. |
| 10,843,677 B1 * | 11/2020 | Paradis ............... F16L 57/005 |
| 10,899,214 B2 | 1/2021 | Sloan et al. |
| 11,040,610 B2 | 6/2021 | Sloan et al. |
| 11,043,707 B2 | 6/2021 | Sloan et al. |
| 11,043,714 B2 | 6/2021 | Sloan et al. |
| 11,046,192 B2 | 6/2021 | Aufdencamp |
| 11,110,786 B2 | 9/2021 | Loacker |
| 11,124,076 B1 | 9/2021 | Borghi |
| 11,155,148 B2 | 10/2021 | Chung et al. |
| 11,312,221 B2 | 4/2022 | Sloan et al. |
| 11,345,331 B2 | 5/2022 | McKibben et al. |
| 11,465,482 B2 | 10/2022 | Menon et al. |
| 11,498,435 B2 | 11/2022 | Herbert et al. |
| 11,652,250 B2 | 5/2023 | Sloan et al. |
| 11,685,268 B2 | 6/2023 | Sjohom |
| 11,712,937 B1 * | 8/2023 | Daugherty ............... B60D 1/62 |
| | | 280/421 |
| 11,718,194 B2 | 8/2023 | Miler |
| 11,772,474 B2 | 10/2023 | Sloan et al. |
| 11,776,335 B1 | 10/2023 | Schubert et al. |
| 11,780,337 B2 | 10/2023 | Sloan et al. |
| 11,904,676 B2 | 2/2024 | Blomstrand |
| 11,919,343 B2 | 3/2024 | McKibben et al. |
| 11,926,207 B2 | 3/2024 | McKibben et al. |
| 11,938,804 B2 | 3/2024 | Andersson |
| 12,070,996 B2 | 8/2024 | Kvalden |
| 12,157,362 B2 | 12/2024 | Sloan et al. |
| 2004/0134699 A1 | 7/2004 | Shimizu |
| 2004/0178602 A1 | 9/2004 | King et al. |
| 2004/0231831 A1 | 11/2004 | Houck et al. |
| 2005/0162015 A1 | 7/2005 | Yamaguchi et al. |
| 2005/0218136 A1 | 10/2005 | Kotani et al. |
| 2006/0102398 A1 | 5/2006 | Mizuno |
| 2007/0092764 A1 | 4/2007 | Kobayashi |
| 2008/0169139 A1 | 7/2008 | Kramer |
| 2008/0169144 A1 | 7/2008 | DeGrave et al. |
| 2008/0225483 A1 | 9/2008 | Kahn et al. |
| 2008/0258682 A1 | 10/2008 | Li |
| 2009/0014224 A1 | 1/2009 | Rydberg |
| 2009/0136844 A1 | 5/2009 | Watanabe et al. |
| 2009/0201650 A1 | 8/2009 | Hauser et al. |
| 2010/0000816 A1 | 1/2010 | Okada |
| 2010/0062329 A1 | 3/2010 | Muis |
| 2010/0065344 A1 | 3/2010 | Collings, III |
| 2010/0112843 A1 | 5/2010 | Heichal et al. |
| 2010/0163326 A1 | 7/2010 | Takamura et al. |
| 2010/0175940 A1 | 7/2010 | Taneda et al. |
| 2010/0320012 A1 | 12/2010 | van der Stappen et al. |
| 2010/0320040 A1 | 12/2010 | Anderson |
| 2011/0068622 A1 | 3/2011 | Ikeno et al. |
| 2011/0114398 A1 | 5/2011 | Bianco |
| 2011/0260530 A1 | 10/2011 | Steffka et al. |
| 2011/0287287 A1 | 11/2011 | Kang |
| 2012/0055725 A1 | 3/2012 | Mizoguchi et al. |
| 2012/0090907 A1 | 4/2012 | Storc et al. |
| 2012/0103714 A1 | 5/2012 | Choi et al. |
| 2012/0160583 A1 | 6/2012 | Rawlinson |
| 2012/0175177 A1 | 7/2012 | Lee et al. |
| 2012/0255799 A1 | 10/2012 | Kohler et al. |
| 2012/0312612 A1 | 12/2012 | Harrison, III et al. |
| 2013/0001384 A1 | 1/2013 | Karlsson et al. |
| 2013/0065099 A1 | 3/2013 | Mishima |
| 2013/0108404 A1 | 5/2013 | Okumura et al. |
| 2013/0108897 A1 | 5/2013 | Christian et al. |
| 2013/0118456 A1 | 5/2013 | Gutscher et al. |
| 2013/0248268 A1 | 9/2013 | Matsuda et al. |
| 2014/0141288 A1 | 5/2014 | Kim et al. |
| 2014/0287284 A1 | 9/2014 | Shibata |
| 2014/0338999 A1 | 11/2014 | Fujii et al. |
| 2014/0367183 A1 | 12/2014 | Matsuda |
| 2015/0194712 A1 | 7/2015 | He et al. |
| 2015/0291056 A1 | 10/2015 | Nozaki |
| 2016/0079795 A1 | 3/2016 | Patterson et al. |
| 2016/0087256 A1 | 3/2016 | Wagner et al. |
| 2016/0190526 A1 | 6/2016 | Yamada et al. |
| 2016/0226041 A1 | 8/2016 | Jackson et al. |
| 2016/0297283 A1 | 10/2016 | Sakamoto et al. |
| 2017/0012506 A1 | 1/2017 | Naito et al. |
| 2017/0225558 A1 | 8/2017 | Newman et al. |
| 2017/0282709 A1 | 10/2017 | Sasaki et al. |
| 2017/0320382 A1 | 11/2017 | Milton et al. |
| 2018/0022389 A1 | 1/2018 | Kageyama et al. |
| 2018/0062125 A1 | 3/2018 | Kaneshige |
| 2018/0145382 A1 | 5/2018 | Harris et al. |
| 2018/0183118 A1 | 6/2018 | Harris et al. |
| 2018/0190960 A1 | 7/2018 | Harris et al. |
| 2018/0201110 A1 | 7/2018 | Yin et al. |
| 2018/0319263 A1 | 11/2018 | Hegewald et al. |
| 2018/0333905 A1 | 11/2018 | Tong et al. |
| 2018/0339594 A1 | 11/2018 | Brown et al. |
| 2018/0370368 A1 | 12/2018 | Kronsteiner et al. |
| 2019/0036181 A1 | 1/2019 | Tokozakura et al. |
| 2019/0061505 A1 | 2/2019 | Cavus et al. |
| 2019/0074495 A1 | 3/2019 | Haeusler et al. |
| 2019/0074497 A1 | 3/2019 | Haeusler et al. |
| 2019/0081298 A1 | 3/2019 | Matecki et al. |
| 2019/0084397 A1 | 3/2019 | Yugami et al. |
| 2019/0181517 A1 | 3/2019 | Kellner et al. |
| 2019/0202312 A1 | 7/2019 | Aufdencamp |
| 2019/0202429 A1 | 7/2019 | Richter et al. |
| 2019/0229314 A1 | 7/2019 | Ribbentrop et al. |
| 2019/0263449 A1 | 8/2019 | Ta et al. |
| 2019/0291560 A1 | 9/2019 | Lampsa et al. |
| 2019/0296541 A1 | 9/2019 | Mensch et al. |
| 2019/0302764 A1 | 10/2019 | Smith et al. |
| 2019/0326573 A1 | 10/2019 | Ozawa et al. |
| 2019/0393571 A1 | 12/2019 | Weicker et al. |
| 2020/0002828 A1 | 1/2020 | Mills et al. |
| 2020/0083573 A1 | 3/2020 | Caliskan et al. |
| 2020/0088299 A1 | 3/2020 | Baumer et al. |
| 2020/0094669 A1 | 3/2020 | DeLizo et al. |
| 2020/0139808 A1 | 5/2020 | Rike |
| 2020/0152938 A1 | 5/2020 | Winger et al. |
| 2020/0156500 A1 | 5/2020 | Huff et al. |
| 2020/0157769 A1 | 5/2020 | Huff et al. |
| 2020/0180848 A1 | 6/2020 | Snyder et al. |
| 2020/0198458 A1 * | 6/2020 | Volkmer ............... F02D 41/22 |
| 2020/0247225 A1 | 8/2020 | Kochi et al. |
| 2020/0259143 A1 | 8/2020 | Sloan et al. |
| 2020/0269642 A1 * | 8/2020 | Algüera ............... B60D 1/64 |
| 2020/0331334 A1 | 10/2020 | Sloan et al. |
| 2020/0331536 A1 | 10/2020 | Sloan et al. |
| 2020/0335840 A1 | 10/2020 | Sloan et al. |
| 2020/0369228 A1 | 11/2020 | Kageyama et al. |
| 2020/0384854 A1 | 12/2020 | Sloan et al. |
| 2020/0406777 A1 | 12/2020 | Nguyen et al. |
| 2021/0036649 A1 | 2/2021 | Iwazaki |
| 2021/0094400 A1 | 4/2021 | Loacker et al. |
| 2021/0129688 A1 * | 5/2021 | Sawada ............... B62D 33/067 |
| 2021/0213821 A1 | 7/2021 | Sloan et al. |
| 2021/0218101 A1 | 7/2021 | Menon et al. |
| 2021/0380001 A1 | 12/2021 | Horder |
| 2022/0021050 A1 | 1/2022 | Sloan et al. |
| 2022/0021056 A1 | 1/2022 | Sloan et al. |
| 2022/0111716 A1 | 4/2022 | McKibben et al. |
| 2022/0242215 A1 | 8/2022 | Sloan et al. |
| 2022/0274494 A1 | 9/2022 | McKibben et al. |
| 2022/0348113 A1 | 11/2022 | Delrieu |
| 2022/0388392 A1 | 12/2022 | Abbott |
| 2023/0001986 A1 | 1/2023 | Hendriks |
| 2023/0066866 A1 * | 3/2023 | Smith ............... B60D 1/36 |
| 2023/0126938 A1 | 4/2023 | Takaguchi et al. |

(56) References Cited

U.S. PATENT DOCUMENTS

| | | |
|---|---|---|
| 2023/0158880 A1 | 5/2023 | Ragot |
| 2023/0311597 A1 | 10/2023 | McKibben et al. |
| 2023/0318084 A1 | 10/2023 | Sloan et al. |
| 2023/0406086 A1 | 12/2023 | Sloan et al. |
| 2023/0415556 A1 | 12/2023 | Wolf |
| 2023/0415587 A1 | 12/2023 | Sloan et al. |
| 2024/0149657 A1 | 5/2024 | Coupal-Sikes et al. |
| 2024/0166040 A1 | 5/2024 | Coupal-Sikes et al. |
| 2024/0166060 A1 | 5/2024 | Tyerman et al. |
| 2024/0166069 A1 | 5/2024 | McKibben et al. |
| 2024/0186614 A1 | 6/2024 | Sloan et al. |
| 2024/0253700 A1 | 8/2024 | Zarpelon |
| 2024/0286480 A1 | 8/2024 | Kumagai |
| 2024/0300324 A1 | 9/2024 | Oko |
| 2024/0416764 A1 | 12/2024 | Sloan et al. |

FOREIGN PATENT DOCUMENTS

| | | | |
|---|---|---|---|
| CN | 103863080 | | 6/2014 |
| CN | 104993151 | | 10/2015 |
| CN | 105438262 | | 3/2016 |
| CN | 107848386 | | 3/2018 |
| CN | 110914585 B | * 3/2020 | .............. F17C 5/007 |
| CN | 217270085 | | 8/2022 |
| DE | 3940843 A1 | | 6/1991 |
| DE | 4132741 A1 | | 4/1993 |
| DE | 101 08 713 A1 | | 9/2002 |
| DE | 10 2006 009 189 | | 7/2007 |
| DE | 10 2011 109 024 | | 1/2013 |
| DE | 10 2012 109062 | | 3/2014 |
| DE | 10 2013 000112 | | 3/2014 |
| DE | 10 2017 005313 | | 12/2018 |
| EP | 1 577 143 | | 9/2005 |
| EP | 2 008 917 | | 12/2008 |
| EP | 2 554 420 | | 5/2014 |
| EP | 2 712 748 | | 5/2017 |
| EP | 2 712 788 | | 2/2020 |
| EP | 3 640 123 | | 4/2020 |
| ES | 1079022 | | 4/2013 |
| GB | 491788 | | 9/1938 |
| GB | 527052 | | 10/1940 |
| GB | 744973 | | 2/1956 |
| GB | 2546535 | | 7/2017 |
| GB | 2555906 | | 5/2018 |
| JP | 2004-142524 | | 5/2004 |
| JP | 2008-265685 | | 11/2008 |
| JP | 2010-100207 | | 5/2010 |
| JP | 2014-069686 | | 4/2014 |
| KR | 10-1998-0035495 | | 8/1998 |
| KR | 10-2017-0000950 | | 1/2017 |
| KR | 10-2549321 | | 6/2023 |
| WO | WO 2008/010045 | | 1/2008 |
| WO | WO 2014/044618 | | 3/2014 |
| WO | WO 2016/086326 | | 6/2016 |
| WO | WO 2016/210329 | | 12/2016 |
| WO | WO 2018/123337 | | 7/2018 |
| WO | WO 2020/041630 | | 2/2020 |
| WO | WO 2020/215018 | | 10/2020 |
| WO | WO 2020/215023 | | 10/2020 |
| WO | WO 2021/108429 | | 6/2021 |
| WO | WO 2022/092994 | | 5/2022 |
| WO | WO 2022/125929 | | 6/2022 |
| WO | WO 2023/027959 | | 3/2023 |
| WO | WO 2023/027960 | | 3/2023 |
| WO | WO 2023/027961 | | 3/2023 |
| WO | WO 2023/027965 | | 3/2023 |
| WO | WO 2024/025711 | | 2/2024 |

OTHER PUBLICATIONS

International Search Report and Written Opinion Issued in PCT Application No. PCT/US2021/062856, dated Apr. 18, 2022, in 12 pages.

Tuma, "How to store lithium ion battery cell pack in electric bus?", dated Jul. 3, 2019, in 7 pages.

Tuma, Sliding Rails for Ebus Lithium Battery Pack Tray Automatic Bus Door Opening Mechanism, dated Aug. 15, 2019, in 3 pages.

* cited by examiner

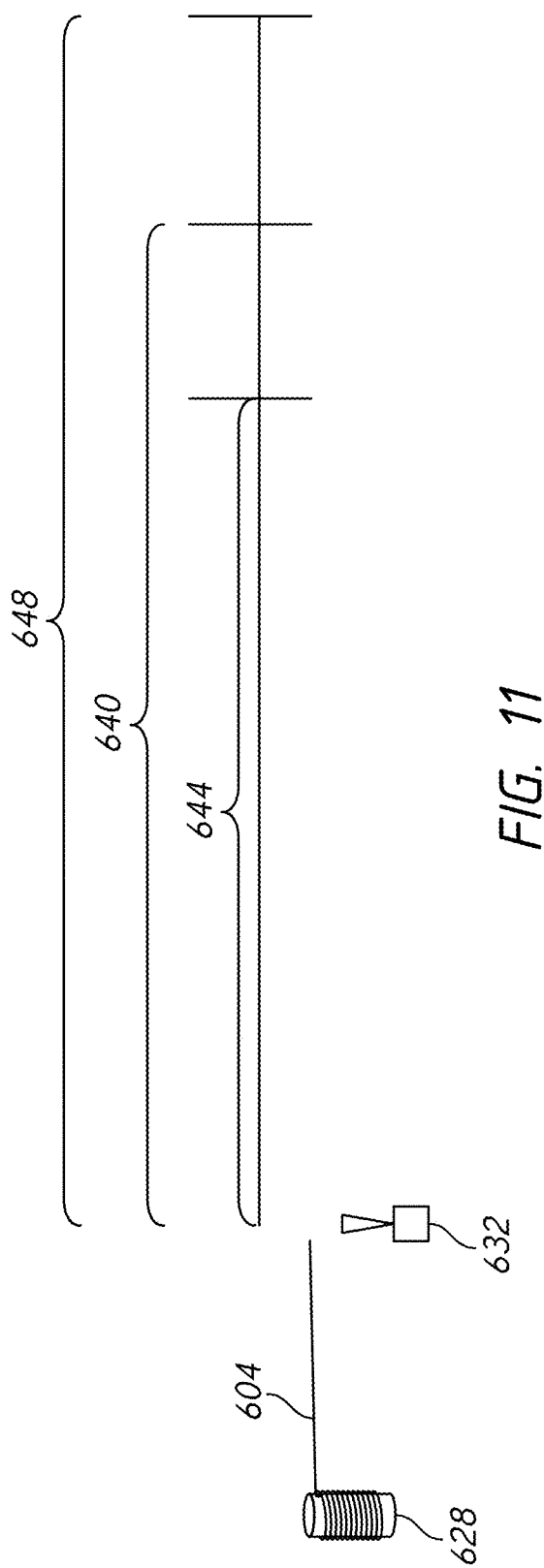

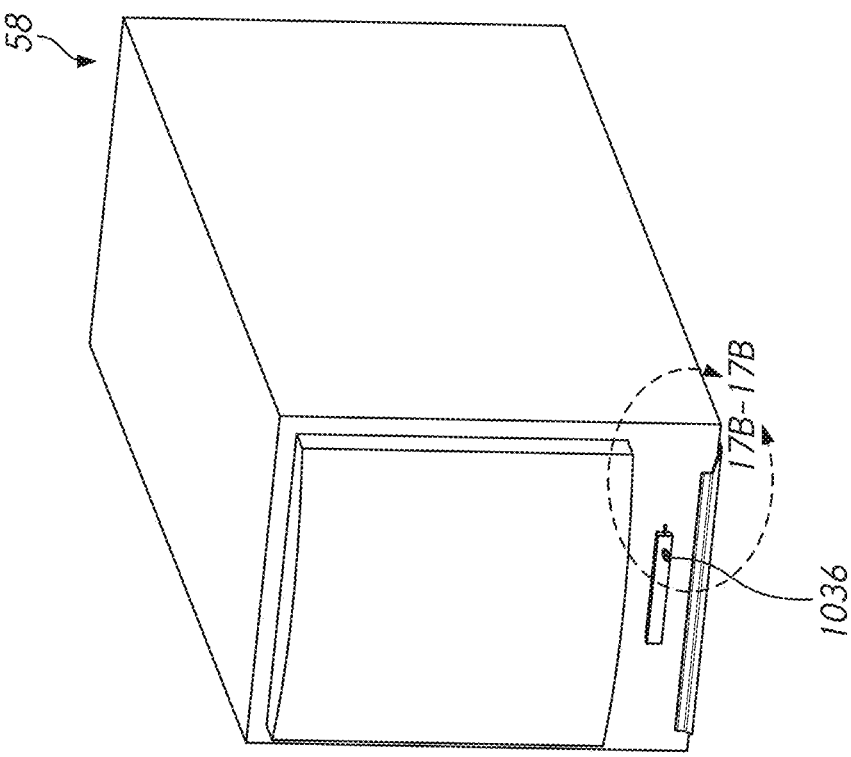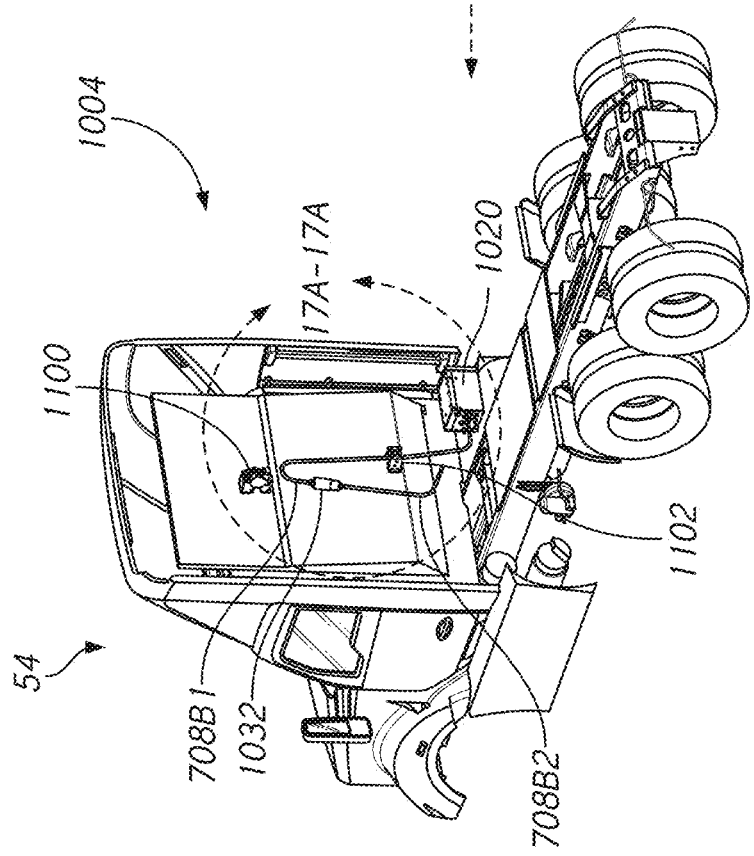
FIG. 17

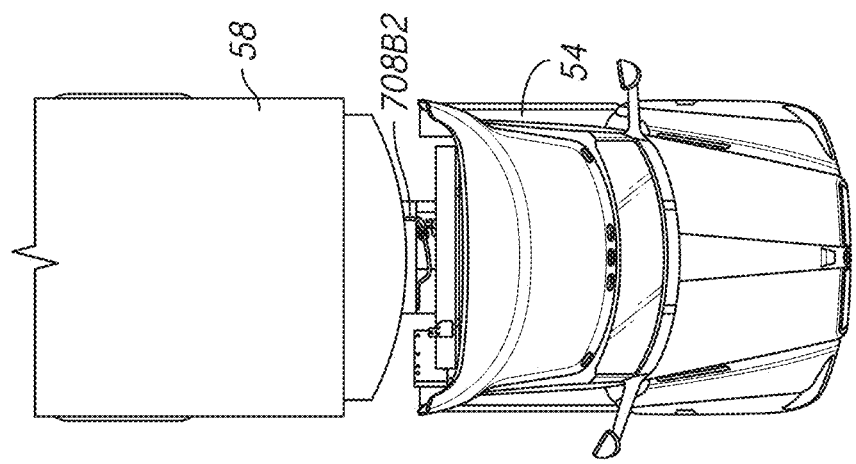
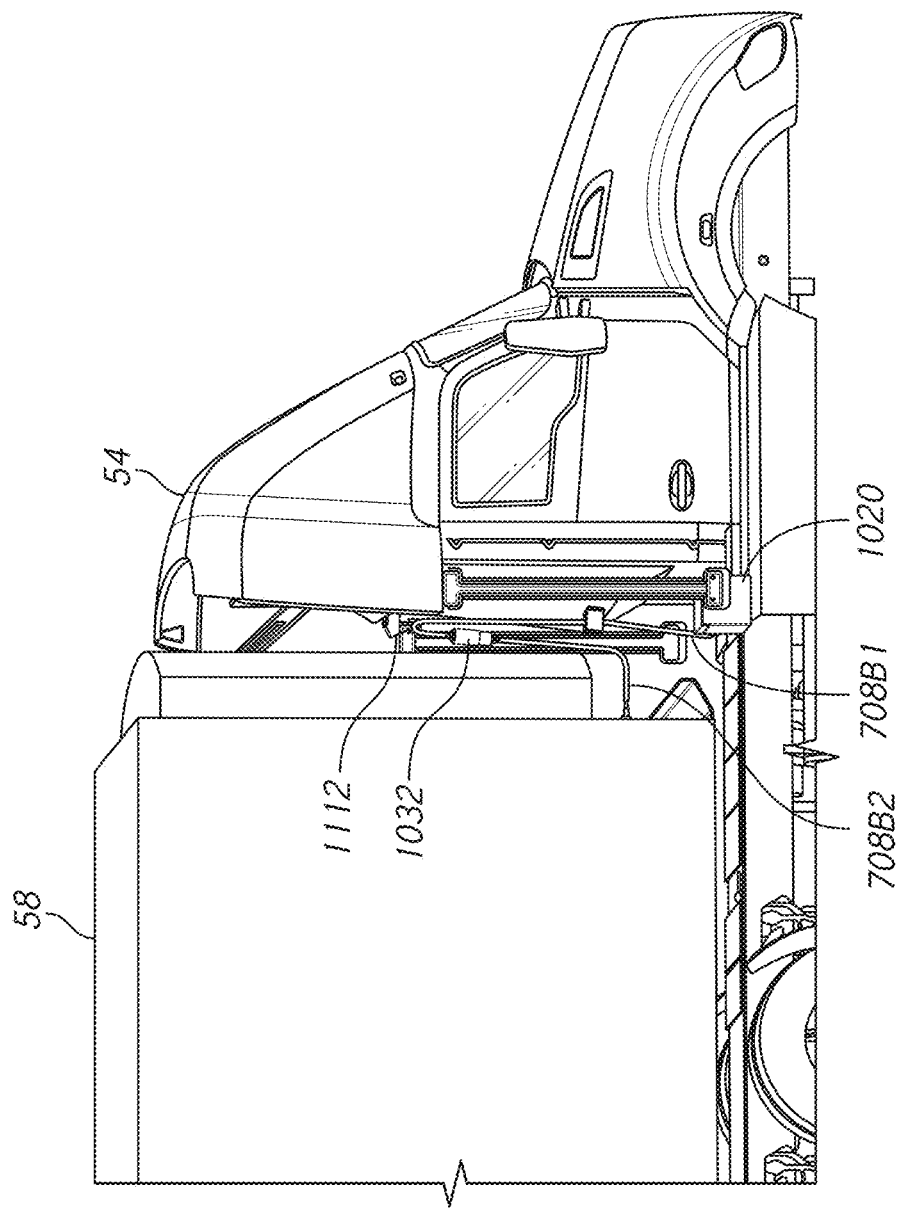
FIG. 17C
FIG. 17D

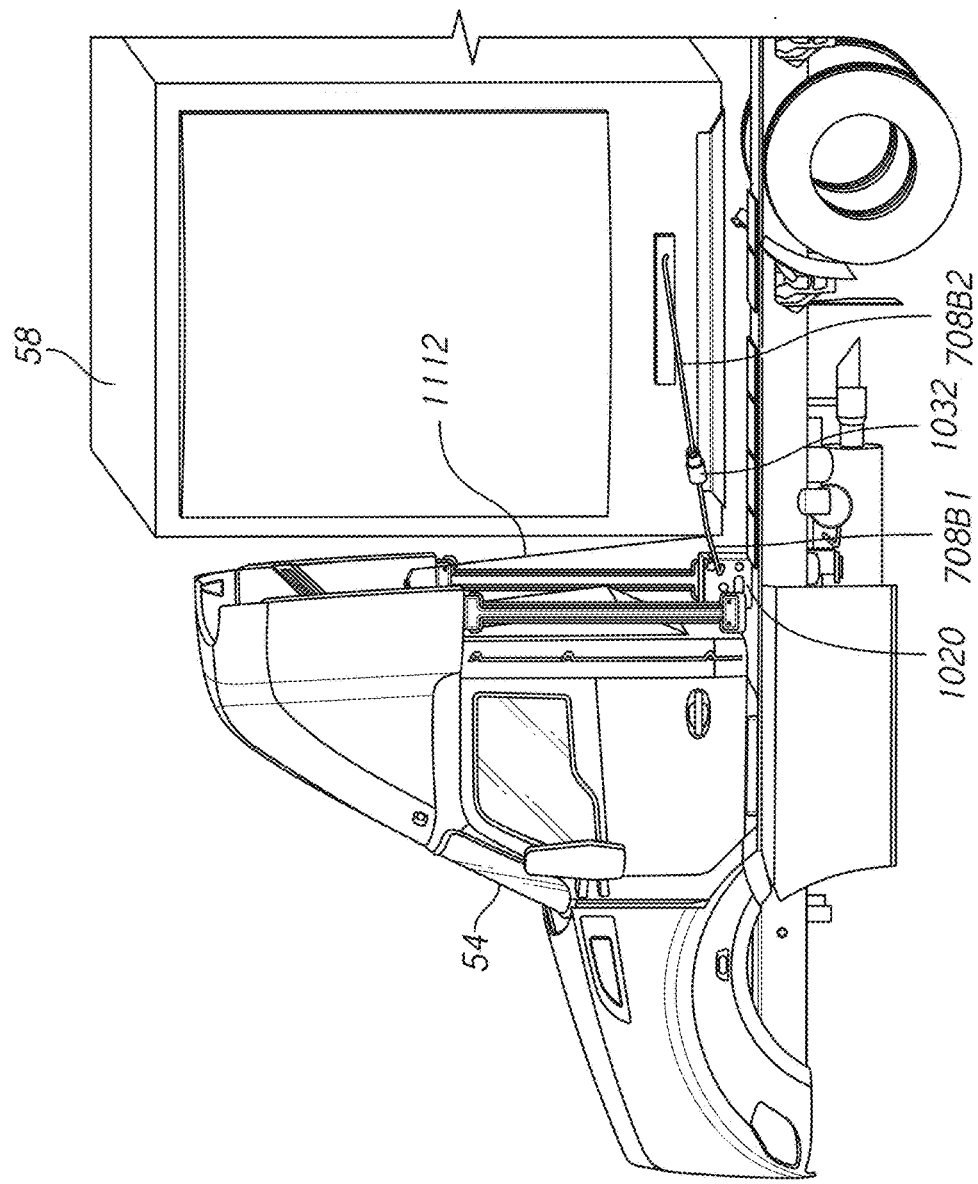
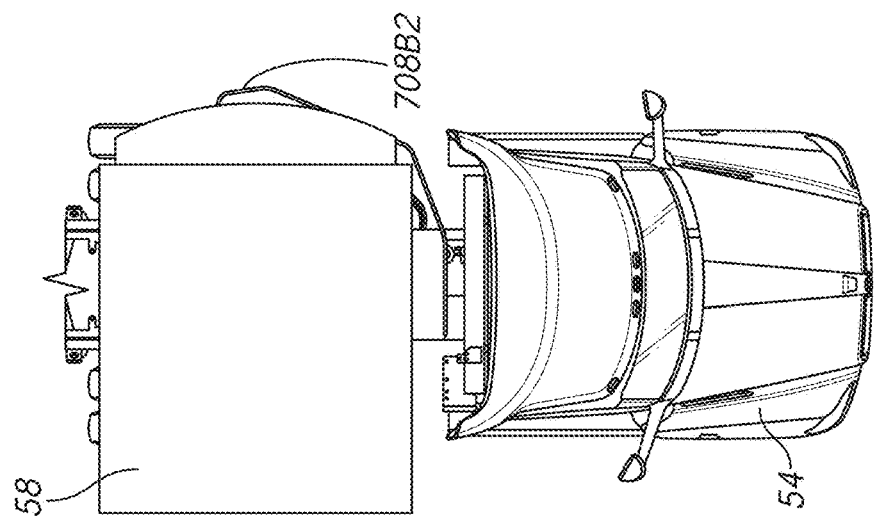
FIG. 17G
FIG. 17H

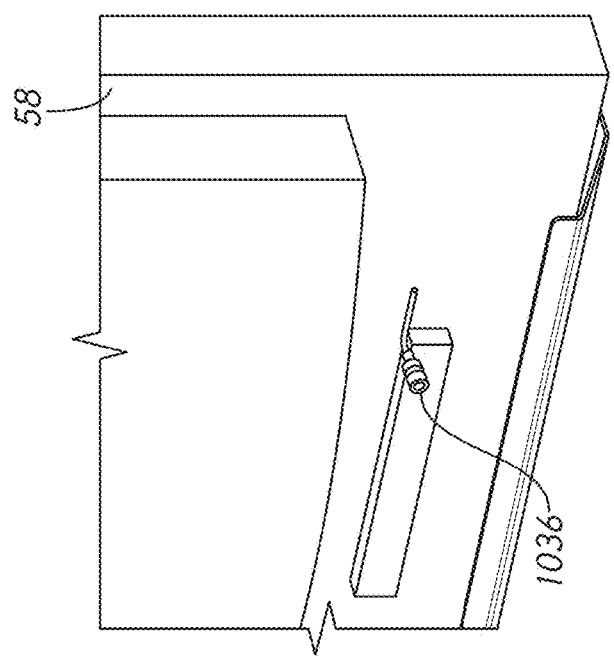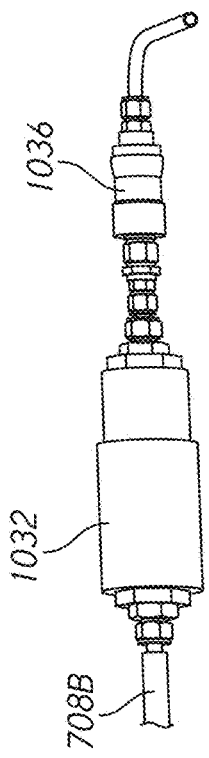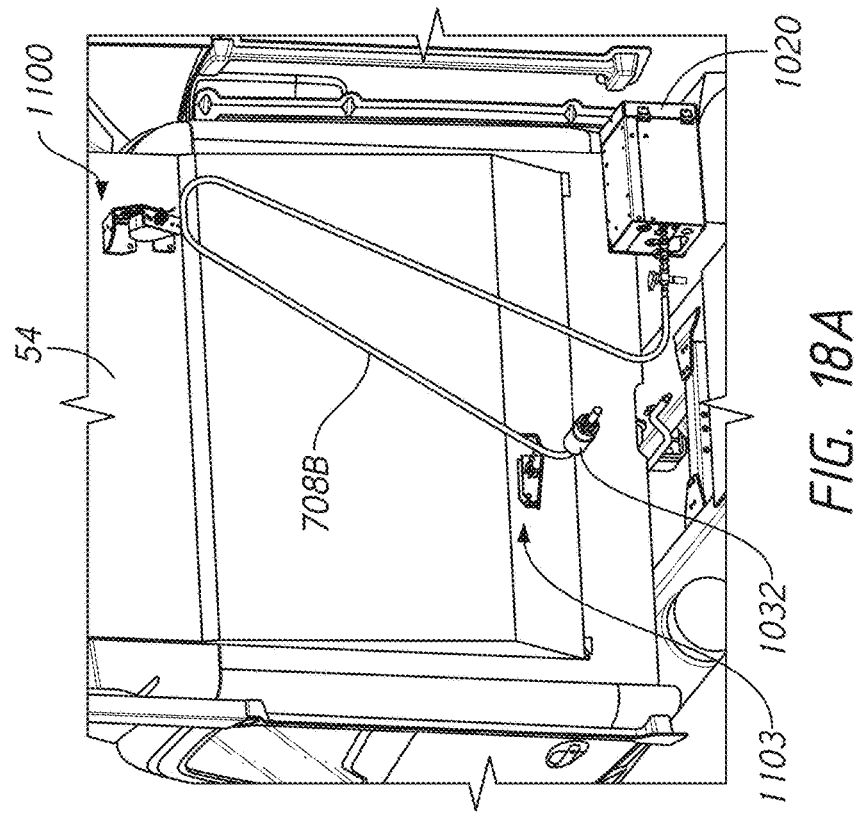
FIG. 18B
FIG. 18C
FIG. 18A

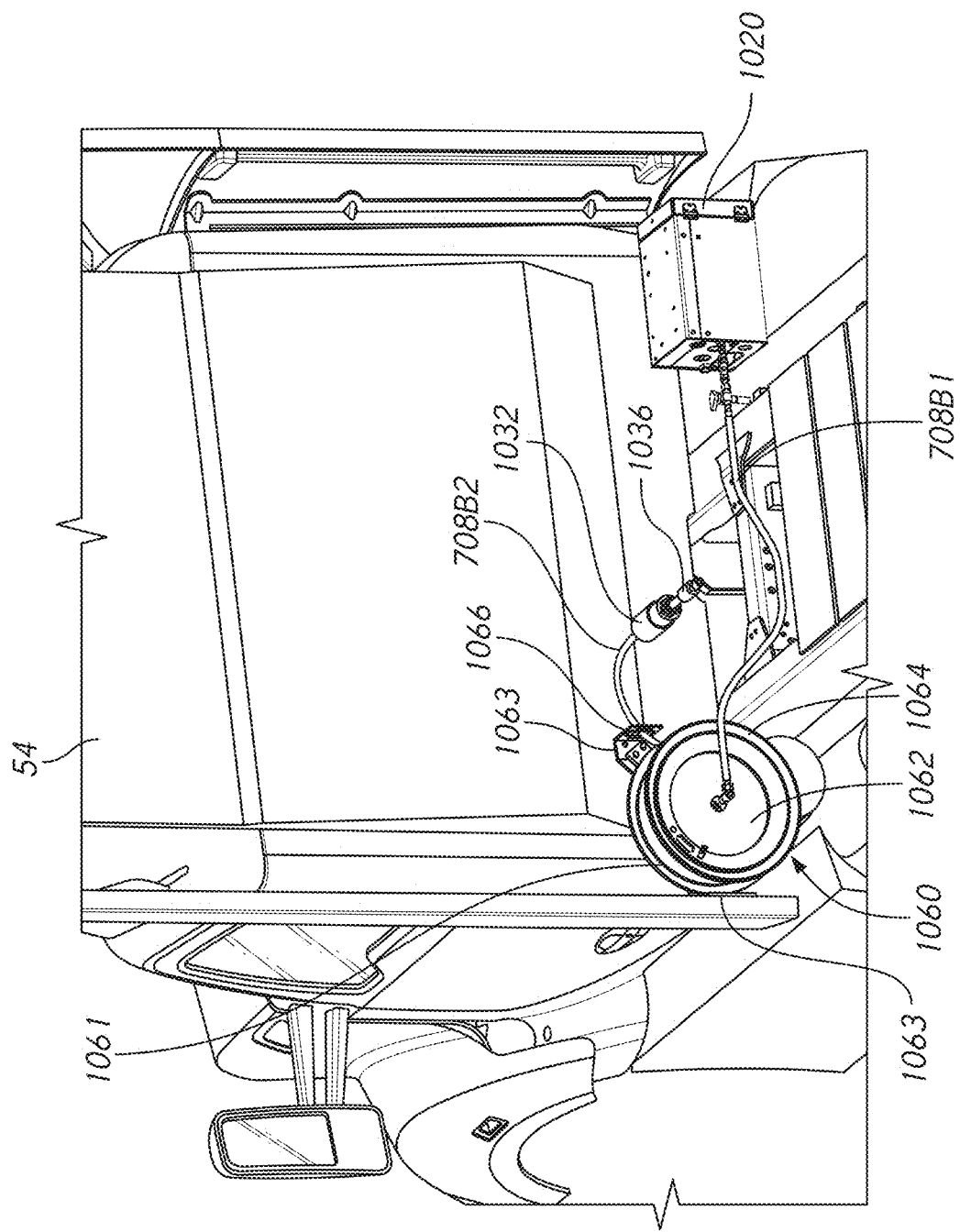

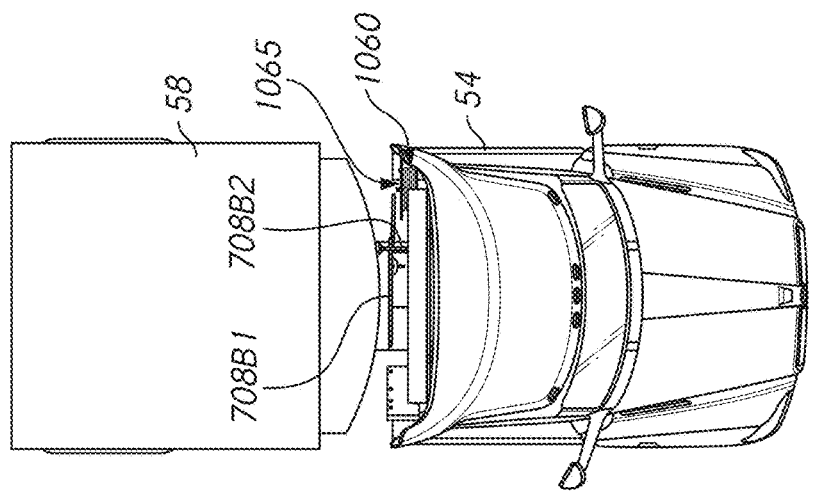
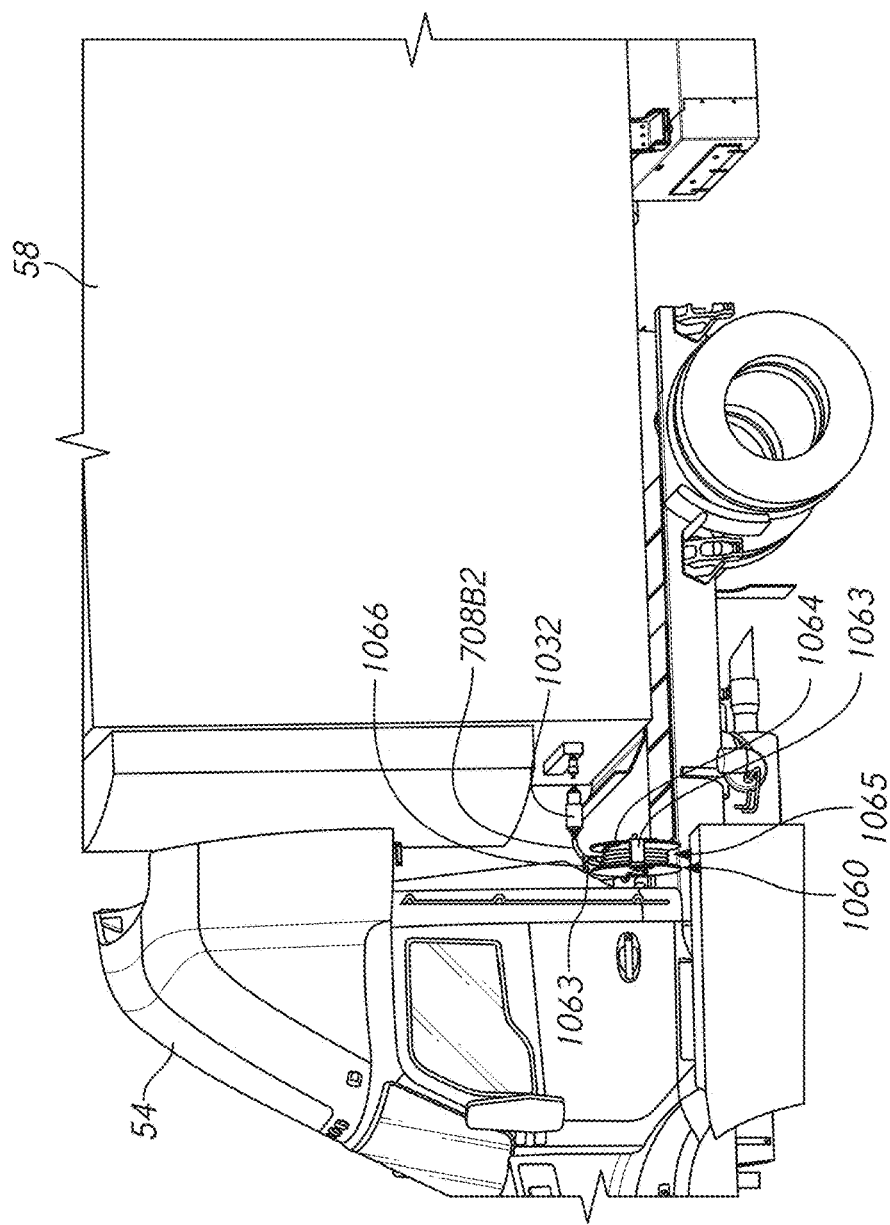
FIG. 21B
FIG. 21A

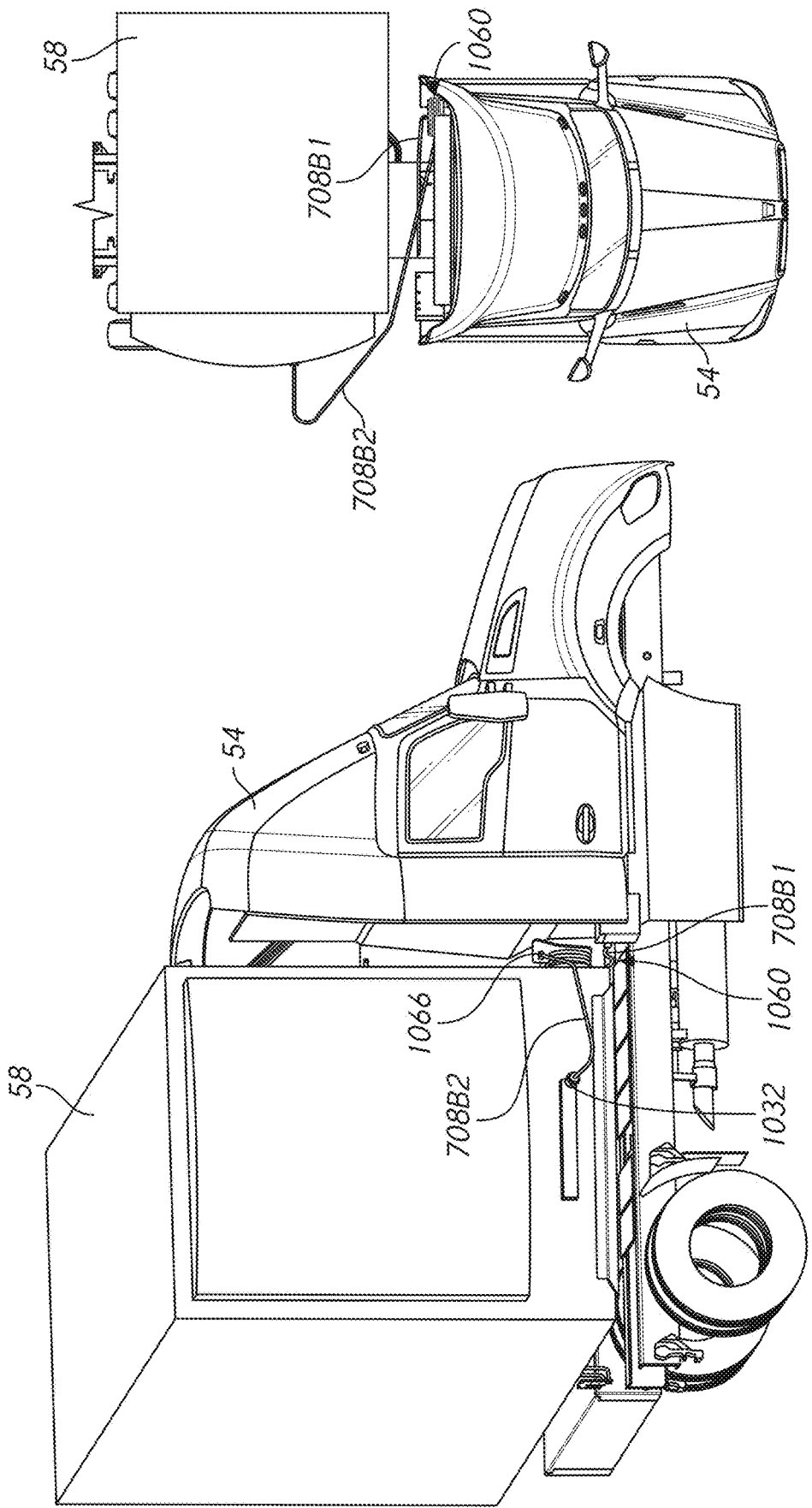

TRAILER HOOKUP BREAKAWAY MITIGATION SYSTEMS AND METHODS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57.

BACKGROUND

Field of the Invention

This application is directed to conduit management systems that enhance safety and durability of the cables and the connection of high voltage storage devices and high voltage loads and of conduits that supply gas stored on a trailer to components of a vehicle that use such gas to perform a vehicle function.

Description of the Related Art

Tractor trailer vehicles, semi-truck, Class 7 and 8 trucks and other large overland shipping vehicles convey large amounts of goods in economies around the world to point of distribution, sale or use. Such trucks often include a tractor that can be detachably connected to a trailer unit. The trailer unit may be fully enclosed and, if so, may be referred to as a dry van for use in conveying non-perishable goods. A dry van is constructed with a frame that supports axles, wheels, and suspension as well as a van body that can enclose the goods to protect them en route. The trailer unit may have a refrigerated compartment to keeps perishable goods cool.

Although the connection between a tractor and a trailer is secure if properly made, such connection can become disconnected in certain circumstances. For example, in an accident the trailer can shift to a high angle relative to the tractor unit, sometimes referred to as "jackknifing". This can put enough stress on connections between the tractor unit and trailer that connections may become disconnected. Also it is possible that a driver could, through error, fail to properly connect the tractor unit and trailer and a disconnection results as the driver drives away. These are examples of breakaway events.

Large shipping vehicles have typically been powered by fossil fuel combustion engines burning diesel and more recently natural gas. Natural gas improves emissions performance and provides other benefits to users. Electric motor propulsion provides another alternative to fossil fuel burning combustion engines that can further reduce cargo vehicle emissions.

SUMMARY

Current Class 7, Class 8, and other heavy duty vehicles designed for fossil fuel burning combustion engines could be reconfigured for natural gas or electric motor propulsion. In either case it may be beneficial to couple an energy source (e.g., a battery storage unit, a natural gas fuel tank, a hydrogen storage tank) with a trailer unit external to a cargo space, e.g., mounted to a lower chassis component. Because the electrical power or fuel is consumed on the tractor, electrical or fuel conveyance between the trailer and the tractor is required. It would be beneficial to enhance the safety and durability of such connections.

In one embodiment, a high voltage power system for a battery electric vehicle is provided. The system includes a high voltage power source, an electrical load, a high voltage switch, and a breakaway detection system. The high voltage power source can be configured to be mounted to a trailer unit. The electrical load can be configured to be mounted to a tractor configured to be detachably coupled with the trailer unit to form a vehicle suitable for transporting cargo. The electrical conveyance can be disposed between the high voltage power source and the load. The electrical conveyance can comprise an intermediate span disposed between the tractor and the trailer unit. The high voltage switch can be disposed on the trailer unit. The high voltage switch can be disposed on the tractor. The high voltage switch can be disposed on the tractor and on the trailer unit. The high voltage switch can be configured to selectively interrupt current flow and eliminate potential voltage in the electrical conveyance. The breakaway detection system can be used for detecting impending breakaway between the tractor and the trailer unit. The breakaway detection system can include a spool, a sensor, and a controller. The spool can be coupled with one of the tractor and the trailer unit. The spool can be configured to deploy a portion of a tether coupled with the intermediate span of the electrical conveyance. The spool can be configured to retract the deployed portion of the tether. The sensor can be configured to detect an extent of the deployed portion of the tether. The controller can be configured to compare the detected extent and with a breakaway threshold value corresponding to a breakaway event. The controller can be configured to cause the high voltage switch(es) to open when the detected extent exceeds the threshold value.

In another embodiment, a breakaway detection system for detecting impending breakaway between a tractor and a trailer unit of a heavy duty truck is provided. The breakaway detection system includes a spool assembly, a sensor and a controller. The spool assembly is configured to couple with one of the tractor and the trailer unit. The spool assembly includes a spool body configured to deploy a length of an extendable tether and to retract the length. The spool assembly includes a spring configured to apply a torque to the spool body to retract the deployed length. Retraction of the deployed length of the tether can serve to keep cables coupled with the extendable tether off the frame of the tractor. The tether is configured to couple with an electrical conveyance configured to convey high voltage current between a battery and a load. The sensor is configured to detect the length of the tether that has been deployed. The controller is configured to receive an input from the sensor corresponding to the detected length. The controller is configured to compare the detected length to a threshold. The controller is configured to implement a countermeasure when the detected length exceeds the threshold.

In another embodiment, a breakaway detection system is provided for detecting impending breakaway between a tractor and a trailer unit of a heavy duty truck. The breakaway detection system includes a spool assembly, a sensor, and a controller. The spool assembly is configured to couple with one of the tractor and the trailer unit. The spool assembly has a spool body configured to deploy a length of a tether coupled with the spool body and configured to couple with an energy source supply conduit and to retract the length of the tether. The spool assembly also includes a spring configured to act on the spool body to retract the deployed length. The energy source supply conduit is configured to convey a source of energy for use by a motor. The sensor is configured to detect the length of the tether that has been deployed. The controller is configured to receive an input corresponding to the detected length. The controller is configured to compare the input to a threshold value. The controller is configured to implement a countermeasure when the detected amount exceeds the threshold value.

In another embodiment, a vehicle is provided that includes a tractor and a trailer unit. The tractor has an electric motor disposed thereon configured to apply torque to a drive axle and thereby to wheels of the tractor. The trailer unit is configured to be engaged with the tractor. The trailer unit has a battery assembly coupled therewith. The vehicle has the breakaway detection system described above or elsewhere herein. The energy source supply conduit comprises an electrical conveyance. An intermediate span of the electrical conveyance is disposed between the tractor and the trailer unit and is coupled with the tether disposed about the spool body. The vehicle can include a high voltage switch. The countermeasure can include opening the high voltage switch.

In another embodiment, a breakaway mitigation system is provided for addressing a breakaway between a tractor and a trailer unit of a heavy duty truck. The breakaway mitigation system includes a spool assembly and a breakaway connection. The spool assembly is configured to couple with one of the tractor and the trailer unit. The spool assembly has a spool body configured to deploy a length of a tether coupled with the spool body and configured to couple with a high pressure gas supply conduit and to retract the length of the tether. The spool assembly is also configured to act on the spool body to retract the deployed length. The high pressure gas supply conduit is configured to convey compressed natural gas for use by a motor, hydrogen gas for use by a fuel cell, or another high pressure gas to perform other useful work on the tractor. In other non-limiting examples, hydrogen gas can also be used by an internal combustion engine, gas turbine, and auxiliary equipment. The breakaway connection configured to be placed in fluid communication with a high pressure gas cylinder. Optionally, the breakaway mitigation system includes a sensor configured to detect a length of the tether that has been deployed and a controller configured to receive an input corresponding to the detected length. When included, the controller can be configured to compare the input to a threshold value. The controller can be configured to implement a countermeasure when the detected amount exceeds the threshold value.

In another embodiment, a vehicle is provided that includes a tractor and a trailer unit. The tractor has an internal combustion engine configured to apply torque to a drive axle and thereby to wheels of the tractor. The trailer unit is configured to be engaged with the tractor. The trailer unit has a fuel tank coupled therewith. The vehicle has the breakaway mitigation or detection system described above or elsewhere herein. The energy source supply conduit comprises a fuel hose providing fluid communication between the fuel tank and the internal combustion engine. The vehicle can include, in some embodiments, a breakaway connection that can have or can act as a check valve, a solenoid valve or other valve device configured to be closed to prevent fluid communication between the fuel tank and the internal combustion engine.

In another embodiment, a vehicle is provided that includes a tractor and a trailer unit. The tractor has a fuel cell configured to generate electric current for use on or by the tractor. The trailer unit is configured to be engaged with the tractor. The trailer unit has a high pressure gas tank coupled therewith. The vehicle has the breakaway detection system described above or elsewhere herein. The vehicle includes a high pressure gas hose that provides fluid communication between the high pressure gas tank and the fuel cell. The vehicle can include, in some embodiments, a breakaway connection that can have or can act as a check valve, a solenoid valve or other valve device configured to be closed to prevent fluid communication between the high pressure gas tank and the fuel cell.

In another embodiment, a heavy duty vehicle assembly is provided that includes a chassis, a battery assembly, and a power distribution unit. The chassis supports an electric motor and an axle that supports wheels. The electric motor is configured to apply torque to the axle in a first mode and to generate current in a second mode. The battery assembly has a housing and a battery assembly mount system. The housing encloses a plurality of battery units. The mount system couples the battery assembly with the heavy duty vehicle assembly. The power distribution unit is configured to direct current to the electric motor in the first mode and to receive current from the electric motor in the second mode. The power distribution unit is further configured to direct current from the electric motor in the second mode to a load configured to convert gravitational kinetic energy into a form of energy other than kinetic energy to provide a braking function to the heavy duty vehicle assembly.

In another embodiment, a breakaway mitigation system is provided. The system includes a fuel module, a fuel hose, and a fuel hose management system. The fuel module is configured to be supported on a trailer unit of a truck. The fuel module includes a high pressure gas fuel tank. The fuel module can include a plurality of high pressure fuel tanks. The tank or tanks can include Type 4 tanks. The tank or tanks can include Type 3 tanks. The tank or tanks can include Type 2 tanks. The tank or tanks can include other configurations. The tank or tanks can include a combination of any of the foregoing types of tanks. The fuel hose is configured to be fluidly coupled to the fuel module and to extend from the trailer unit to a tractor. The fuel hose can be a single hose or a combination of more than one hose segment. The fuel hose management system can be configured to at least partially support the fuel hose away from the tractor, the trailer unit and/or the tractor and trailer unit. The fuel hose management system is configured to extend at least a portion of the length of the fuel hose away from a rear wall of a tractor to accommodate a greater separation of the trailer unit from the tractor. This capability can mitigate conditions related to an accident, a rollover, a jackknife event, or other situation resulting in separation of the trailer under from the tractor. The fuel hose management system is configured allow at least a portion of the length of the fuel hose to move away from a rear wall of a tractor to accommodate a greater separation of the trailer unit from the tractor in the event of a jackknife accident.

In some embodiments, the fuel hose management system has a tether configured to be secured to the fuel hose and to be extended to extend the portion of the length of the fuel hose away from the tractor in the event of a jackknife accident, rollover or other accident or other incident resulting in the trailer unit separating from the tractor. The fuel hose management system can include an extendable support cable disposed over the tether to apply a vertical load to the tether to provide a space between or reduce the load between the fuel hose and the truck in the event of a jackknife accident, rollover or other accident or other incident resulting in the trailer unit separating from the tractor.

The fuel hose management system can include a guide or guide assembly, such as a roller assembly comprising a roller (or other guide) configured to control the orientation of the extendable support cable. The roller assembly can limit movement of the extendable support cable in directions away from a central vertical plane of the truck to less than 50 degrees, 40 degrees, 30 degrees, 25 degrees or less. The guide assembly, e.g., the roller assembly, is configured to maintain space between the extendable support cable and edges of the trailer unit in the event of a jackknife accident, rollover or other accident or other incident resulting in the trailer unit separating from the tractor.

In some embodiments, a sensor is provided that is configured to detect an amount of extension of the fuel hose and to implement a mitigation in the event of a jackknife accident, rollover or other accident or other incident resulting in the trailer unit separating from the tractor. When provided, the sensor can output a signal to a controller configured to actuate a valve to prevent or reduce flow of high pressure gas from a fuel tank of the fuel module.

In one embodiment, a hose spool assembly comprising a spool configured to wind a portion of fuel hose therearound and to allow extension of the portion from the spool and a bracket having an opening for guiding the fuel hose therethrough.

In one embodiment, one or more couplers provide connection between the fuel hose and other components. A first coupler can be provided and can be configured to be secured to the tractor. A second coupler can be provided and can be configured to be secured to the trailer unit, the fuel hose disposed between the first and second couplers. In one embodiment, a quick connect coupler can be configured to be disposed within the fuel hose to connect a first portion of the fuel hose to a second portion of the fuel hose. The first portion of the fuel hose disposed between the first coupler and the quick connect coupler. The second portion of the fuel hose disposed between the second coupler and the quick connect coupler. The quick connect coupler can be permanently secured to the first portion of the fuel hose. The quick connect coupler can be permanently secured to the second portion of the fuel hose. The quick connect coupler can be configured to be disposed on the trailer unit, e.g., where a single segment fuel hose extends between the tractor and the trailer unit and separation of the fuel hose occurs at the trailer unit. The quick connect coupler can be configured to be disposed on the tractor, e.g., where a single segment fuel hose extends between the tractor and the trailer unit and separation of the fuel hose occurs at the tractor. At least one of the first coupler, the second coupler and the quick connect coupler is configured to allow the fuel hose to detach therefrom upon application of a load above a threshold in the event of an accident.

In one embodiment, a fuel management module is provided that is configured to be mounted to the trailer unit. The fuel management module includes the second coupler and a port for providing fluid communication between the fuel hose connected to the second coupler and a fuel tank of the fuel module. A trailer side fuel hose segment that has a first end fluidly coupled to the port of the fuel module and a second end fluidly coupled to a tank of the fuel module. In one embodiment, a fuel management module is configured to be mounted to the tractor. The fuel management module comprising a fueling port on an outboard side and the first coupler on an inboard side. Fuel can be directed from the fuel management module through the fuel hose to one or more fuel tanks disposed in the fuel module.

BRIEF DESCRIPTION OF THE DRAWINGS

Features of the invention can be better understood from the following detailed description when read in conjunction with the accompanying schematic drawings, which are for illustrative purposes only. The drawings include the following figures:

FIG. 11 is a schematic illustration of a breakaway detection system including a sensor configured to measure the magnitude of the length of extension of an extendable tether configured to couple with a tractor or with a spanning portion of a high voltage conveyance or a high pressure gas hose, e.g., a fuel hose or a hydrogen gas supply hose;

FIGS. 18A-18I show a variation of the vehicle fuel system seen in FIGS. 17-17H;

DETAILED DESCRIPTION

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

Figure 1:
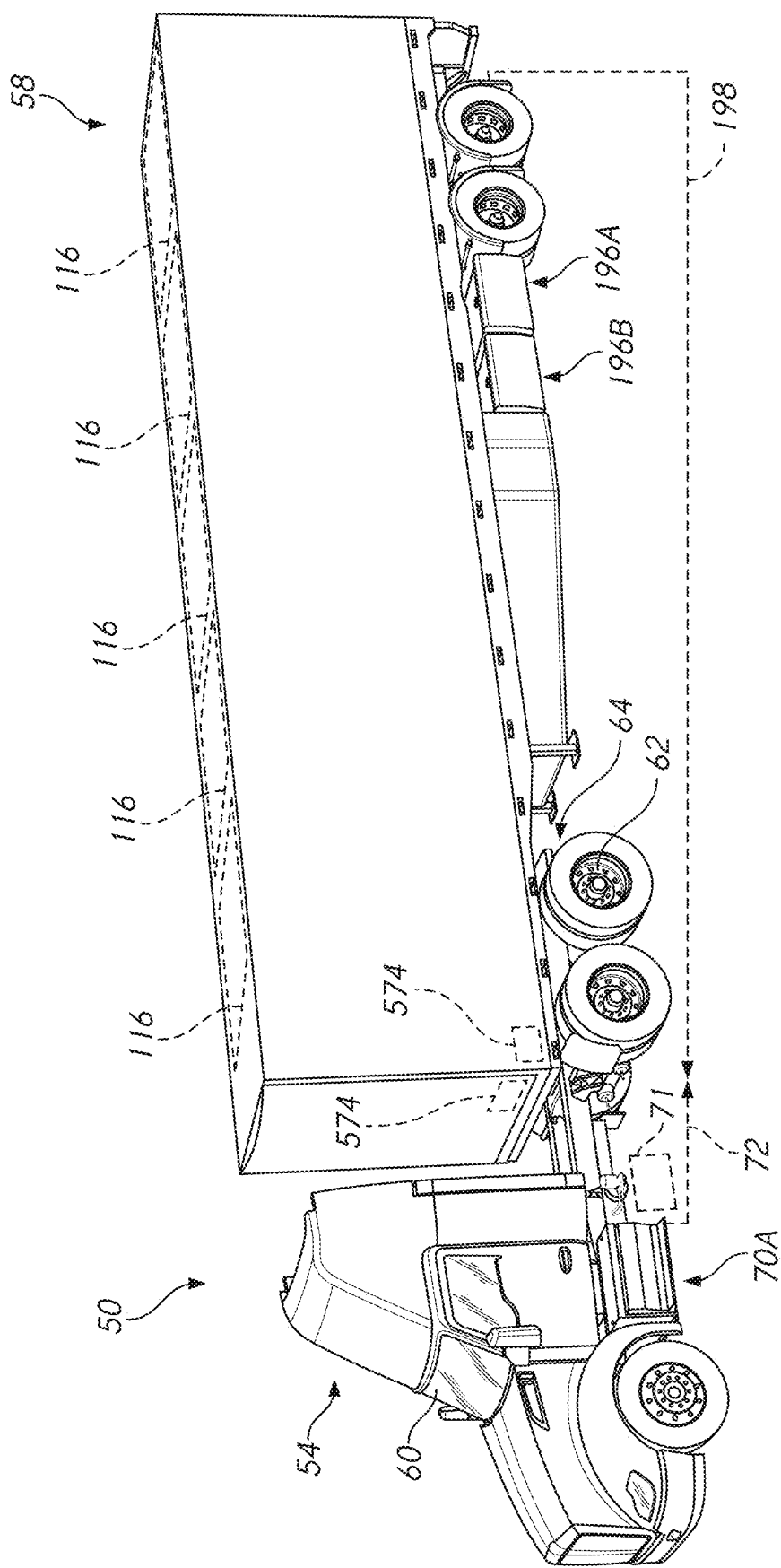
FIG. 1 is a perspective view of a Class 8 truck or similar heavy-duty cargo vehicle having a tractor and a trailer unit.
Figure 1A:
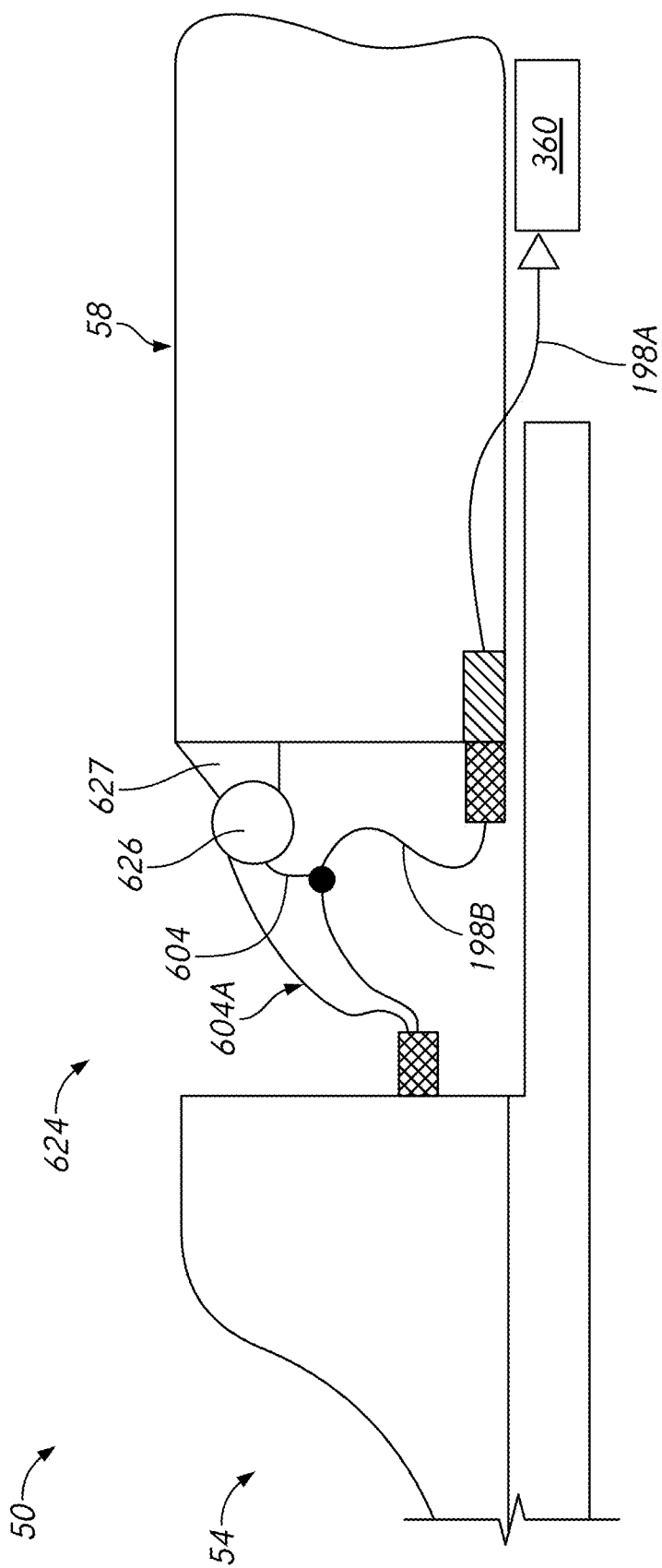
FIG. 1A is a schematic side-view of another embodiment of the vehicle of FIG. 1.

This application is directed to novel vehicle assemblies that provide advantageous electric powertrain features and functions and/or advantageous breakaway mitigation features for such powertrains and for gas supply for vehicle assemblies. For example, FIG. 1A shows a truck 50 that has a tractor 54 and a trailer unit 58. As discussed further below, high voltage battery assemblies can be disposed on the trailer unit 58 and high voltage loads can be located on the tractor 54. As discussed further below, in some cases a high pressure gas source can be disposed on the trailer 58 and an engine, fuel cell or another high pressure gas component can be located on the tractor 54. In some cases a detachable high voltage conveyance can enable the trailer unit 58 to be separable from the tractor 54 and in some cases a detachable high pressure hose can enable the trailer unit 58 to be separable from the tractor 54. In one implementation the high voltage conveyance can include a trailer side conveyance 198A can be coupled with the trailer unit 58 and a tractor side conveyance 72 coupled with the tractor 54. The trailer side conveyance 198A can be coupled with a high voltage source, such as a battery assembly. The high voltage conveyance 72 can be coupled with a high voltage load, such as an electric motor. A spanning conveyance 198B (sometimes referred to herein as an intermediate span) can extend between the trailer unit 58 and the tractor 54 to convey current at high voltage. Various embodiment disclosed herein provide for management of the spanning conveyance 198B and enhanced safety for users. The spanning conveyance 198B can be coupled with a breakaway detection system 624 described in more detail below to mitigate the risk that a breakaway event, in which that tractor 54 accidentally detaches from the trailer unit 58.

The trailer unit 58 is a cargo trailer assembly that can be attachable to and detachable from the tractor 54. FIG. 1 shows the tractor 54 includes a cab 60 within which an operator can operate the truck 50. The tractor 54 includes one or more axles 62. In some embodiments, the truck 50 is a battery electric vehicle and the tractor 54 is equipped with a battery assembly 70A. The battery assembly 70A can store electric power to supply current to one or more electric motor 64 disposed on the tractor 54 and engaged with the axles 62. Details of various embodiments of battery assemblies are discussed below in connection with FIG. 7. In addition to the battery assembly 70A, a fuel cell 71 may be mounted to the truck 50, e.g., supported on the chassis or frame rails of the tractor 54.

Various embodiments of a trailer mountable power storage and distribution system 498 (discussed in detail below in connection with FIGS. 9 and 10) are provided to enhance the capabilities of the truck 50. As explained further below the trailer mountable power storage and distribution system 498 can greatly extend the range of the truck 50. The system 498 is modular allowing the amount of range extension to be selected based on the application, such as based on a combination of the distance to be traveled by the truck 50, the route, the load, the ambient conditions, and other factors. The system 498 also facilitates charging batteries on the trailer unit 58 while the tractor 54 can remain in service. The system 498 also provides other convenient functions, such as exporting power, providing for location tracking, assisting the driver in properly balancing the weight of the trailer unit 58 and the load carried therein, and other functions discussed below.

In some variations, a trailer mountable gas supplied range extender system can greatly extend the range of the truck 50. An example of the range extender system is the vehicle fuel system 1000 shown schematically in FIG. 14. The system 1000 is modular allowing the amount of range extension to be selected based on the application, such as based on a combination of the distance to be traveled by the truck 50, the route, the load, the ambient conditions, and other factors. The trailer mounted range extender system facilitates providing additional volumes of on-board combustion gas for an internal combustion engine and/or for volumes of gas to be supplied to the fuel cell 71 for charging batteries on the tractor 54 or the trailer unit 58 while the tractor 54 can remain in service. The system vehicle fuel system 1000 also can provide other convenient functions, such as exporting pressurized gas that can be used by a component of the truck 50 to perform work.

FIG. 1 shows that the battery assembly 70A can be coupled with the tractor side conveyance, which is sometimes referred to herein as a high voltage conveyance 72. The high voltage conveyance 72 is configured to be coupled with a high voltage conveyance 198 at least partially disposed on the trailer unit 58. The high voltage conveyance 198 can include the combination of the trailer side conveyance 198A and the spanning conveyance 198B discussed above. In one embodiment, the trailer side conveyance 198A and the spanning conveyance 198B are separable portion of the high voltage conveyance 198. In one embodiment, the trailer side conveyance 198A and the spanning conveyance 198B are a non-separable portions of the high voltage conveyance 198. FIG. 1 shows the high voltage conveyance 72 and the high voltage conveyance 198 are shown as dashed lines outside the body of the truck 50 but these conveyances would be routed at least partially beneath the cab 60 and/or along frame member of the chassis of the truck 50 and/or the chassis of the tractor 54 as discussed below. Providing two separate conveyances on the tractor 54 and the trailer unit 58 facilitates using the tractor 54 with many different trailer units. A trailer side fuel hose segment 708A and a spanning fuel hose segment 708B can be provided to allow decoupling of the tractor 54 from the trailer unit 58. This allows the trailer unit 58 to be taken out of service for unloading while the truck 50 can be coupled with another trailer unit 58 and sent back out on the road. A non-separable conveyance or fuel hose could be provided in a dedicated trailer unit situation.

The high voltage conveyance 198 can convey current between the battery assembly 70A and a part of an electric powertrain system disposed on the trailer unit 58. For example the battery assembly 70A could be operationally coupled with a battery assembly 196A disposed on the trailer unit 58. The battery assembly 196A can provide high voltage current to the battery assembly 70A, e.g., as direct supply to the electric motor 64 or to replenish power stored in the battery assembly 70A. In some applications, a power distribution system is provided that selects between drawing current from the battery assembly 70A and the battery assembly 196A (or another battery assembly on the truck 50). The high voltage conveyance 72 can have a first branch leading to the battery assembly 70A and a second branch extending to another load such as the electric motor 64.

Figure 4:
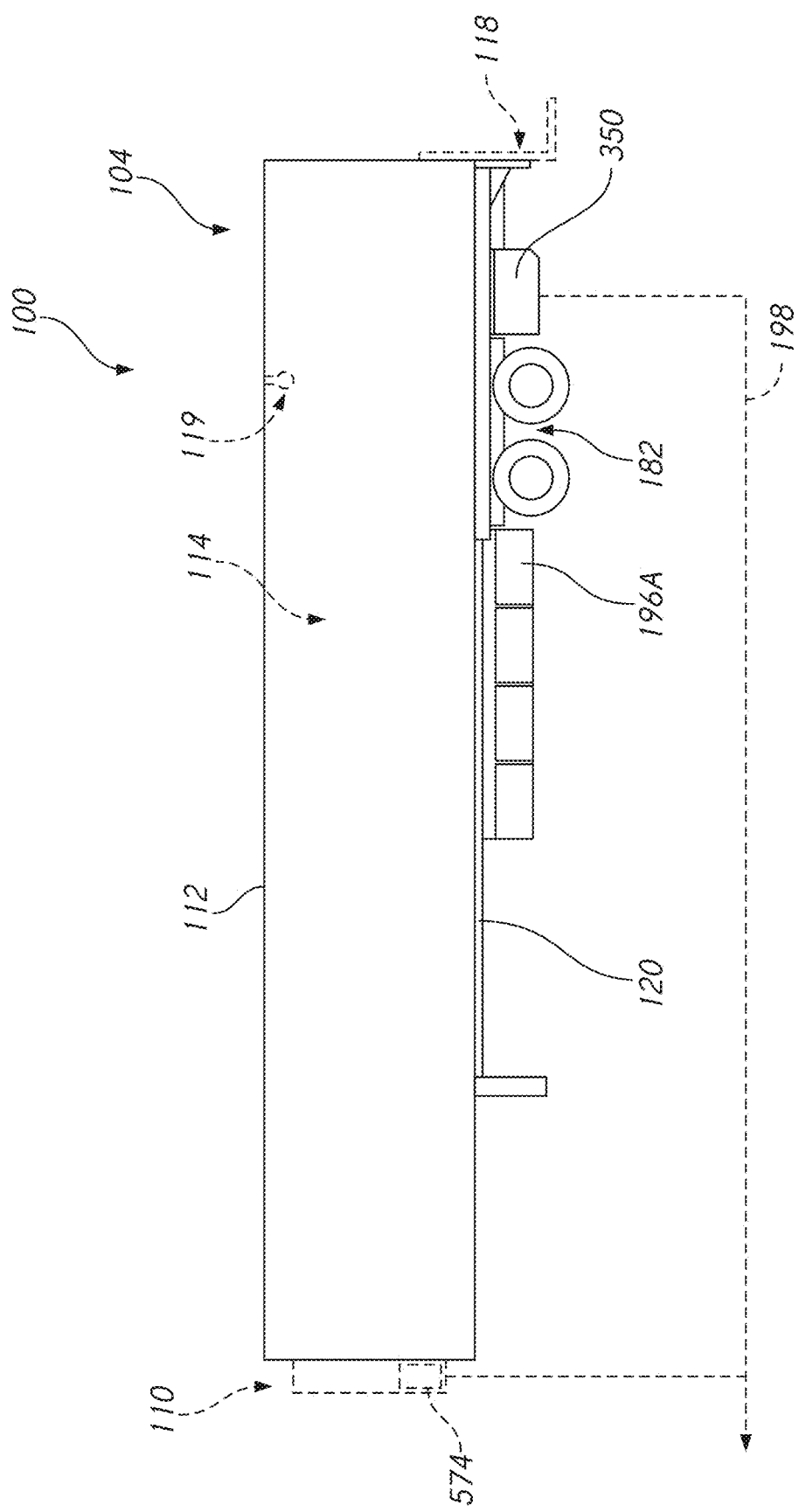
FIG. 4 is a side schematic view of a cargo trailer assembly corresponding to the trailer unit illustrated in FIG. 1.

In one embodiment the high voltage conveyance 198 is coupled to a power distribution system, which can select between providing power through one or more branches of the high voltage conveyance 72 to loads including the electric motor 64 and the battery assembly 70A. The power distribution system can thus select between recharging the battery assembly 70A and providing current to the load. As discussed further below in connection with FIG. 2 a power distribution system can output power in different formats to support loads of different types simultaneously. FIG. 1 illustrates that the trailer unit 58 can be equipped with a second battery assembly 196B. Various embodiments include more than two battery assemblies, e.g., three, four, or more assemblies. FIG. 4 shows an example of placement of up to four battery assemblies. More than four battery assemblies can be provided on the trailer unit 58.

The battery assemblies can be aligned along a longitudinal axis LA of the trailer unit 58 of FIG. 1 or a cargo trailer assembly 100 as illustrated in FIG. 4. The cargo trailer assembly 100 can have an array of battery assemblies disposed forward of the wheels thereof.

As will be discussed further below, the trailer unit 58 can be equipped one or more range extending modules. Some range extending modules operate by replenishing power storage in one or more of the battery units on the truck 50, e.g., in one of, more than one of or all of the battery assembly 196A, the battery assembly 196B or the battery assembly or assemblies 70A. One example of the range extending module includes one or a plurality of solar cells 116 coupled with the trailer unit 58. FIG. 1 schematically illustrates four solar cell 116 disposed on a top side of the roof the trailer unit 58. More or fewer than four solar cells 116 can be provided. In one implementation the entire top surface of the trailer unit 58 is formed as a solar energy capturing roof. The solar cells 116 can be mounted on any surface that may be incident by solar rays, including any of the longitudinal side surfaces or the front or back surfaces of the enclosure structure of the trailer unit 58. The solar cells 116 can be coupled by an electrical conveyance to a power generation junction (discussed in connection with FIG. 9 below) to convey current generated in the solar cells 116 directly or indirectly to the battery assemblies for storage or to other high and/or low voltage loads of the truck 50. The solar cells 116 can indirectly convey power to the battery assemblies via an auxiliary component assembly mounted to the trailer unit 58, as discussed further below. The fuel cell 71 is another type of range extending module that can be provided on the tractor 54 or the trailer unit 58 to replenish the charge level of the battery assembly 70A, the battery assembly 196A, the battery assembly 196B. The fuel cell 71 can be supplied by compressed fuel cell gas, e.g., hydrogen, from a high pressure tank within the fuel module 1008 (discussed below) disposed on the 58. In another approach, the tractor 54 is propelled by an internal combustion engine and another type of range extending module disposed on the trailer unit 58 includes a high pressure fuel tank 704, such as a CNG tank.

Figure 2:
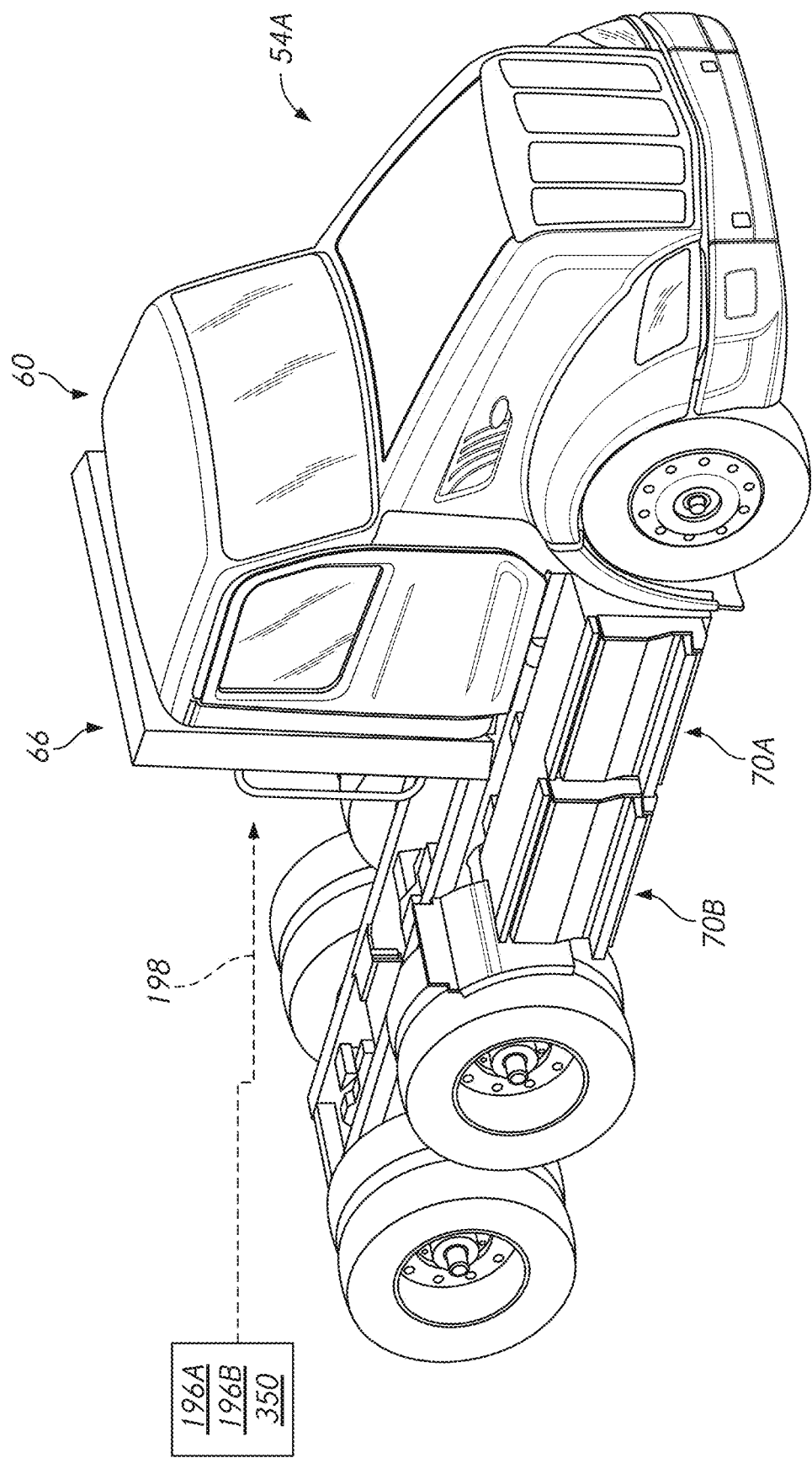
FIG. 2 is a front perspective view of a tractor that can be used with the tractor-trailer truck of FIG. 1, the tractor being equipped with two battery assemblies configured to supply power to an electric powertrain.

FIG. 2 shows a tractor 54A similar to the tractor 54, except as described differently below. The tractor 54A includes a battery assembly 70B in addition to the battery assembly 70A. Providing a second battery assembly provides additional storage capacity and additional redundancy of source of energy for the electric motor 64. The tractor 54A also includes a power distribution module 66. The power distribution module 66 is one implementation of the power distribution system described above. The power distribution module 66 can provide electrical communication between the tractor 54A and the trailer unit 58. The power distribution module 66 can manage the distribution of power stored in a plurality of battery assemblies to loads disposed in different parts of the vehicle. As such the power distribution module 66 can be configured to be coupled to the high voltage conveyance 198. The tractor 54A can be coupled with the spanning conveyance 198B which spans between the tractor 54A and the trailer unit 58 when the tractor 54A is incorporated into the truck 50. The power distribution module 66 can have a junction for connecting the high voltage conveyance of the tractor 54A similar to the high voltage conveyance 72 of the tractor 54. The power distribution module 66 can have a junction for connecting to a fuel cell 71 where provided such that additional range can be achieved by supplying hydrogen from a tank located on the tractor 54 or on the trailer unit 58 to the fuel cell 71 and then current from the fuel cell 71 to any of the battery assemblies electrically connected to the power distribution module 66. The power distribution module 66 can provide for direct or indirect electrical connection between the high voltage conveyance 198 of the trailer unit 58 and the high voltage conveyance of the tractor 54A. The power distribution module 66 can have a socket for connection of the spanning conveyance 198B to complete the circuit between the power source on the trailer unit 58 and one or more loads on the tractor 54.

In some embodiments, the power distribution module 66 has or is coupled with a junction box that can disconnectably connect the high voltage conveyance 198 and the high voltage conveyance 72 to facilitate modular assembly of the electric powertrain components to the truck 50. The power distribution module 66 can receive current from the battery assembly 196A, the battery assembly 196B, the battery assembly 70A, and the battery assembly 70B and can supply the current to a load, including the electric motor 64 or any other electrical component on the tractor 54A or on the trailer unit 58. Each of these power sources and loads can be coupled to a different junction of the junction box if provided. The tractor 54A can be modified for a particular route or use by removing power sources and some loads such that some junctions of the power distribution module 66 are not used for some routes on which the tractor 54A is to be operated.

The power distribution module 66 can provide electrical communication between the battery assembly 70A and a high voltage load, such as the electric motor 64. The power distribution module 66 can provide electrical communication between the battery assembly 70A and a low voltage load, including one or more auxiliary components of the tractor 54A or the trailer unit 58. The power distribution module 66 can configure the output of the battery assembly 70A and/or battery assembly 70B for supplying current (e.g., alternating or direct) at an appropriate (e.g., at high or low) voltage in a format appropriate for various components. The power distribution module 66 can include one or more inverters to adjust the voltage of the power or to convert from DC to AC power or AC to DC power suitable for a load. The power distribution module 66 can interface between the battery assembly 70A and/or the battery assembly 70B and a charge unit that is external to the truck 50. The tractor 54 or the tractor 54A can be equipped with a range extender module as discussed above, which can include an on-board power generation component. In one example, the power distribution module 66 can include circuitry to receive and distribute and/or store current generated by the solar cell 116. Other range extender modules that can be mounted to the trailer unit 58, the tractor 54, or the tractor 54A and electrically coupled with a battery assembly by way of the power distribution module 66 or another auxiliary component assembly can include a fuel cell or motor driven generator to generate current. Current generated by any one or a combination of these range extender modules can be stored in one or more of the battery assemblies 70A, 70B, 196A, 196B. Additional details of the power distribution module 66 are set forth in U.S. 63/089,672, which is hereby incorporated by reference in its entirety for all purposes and is included herewith in an Appendix.

Figure 3:
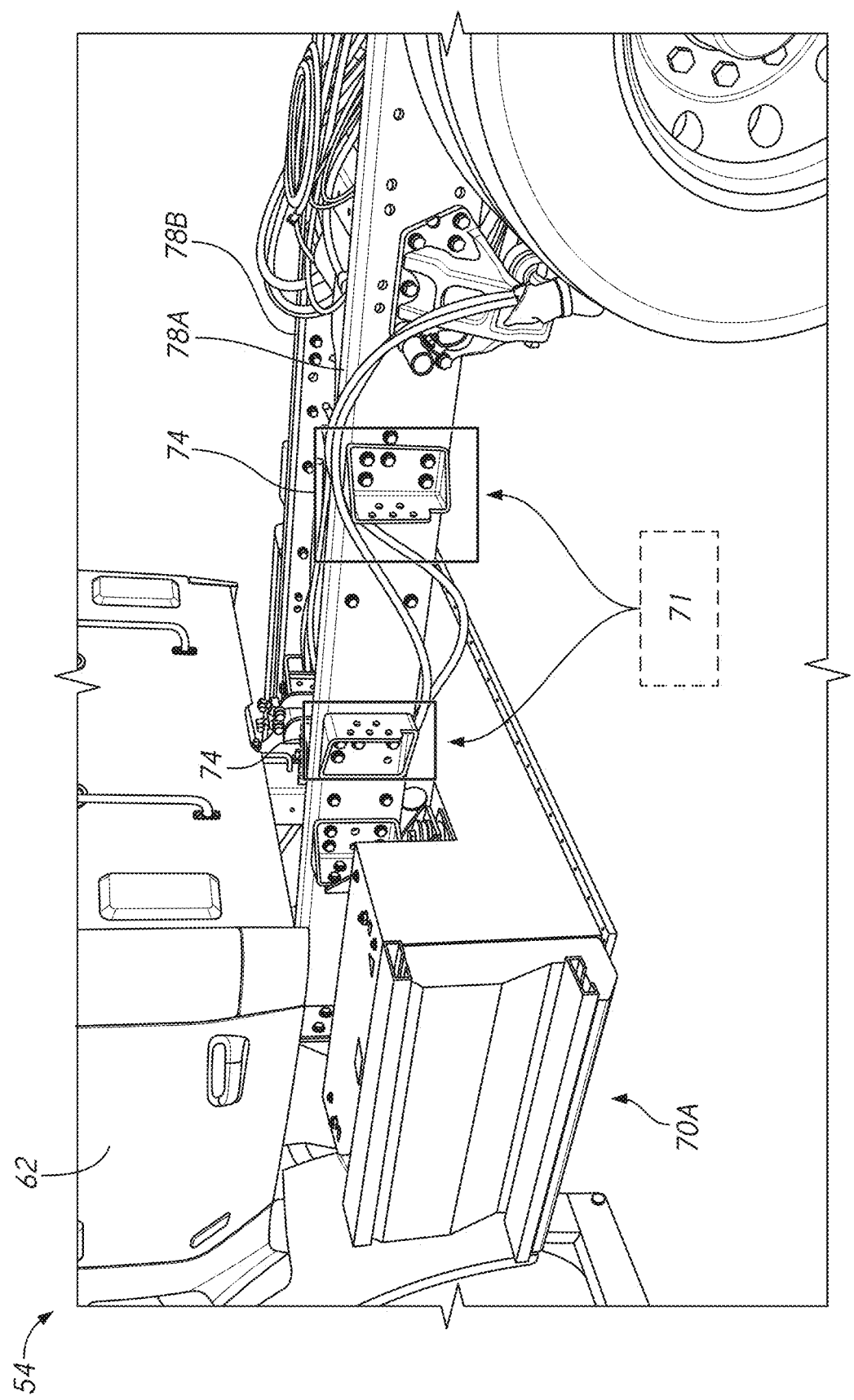
FIG. 3 is a rear perspective detail view of a portion of a chassis of the tractor of FIG. 2 showing frame member brackets that can be coupled with a housing bracket of either of the battery assemblies mounted to the tractor in FIG. 2.

FIG. 3 shows that the tractor 54 can be equipped with one or more frame member brackets 74 to provide for mounting, e.g., upfitting, of the battery assembly 70A or the battery assembly 70B to the tractor 54. The frame member brackets 74 can couple with first longitudinal frame members 78A. The frame member bracket 74 can support the battery assembly 70B (as shown in FIG. 2). In some configurations, the battery assembly 70B is configured to be supported by four frame member bracket 74, with two brackets coupled with the first longitudinal frame member 78A and two with a second longitudinal frame member 78B. The first longitudinal frame member 78A and the second longitudinal frame member 78B are longitudinal frame members of a chassis of the tractor 54. More or fewer than four frame member brackets 74 can support a battery assembly in various embodiments. In various embodiments the frame member bracket 74 can be used to support the fuel cell 71 in an underslung configuration, as indicated by the dashed arrows. The fuel cell 71 can extend beneath the frame rails of the tractor 54 and be coupled to the frame member bracket 74 on outboard faces thereof. The frame member bracket 74 can also be mounted to the chassis of the tractor 54A.

FIG. 4 shows a modified embodiment of the trailer unit 58 as a cargo trailer assembly 100. The cargo trailer assembly 100 is similar to the trailer unit 58 in that it can be coupled with the tractors 54, 54A or a similar vehicle drive unit. The cargo trailer assembly 100 can incorporate any feature of the trailer unit 58 discussed above. The cargo trailer assembly 100 includes a van assembly 104 and a floor structure 108 for supporting cargo placed thereon. The cargo can be any goods to be transported. The cargo trailer assembly 100 can be configured as a dry van. The cargo trailer assembly 100 can be configured with a refrigeration unit to maintain a selected temperature within at least a portion of the enclosed space thereof. The cargo trailer assembly 100 includes at least the battery assembly 196A and also includes an auxiliary component assembly 350. The auxiliary component assembly 350 has a power distribution unit 352 that facilitates delivery of high voltage current to the tractor 54, e.g., by way of the high voltage conveyance 198.

In one embodiment, the cargo trailer assembly 100 optionally is equipped with a control module 110. The control module 110 can be provided as part of a power distribution system for the truck 50 and in some cases for the trailer unit 58. The control module 110 can be connected to a high voltage junction 560 of the auxiliary component assembly 350 (discussed further below) mounted to the cargo trailer assembly 100. In some arrangements some components that could be disposed in the housing of the auxiliary component assembly 350 can be placed in the control module 110 to accommodate existing vehicle space constraints such that a trailer mounted power storage distribution system can be modular and can be retrofitted onto an existing trailer unit. The control module 110 can include some or all of the components and functions of the power distribution module 66. The control module 110 can be detachably coupled with the high voltage conveyance 198. The control module 110 can be coupled with the high voltage conveyance 72 or with a trailer side of the spanning conveyance 198B. The control module 110 can provide an interface between the cargo trailer assembly 100 and the tractors 54, 54A. In one embodiment, the control module 110 supports components and functions on the cargo trailer assembly 100. The control module 110 can be configured to control the internal temperature of a volume 114 of or a portion the interior of an enclosure 112 coupled to the floor structure 108. As such, energy stored on the cargo trailer assembly 100 can maintain the temperature of the enclosure 112 even when the cargo trailer assembly 100 is not connected to the tractor 54. For a dry van configuration, the interior volume 114 of the enclosure 112 may not be temperature controlled but rather is responsive to the ambient conditions. The control module 110 can be provided as part of a power distribution system for the trailer unit 58 or the cargo trailer assembly 100 to deliver power to other high and low voltage components thereof. A spool assembly 626 of a breakaway detection system 624 can be mounted on a bracket 627 disposed on a forward side of the trailer unit 58, e.g., above, adjacent to or on the control module 110.

The cargo trailer assembly 100 can include a chassis 120 providing the structure upon which other components of the cargo trailer assembly 100 can be supported. The chassis 120 can includes the floor structure 108 and also can include one or more body rails. For example, the chassis 120 can include a first body rail 124A and a second body rail 124B. The chassis 120 of the cargo trailer assembly 100 is discussed in further detail below in connection with FIGS. 5-6A.

FIG. 4 shows that the cargo trailer assembly 100 can be supported by an axle assembly 182 coupled with the first body rail 124A and/or the second body rail 124B. The axle assembly 182 is an example of a slider assembly that can allow movement of ground contacting components, e.g., the wheels, and other components coupled therewith to move relative to the van assembly 104. As discussed further below in connection with FIG. 8, the axle assembly 182 can include an axle bearing 184 and a suspension system 186. The suspension system 186 can include a leaf-spring 188, an air bag suspension, or another form of a suspension system.

In one arrangement the battery assembly 196A is coupled with the axle assembly 182. The battery assembly 196A can be located in front of an axle supported by the axle bearing 184. A second battery assembly 196B illustrated in FIG. 1 can be provided forward of the axle bearing 184 and also forward of the battery assembly 196A. In another embodiment at least a third and a fourth battery assembly (shown in grey/dashed lines) can be provided forward of the axle bearing 184 and forward of the battery assembly 196B. The cargo trailer assembly 100 can be coupled with more than four battery assemblies depending on the range and route needs.

Figure 9:
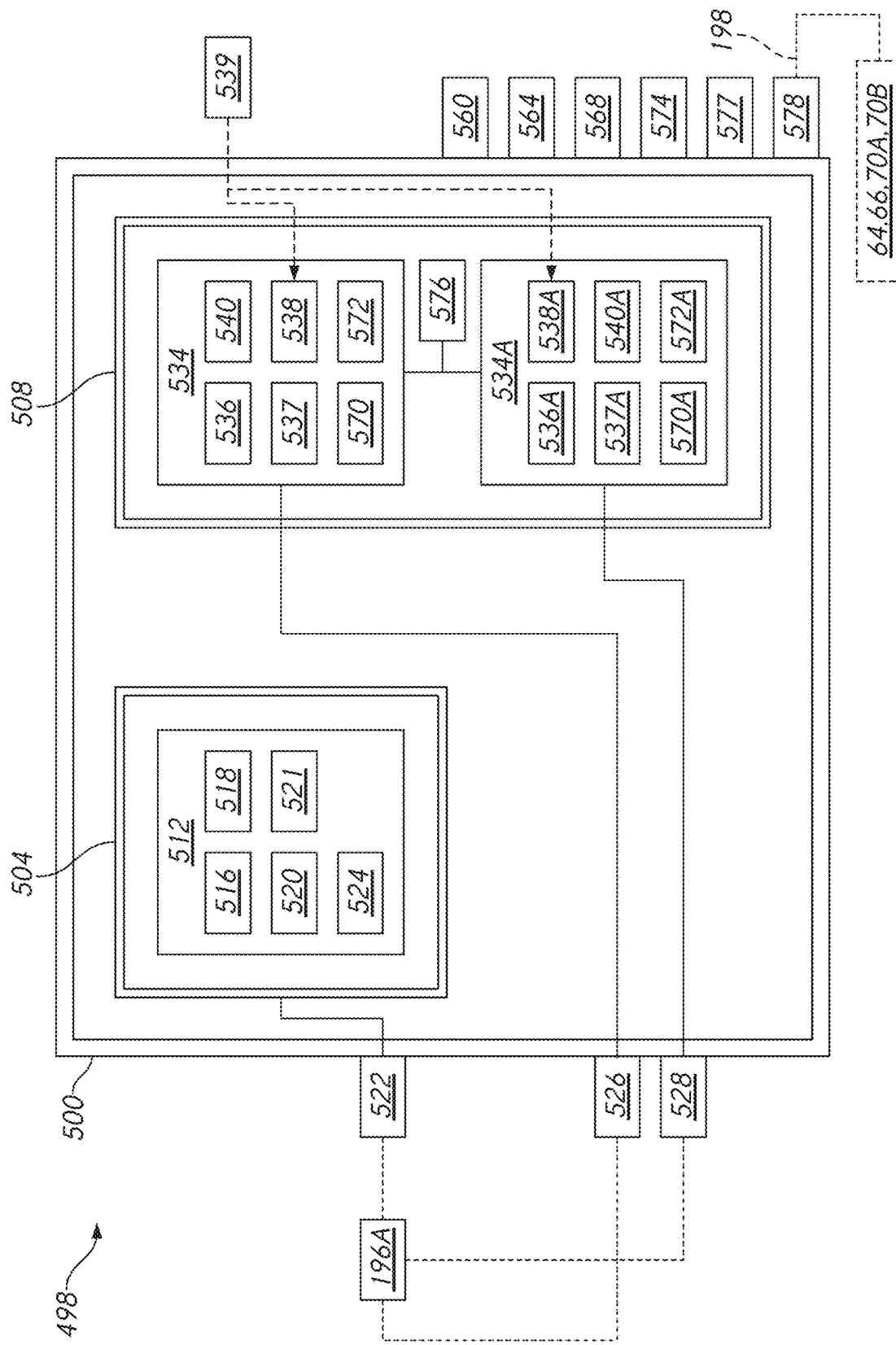
FIG. 9 is a schematic view of components of an embodiment of a trailer mountable power storage and distribution system including an auxiliary component assembly configured to support thermal management and/or electrical communication of power on a tractor-trailer vehicle similar to that of FIG. 1.

The cargo trailer assembly 100 can include an auxiliary component assembly 350. The auxiliary component assembly 350 can be included in a trailer mountable power storage and distribution system 498, discussed below. The auxiliary component assembly 350 can be coupled with the axle assembly 182. The auxiliary component assembly 350 can be disposed rearward of an axle supported by the axle bearing 184. FIG. 9 illustrates the components of the auxiliary component assembly 350 in one embodiment. The auxiliary component assembly 350 includes a junction interface providing one or more junctions for providing electrical connection between components thereof and other components external to the auxiliary component assembly 350 e.g., by way of the high voltage conveyance 198 to electrically connect the auxiliary component assembly 350 with one or more components of the truck 50. For example, the auxiliary component assembly 350 can supply current to a load on the tractor 54 with which the cargo trailer assembly 100 is coupled to form the truck 50. The auxiliary component assembly 350 can be connected at the junction interface to a conveyance coupled with the battery assembly 196A and/or the battery assembly 196B and/or additional battery assemblies (if present). The auxiliary component assembly 350 can include one or more inverters and other circuits for configuring and controlling the distribution of power on the cargo trailer assembly 100 or the tractor 54.

The auxiliary component assembly 350 can export current to other components outside the auxiliary component assembly 350. In one embodiment, the auxiliary component assembly 350 can export current at high voltage to a high voltage load, such as the electric motor 64 on the tractor 54 by way of the high voltage conveyance 198. The auxiliary component assembly 350 can export power to another high voltage load on the truck 50. The auxiliary component assembly 350 can output current at high voltage to a high voltage component disposed on the cargo trailer assembly 100. For example, an opening to the enclosure 112 can be equipped with a liftgate 118 configured to operate on a high voltage current. The control module 110 can include a refrigeration unit configured to operate on a high voltage current. These high voltage components can be powered by way of the auxiliary component assembly 350.

The auxiliary component assembly 350 can include components that consume current at low voltage. For example, some of the components of an electrical circuit system 534 of the auxiliary component assembly 350 (discussed in connection with FIGS. 9 and 10) can consume current at low voltage. The auxiliary component assembly 350 also can export low voltage current to other components. In one embodiment, the auxiliary component assembly 350 includes a junction for outputting low voltage current. The cargo trailer assembly 100 can include one or more lights 119 for lighting the volume 114 within the enclosure 112. The light 119 can be coupled with a low voltage junction 564 on the auxiliary component assembly 350 for receiving current at low voltage. Other low voltage devices that can be mounted on the cargo trailer assembly 100 and coupled with the low voltage junction 564 can include a global positioning system (GPS) locating component 576.

A GPS locating component 576 can be powered by the current from the battery assembly 196A or the battery assembly 196B. The GPS locating component 576 can beneficially enable the electrical circuit system 534 to provide actionable information to a driver in the tractor 54. For example, the electrical circuit system 534 can receive an input from the GPS locating component 576. The GPS locating component input can be used to determine the country, state or province, county, or other jurisdiction where the cargo trailer assembly 100 is located. The GPS locating component 576 can determine that the cargo trailer assembly 100 has crossed from a prior jurisdiction to another (current) jurisdiction. A user interface in the tractor 54 can inform the driver if the current jurisdiction has different regulations than the prior jurisdiction that require adjustment of the operation of the truck 50, e.g., shifting the by movement of the slider assembly 128 relative to the floor structure 108.

Location information can be combined with the status of the truck 50 or the cargo trailer assembly 100 to provide other recommendations to the driver of the truck 50. An information system can also receive inputs that enable the electrical circuit system 534 to determine the weight of the cargo trailer assembly 100 (including any load therein). For example, a pressure sensor can detect pressure in a suspension system, e.g., pressure in an air bag suspension. In another example, a deflection sensor can detect an amount of compression of a spring or shock absorber component. The weight being supported by the suspension can be determined from a pressure sensor input signal or a deflection sensor input signal. From the determination of weight and the location of the vehicle as determined from the input from the GPS locating component 576, the information system can generate a recommended action. A recommended action can include recommending that the driver confirm that a position of the slider assembly 128 to the floor structure 108 of the cargo trailer assembly 100 is compliant with regulations in the current jurisdiction. In another embodiment, a slider position sensor can provide an input indicating the current position of the slider assembly 128 relative to the floor structure 108. The electrical circuit system 534 can receive one or more of the position sensor input, the GPS location input, and the pressure sensor or spring/shock deflection input and can provide a recommendation to the driver of the truck 50 to adjust the position of the slider assembly 128 relative to the floor structure 108 based on the condition of the vehicle and the local regulations for the current location.

Figure 5:
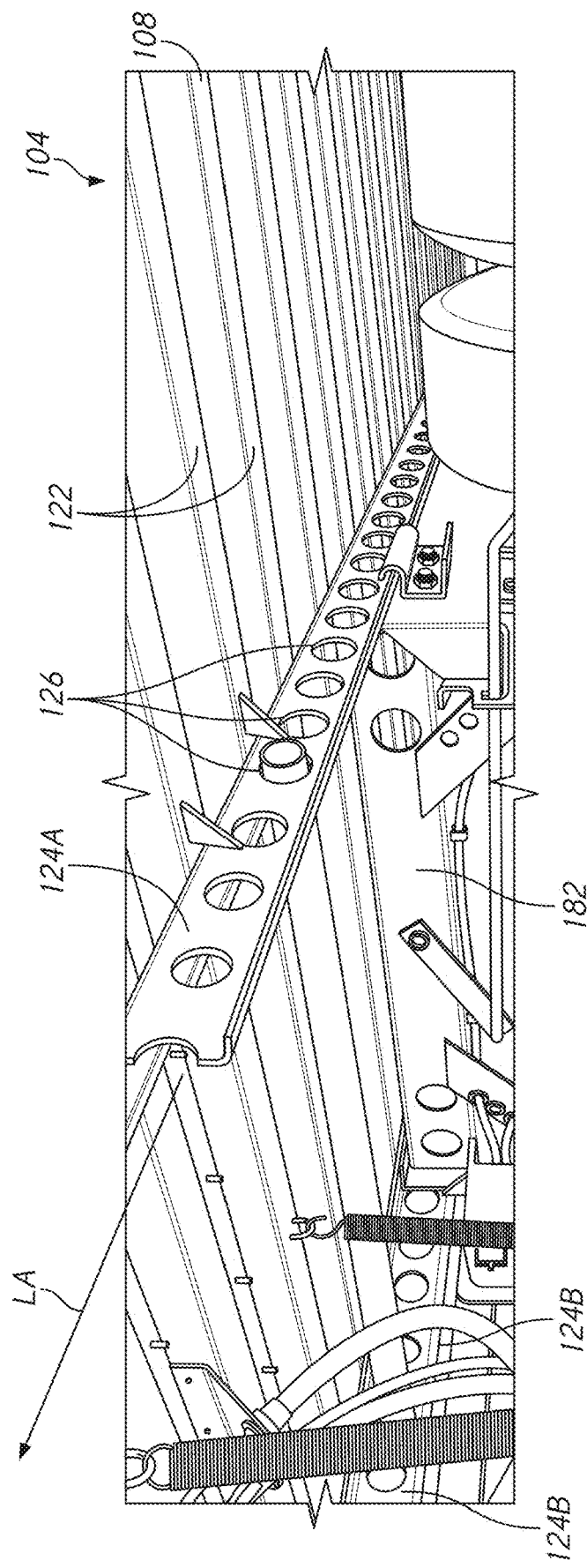
FIG. 5 is a bottom perspective detail view of a portion of a floor structure of a trailer unit assembly illustrating a van assembly including a floor structure and body rails.
Figure 6:
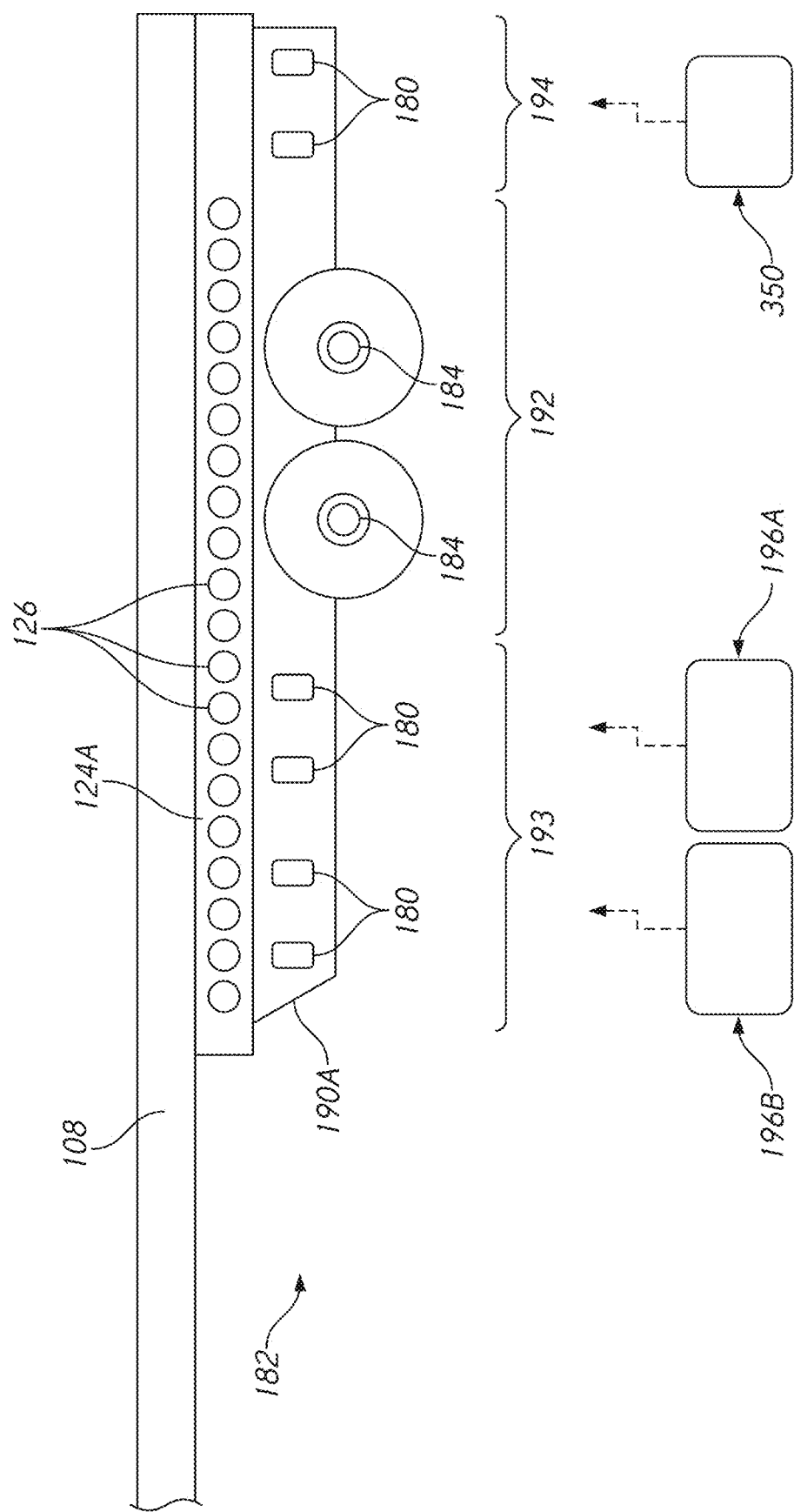
FIG. 6 is a schematic view of a portion of a van assembly illustrating an embodiment in which a slider assembly is configured to be coupled with two battery assemblies and an auxiliary component assembly.
Figure 6A:
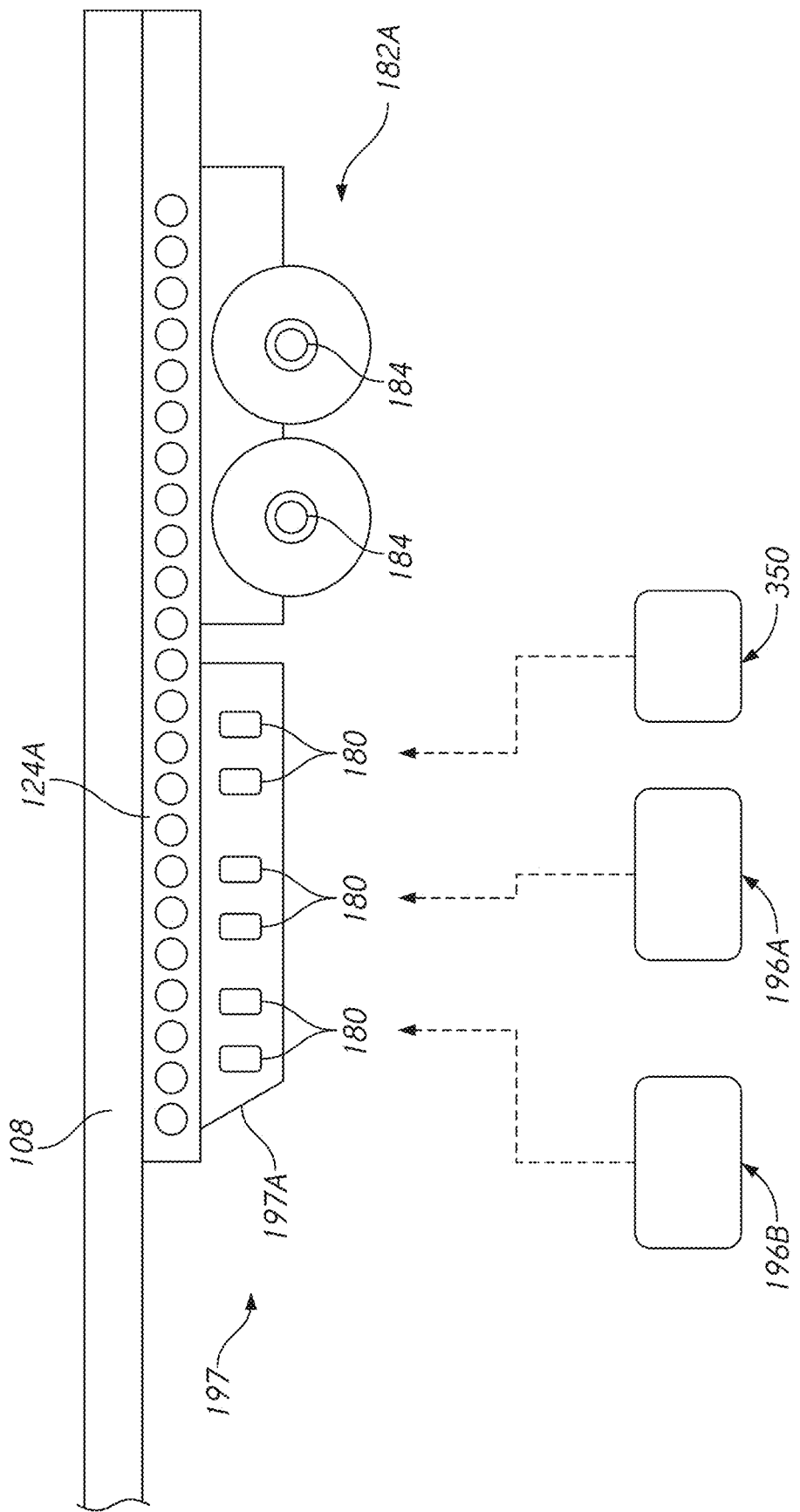
FIG. 6A is a schematic view of another slider assembly allowing relative movement between one or more battery assemblies and wheels of a cargo trailer assembly.

FIGS. 5-6A shows example of how the cargo trailer assembly 100 can be configured to include one or more battery assemblies 196A, 196B and/or an auxiliary component assembly 350. The cargo trailer assembly 100 optionally allows the position of battery assemblies and/or an auxiliary component assembly to be shifted relative to the van assembly 104.

FIG. 5 shows an underside of one embodiment of the van assembly 104 and the floor structure 108 in more detail. In particular the floor structure 108 can include a number of cross-members 122 that can provide support for cargo in the volume 114 of the enclosure 112. The cross-members 122 can be arranged transverse to a longitudinal axis LA of the van assembly 104 or of the cargo trailer assembly 100. The cargo trailer assembly 100 can also include one or more body rails, e.g., a first body rail 124A and a second body rail 124B. The body rails 124A, 124B can extend along the longitudinal axis LA of the cargo trailer assembly 100. The body rails 124A, 124B can extend transverse to the cross-members 122. The body rails 124A, 124B can located below or can extend below the cross-members 122. One or both of the body rails 124A, 124B can include an array of openings 126 disposed in a lengthwise direction thereof. The openings 126 (discussed further in connection with FIGS. 6-7) allow the position of the van assembly 104 to be shifted relative to the wheels of the cargo trailer assembly 100.

FIG. 6 shows an embodiment of the cargo trailer assembly 100 with focus on the structure at and beneath the floor structure 108. The axle assembly 182 is coupled with the floor structure 108. The axle assembly 182 can be configured to be rigidly connected to the floor structure 108 to provide a fixed and constant relative position between the axle assembly 182 and the enclosure 112. In other embodiments the axle assembly 182 can move forward and rearward (fore and aft) relative to the enclosure 112.

Figure 8:
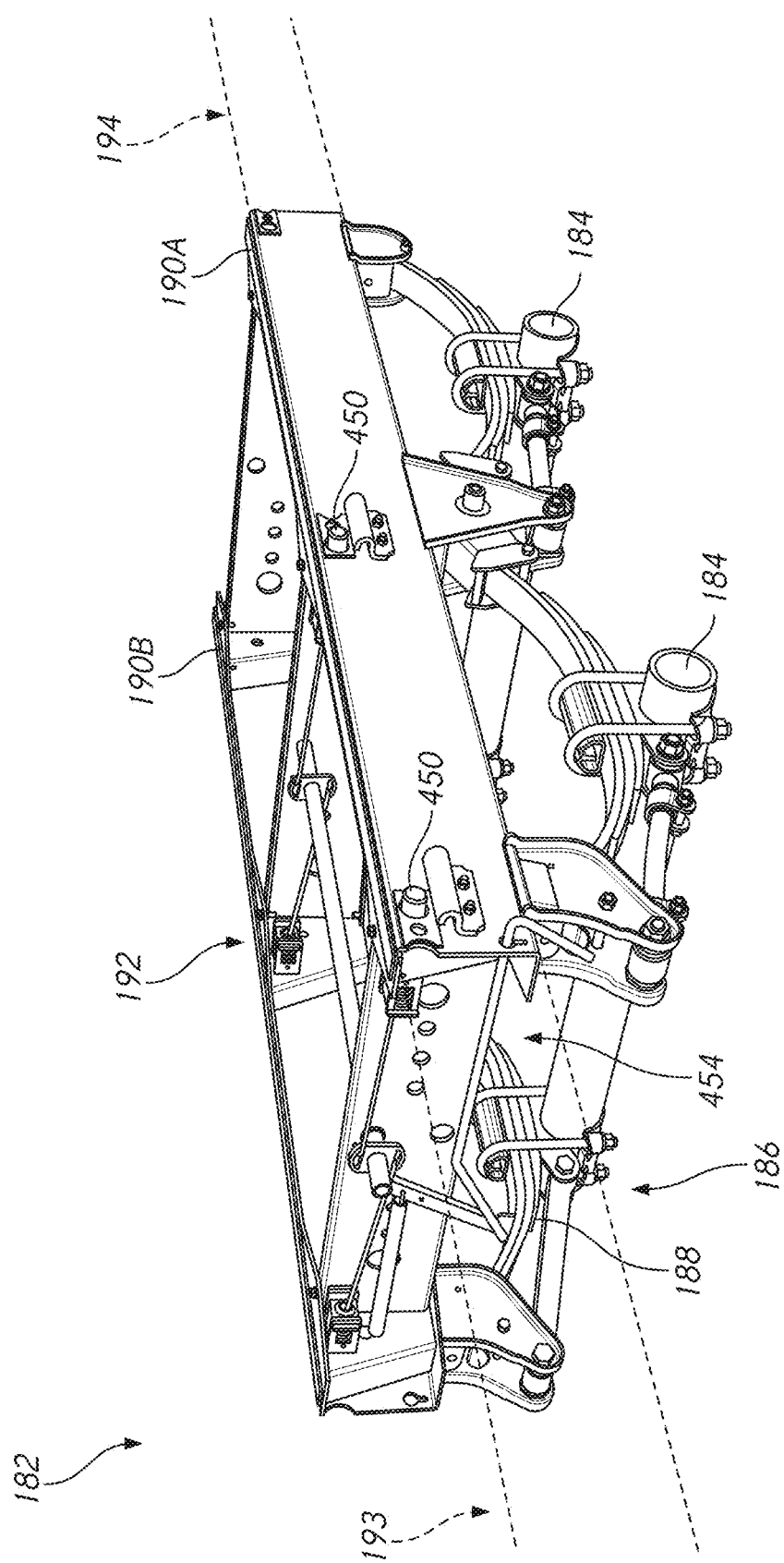
FIG. 8 is a perspective view of an axle assembly, sometimes referred to as a bogie.

In one embodiment the axle assembly 182 includes a first slider rail 190A and a second slider rail 190B (see FIG. 8). The first slider rail 190A and the second slider rail 190B can be slideably coupled with the first body rail 124A and the second body rail 124B respectively to allow the fore-aft position of the floor structure 108 to be adjusted relative to the axle assembly 182. The floor structure 108 can be shifted forward relative to the position of the axle assembly 182. The floor structure 108 can be shifted rearward relative to the position of the axle assembly 182.

FIG. 8 shows an example of a mechanism for allowing or preventing movement of the floor structure 108 relative to the axle assembly 182. The axle assembly 182 includes a stop member 450 coupled with one or both of the first slider rail 190A and the second slider rail 190B. The stop member 450 can be extended away from, e.g., transverse to, the longitudinal axis LA of the cargo trailer assembly 100 to cause each of the stop member 450 to engage at least one of the openings 126 in at least one of the first body rail 124A and the second body rail 124B. The stop member 450 can be retracted toward, e.g., transverse to, the longitudinal axis LA by operation of the actuator 454. The actuator 454 can enable remote actuation, as discussed further below.

FIG. 6 shows further details of the axle assembly 182, which includes axle bearings 184 rotatably supporting axles coupled with wheels. The first slider rail 190A includes a first portion 192, a second portion 193 configured to be disposed forward of the first portion 192. The first slider rail 190A includes a third portion 194 configured to be disposed rearward of the first portion 192. The first portion 192 comprises a portion of the first slider rail 190A along which the axle bearings 184 (and axles and wheels supported thereby) are disposed and supported. The second portion 193 is a forward extension of sufficient length to enable coupling with one of the battery assemblies 196A, 196B, e.g., by way of two or more frame member brackets 180. The second portion 193 can have a length of about three feet to about nine feet, about three feet to about twelve feet, about three feet to about sixteen feet, about three feet to about twenty feet, about five feet, about nine feet, about twelve fee, about sixteen feet, or about twenty feet in various embodiments.

FIG. 6 shows one embodiment in which the second portion 193 is coupled with two sets of two frame member brackets 180. The second portion 193 of the second slider rail 190B also can be configured to have two sets of two frame member bracket 180 coupled with a portion thereof disposed forward of the location of the axle bearing 184 coupled therewith. The battery assembly 196A can be configured to mate with the frame member brackets 180 disposed closest to the axle bearing 184, e.g., at a rearward position of the second portion 193. The battery assembly 196B can be configured to mate with the frame member brackets 180 disposed forward of the rearward position of the second portion 193. The battery assembly 196B can be couple with frame member bracket 180 disposed adjacent to the forward end of the first slider rail 190A.

As discussed above in connection with FIG. 4 the cargo trailer assembly 100 can include the capability to support more than two battery assemblies. FIG. 4 illustrates the ability to support four battery assemblies. The second portion 193 of the first slider rail 190A and the second slider rail 190B would be further extended to enable support of more than two battery assemblies. In one embodiment illustrated by FIGS. 4 and 6, four sets of frame member brackets 180 (e.g., eight brackets) can be disposed along the second portion 193 of the slider rails 190A, 190B forward of the axle bearings 184.

The third portion 194 of the first slider rail 190A (and a corresponding portion of third portion of the second slider rail 190B) can also be extended by a sufficient amount to allow the auxiliary component assembly 350 to be supported thereon rearward of the axle bearing 184. The third portion 194 can have a length of about two feet to about five feet in various embodiments. The third portion 194 can be configured to couple with one, two, or more than two frame member bracket 180. The third portion 194 can have two frame member brackets 180 coupled therewith, the frame member brackets being configured to support the auxiliary component assembly 350. The auxiliary component assembly 350 can have an underslung configuration whereby a first lateral portion is coupled with an outside surface of the third portion 194 of the first slider rail 190A and a second lateral portion is coupled with an outside surface of the second slider rail 190B across the longitudinal axis LA of the cargo trailer assembly 100. A central portion of the auxiliary component assembly 350 can be coupled with first and second lateral portions. The lateral portions and central portion can be defined by a frame member 500 (shown schematically in FIG. 9). One or a plurality of components can be coupled with the frame member 500 as discussed further below. Components of the auxiliary component assembly 350 can be enclosed in a housing coupled with the frame 500. The housing can couple to the first slider rail 190A and/or the second slider rail 190B by way of a mount system that includes one or more vibration isolating components. One or both of the first vibration isolator 264 and the first vibration isolator 268 (discussed below in connection with the battery assembly 196A) can be provided between the auxiliary component assembly 350 and the chassis 120 of the cargo trailer assembly 100.

The foregoing bracket structure enables the battery assembly 196A, battery assembly 196B and the auxiliary component assembly 350 to be upfitted to the axle assembly 182 to be coupled with the first slider rail 190A, second slider rail 190B. FIG. 6 illustrates upfitting by dashed line arrows and in general entails raising these components or modules from below the fully assembled trailer unit to couple the components/modules on an as needed basis. The array of frame member brackets 180 and the length of the second portion 193 allow the number of battery assemblies coupled with the axle assembly 182 to be determined for a particular use of the cargo trailer assembly 100 and even for each route contemplated to be taken by the truck 50 incorporating the cargo trailer assembly 100.

The frame member bracket 180 can be of the same configuration as the frame member bracket 74. In one embodiment of the cargo trailer assembly 100 the frame member bracket 180 are of the same design for supporting the battery assembly 196A, the battery assembly 196B and the auxiliary component assembly 350. The frame member bracket 180 are configured to mate with housing brackets of the battery assemblies discussed further below. In some embodiments, the auxiliary component assembly 350 are supported by modified brackets that can be lighter duty to support less weight than the brackets for the battery assemblies where the overall weight of the auxiliary component assembly 350 is less than that of the battery assemblies. The frame member bracket used for the auxiliary component assembly 350 preferably include one or more vibration isolating or damping components to enhance the service life of electrical components disposed therein. Vibration isolating or damping components can enhance the service life of mechanical components disposed in the auxiliary component assembly 350. The frame member bracket preferably facilitate removing the auxiliary component assembly 350 as a unit for service, repair or replacement. The frame member bracket for the auxiliary component assembly 350 can be relatively accessible, for example where the auxiliary component assembly and one or more or all of the frame member bracket are not enclosed in additional housings but are directly coupled to chassis structures of the cargo trailer assembly 100.

The axle assembly 182 supports the axle bearing 184, the battery assembly 196A and the battery assembly 196B (and additional battery assemblies if present) and the auxiliary component assembly 350 as a unit. The unit can be displaced relative to the floor structure 108 and the portion of the van assembly 104 coupled therewith either before or after upfitting the battery assemblies and the auxiliary component assembly 350.

FIG. 6A shows an embodiment in which an axle assembly 182A and a battery slider assembly 197 are provided. The battery slider assembly 197 is configured to be supported by one of both of the first body rail 124A and the second body rail 124B. The battery slider assembly 197 is configured to support battery assemblies (e.g., the battery assembly 196A, battery assembly 196B and other additional battery assemblies if needed). The auxiliary component assembly 350 also can be coupled with the battery slider assembly 197. One, more than one or all of the battery assembly 196A, battery assembly 196B, and auxiliary component assembly 350 can be coupled with one or both of the first body rail 124A and the second body rail 124B by coupling housing brackets thereof with frame member brackets 180 coupled with a slider rail 197A. The battery slider assembly 197 can include two or more slider rails, similar to the axle assembly 182. The battery slider assembly 197 is a slider assembly that allows the position of the battery assemblies and auxiliary component assembly to be selected independently of the relative position of the relative positioning of the van assembly 104 relative to the wheels coupled with the axle bearing 184. This can allow the weight balance to be adjusted as needed, e.g., allowing the wheel base to be selected and thereafter allowing the weight distribution to be separately adjusted by moving the weight of the battery slider assembly 197 relative to the wheels and axles coupled with the axle bearing 184.

FIGS. 6 and 6A can be used to position components of the cargo trailer assembly 100 for particular applications. The floor structure 108, the first body rail 124A, and the second body rail 124B can be coupled as a unit. The axle assembly 182 can be slideably connected to the body rails 124A, 124B. The power needs of the truck 50 in which the cargo trailer assembly 100 is to be used can be considered. In some routes it may be beneficial to provide one, two or more battery assemblies 196A, 196B. In one case the battery assembly 196A are longitudinally aligned with a set of (e.g., two) frame member brackets 180 disposed on each of the outer sides of the first slider rail 190A and the second slider rail 190B. The first slider rail 190A and the second slider rail 190B can be longitudinally extended from a portion of the rails disposed above the axle bearing 184. The second portion 193 of the first slider rail 190A can be spaced laterally from the central axis of the cargo trailer assembly 100 by the same amount as the first portion 192 of the first slider rail 190A. This spacing can allow a wide configuration of the battery assemblies 196A, 196B. In another embodiment the second portion 193 can be located closer to the central axis of the cargo trailer assembly 100 than is the first portion 192 providing a narrower profile in the second portion 193. In one variation the first slider rail 190A and the second slider rail 190B are symmetrical about the central axis of the cargo trailer assembly 100. In another variation one of the first slider rail 190A and the second slider rail 190B provides the second portion 193 aligned with the first portion 192 (e.g., spaced by the same amount from the central axis of the cargo trailer assembly 100) and another one of the first slider rail 190A and the second slider rail 190B provides the second portion 193 disposed closer to the central axis of the cargo trailer assembly 100 than is the first portion 192. The second portion 193 can even overlap to at least some extent with the first portion 192 along the longitudinal axis LA.

In another variation, one or more components of a trailer mounted power storage and distribution system can be disposed adjacent to or between axles of cargo trailer assembly. For example, one or more battery assembly similar to the battery assembly 196A could be placed in the first portion 192 first slider rail 190A and the second slider rail 190B, e.g., between the axle assemblies 182. In another embodiment, the auxiliary component assembly 350 can be disposed in the first portion 192 first slider rail 190A and the second slider rail 190B, e.g., between the axle bearings 184. In other variations, a battery assembly can be placed between the axle bearings 184 and in the second portion 193 of the first slider rail 190A and second slider rail 190B. In other variations, a battery assembly and the auxiliary component assembly can be placed between the axle bearings 184 and, optionally, also in the second portion 193 and the third portion 194.

After the frame member brackets 180 have been connected to the second portion 193 of the axle assembly 182 the battery assembly 196A and the battery assembly 196B can be upfitted to the brackets, as indicated by the dashed arrows. The upfitted configuration allows the self-contained battery assemblies 196A, 196B to be underslung beneath the axle assembly 182 and/or the battery slider assembly 197. The underslung nature allows lateral outward battery unit containing portions of the battery assembly 196A and battery assembly 196B to be disposed laterally outward of the outside surface of the first slider rail 190A and the second slider rail 190B. Also, the underslung nature allows battery units to be stored in a central portion disposed between the lateral outward portions. The construction of one embodiment of the battery assembly 196A and the battery assembly 196B is discussed below in greater depth in connection with FIG. 7.

FIG. 6 also shows that the auxiliary component assembly 350 can be upfitted to the axle assembly 182 in the third portion 194 of the first slider rail 190A and the second slider rail 190B as indicated by the dashed arrow. The auxiliary component assembly 350 can be upfitted rearward of the wheels coupled with an axle supported by the axle bearing 184. Upfitting the auxiliary component assembly 350 can be accomplished in a similar manner to the upfitting of the battery assembly 196A and the battery assembly 196B. The auxiliary component assembly 350 can be structured similar to the battery assembly 196A and the battery assembly 196B. For example, the auxiliary component assembly 350 can include a first laterally outward portion configured to couple with the frame member bracket 180 disposed on the first slider rail 190A outward thereof and a second laterally outward portion configured to couple with the frame member bracket 180 disposed on the second slider rail 190B outward thereof.

After the battery assemblies 196A, 196B and the auxiliary component assembly 350 have been upfitted or otherwise coupled to the axle assembly 182, relative movement between the van assembly 104 and the axle assembly can be provided to achieve a desired relative position. The desired relative position can be based on the weight distribution of the van assembly 104 and the load therein over and wheels coupled with the axle bearing 184. The desired relative position can be based on shortening the wheel-base to adjust the turning radius of the vehicle as needed.

FIG. 6A enables upfitting one or both of the battery assembly 196A and battery assembly 196B to the battery slider assembly 197 as indicated by the dashed arrows. The auxiliary component assembly 350 can optionally also be upfitted as indicated by the dashed arrow. In some applications components can optionally be placed in the control module 110 such that the auxiliary component assembly 350 is not present. The control module 110 and the auxiliary component assembly 350 can both be present in some applications. After the battery assembly or assemblies and the auxiliary component assembly are coupled with the battery slider assembly 197, the relative position of the battery slider assembly 197 can be adjusted along the floor structure 108 by sliding relative to the first body rail 124A, second body rail 124B. The movement of the battery slider assembly 197 can be completed prior to or subsequent to movement of an axle assembly 182A. If the axle assembly 182A is moveable relative to the first body rail 124A and the second body rail 124B multiple sets of stops members can be provided.

Figure 7:
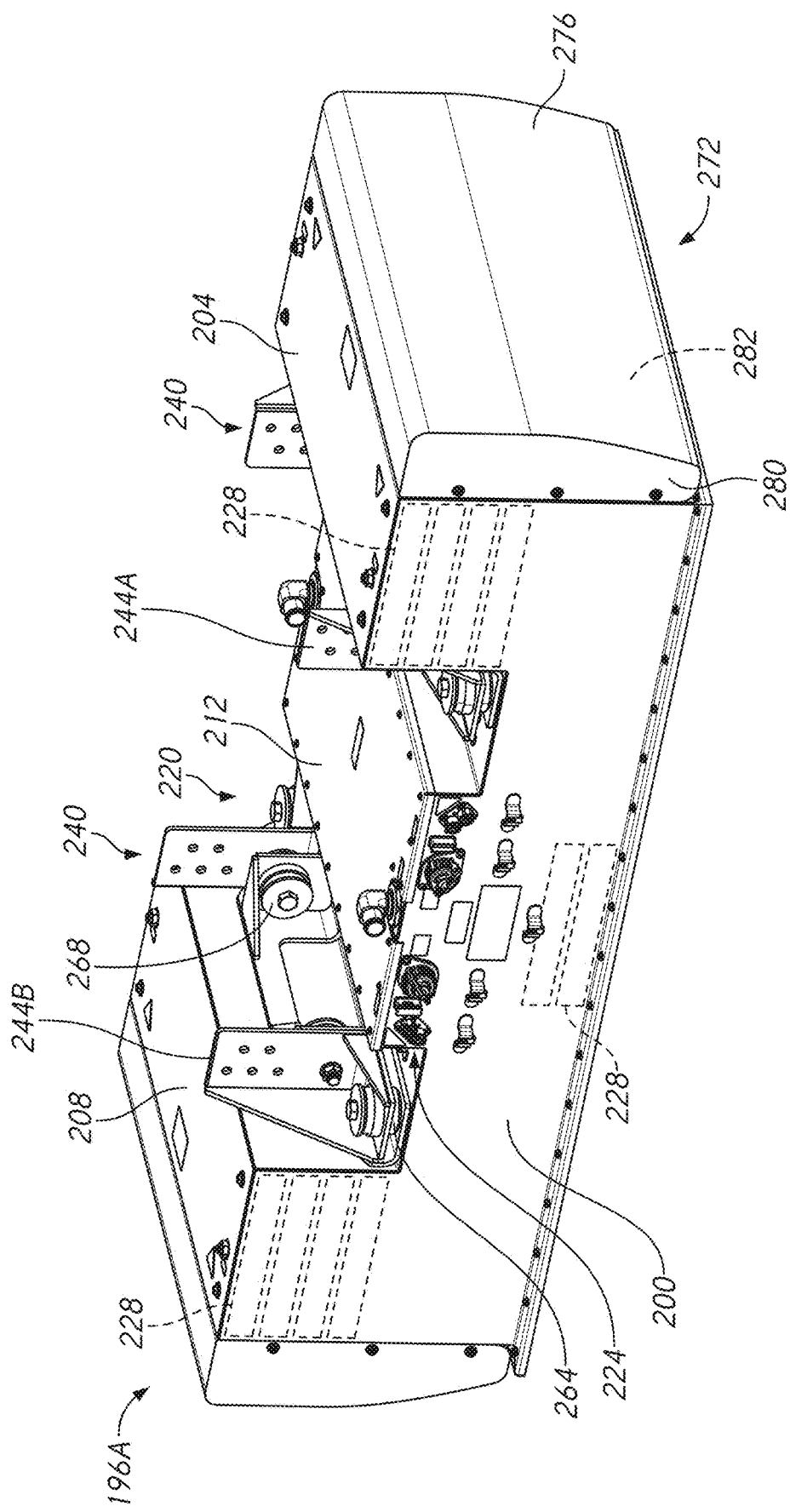
FIG. 7 is a perspective view of a battery assembly configured to be mounted to the cargo trailer assembly of FIG. 1.

FIG. 7 shows one embodiment of the battery assembly 196A discussed above. The battery assembly 196A and the battery assembly 196B can have the same configuration so only the battery assembly 196A will be described. The battery assembly 196A can include a housing 200 that encloses a space within and between a first lateral portion 204 and a second lateral portion 208. The battery assembly 196A includes a central portion 212 disposed between the first lateral portion 204 and the second lateral portion 208. The lower sides of the housing 200 between lateral sides of the housing 200 can be flat or planar. The upper side of the housing 200 can have multiple heights between the lateral sides of the housing. The first lateral portion 204 and the second lateral portion 208 can extend further away from the lower side than portions of the housing 200 therebeween. The first lateral portion 204 and the second lateral portion 208 can house a plurality of battery units 228. The first lateral portion 204 and the second lateral portion 208 can house cooling structures, e.g., liquid cooling conduits and heat sinks to maintain the thermal state of the battery units 228. The central portion 212 can include a portion on the top side of the housing 200 that also projects upward relative to adjacent portions to the top side. The projecting portion can include a space for one or more battery units 228 and can include connections for coolant conduits as well as electrical power conveyances. The projecting portion of the central portion 212 can extend upward by an amount less than the first lateral portion 204 and the second lateral portion 208 or can extend by the same or by a greater extent than the lateral portions.

The top side of the housing 200 can include one or more recesses 220. In particular the recess 220 can include an upwardly oriented recess 224 disposed between a raised central portion of the top side of the housing 200 and the first lateral portion 204 and the second lateral portion 208. The upwardly oriented recess 224 extends from a front side of the housing 200 to a rear side thereof. The upwardly oriented recesses 224 are configured to house a mount system 240. The mount system 240 includes a plurality of housing brackets 244 configured to mate with the frame member brackets 180. A plurality of housing bracket 244 can be disposed in each of two upwardly oriented recesses 224. The recesses 224 can be sized to allow the first slider rail 190A to be partly disposed therein and mounted to first housing brackets 244A along an inner surface of the first lateral portion 204. The recesses 224 can be sized to allow the second slider rail 190B to be partly disposed therein and mounted to second housing brackets 244B along an inner surface of the second lateral portion 208.

The mount system 240 can include a load member 248, a first portion 252 and a second portion 256. The mount system 240 can include an isolator support portion 260 and a first vibration isolator 264 configured to reduce vertical load transmission from the frame member of the vehicle to the housing. The mount system 240 can include a second vibration isolator 268 disposed between the load member and the housing bracket 244. The second vibration isolator 268 is configured to reduce horizontal load transmission from the frame member of the vehicle to the housing. Additional details of the mount system 240 are discussed in the Appendix.

The battery assembly 196A can include a crash protection component 272. The crash protection component 272 can include an enclosure 276 enclosing a space therein, the enclosure 276 configured to be coupled with a mounting bracket assembly 280. The enclosure 276 can enclose a crumple member 282 disposed therein. The crumple member can be configured to collapse upon application of a load of a certain type. For example, a side impact can cause the crumple member to absorb at least some of the energy of the impact by being crushed or collapsing upon itself.

In one embodiment, the crumple member 282 includes a honeycomb structure that has high strength in some directions, e.g., in a vertical direction or in a horizontal direction. The crumple member can be creased, pre-crumped, or non-uniformly weakened to some extent such that the collapse of the structure is predictable or planned or is in a manner that is preferred. The honeycomb structure can be aligned in a vertical direction. For example, the longitudinal axes of the honeycomb structures can be aligned with the vertical direction. The honeycomb structure can be aligned in a horizontal direction. For example, the longitudinal axes of the honeycomb structures can be aligned with the horizontal direction. The honeycomb structures will collapse inwardly or transverse to the longitudinal axes thereof upon a side load above a threshold consistent with a side impact. The mounting bracket assembly 280 can include a bracket member configured to mount directly to the housing 200 while maintaining ingress protection against water. The mounting bracket assembly 280 can allow for fasteners to extend therethrough and into the housing 200 and can also include openings for fasteners disposed parallel to the laterally outer side of the first lateral portion 204 and the second lateral portion 208. Such fastener openings can be configured as blind holes for fasteners disposed along an axis parallel to the outer surface of the first lateral portion 204 or second lateral portion 208.

The crash protection component 272 can be configured with flat lateral sides. The lateral sides can be curved as viewed from a front or rear side, e.g., can extend along a convex outer curve from a top portion to a bottom portion thereof. The crash protection component 272 can be configured to extend close to a bottom surface of the floor structure 108 to provide a smooth continuation of the external surface of the trailer unit 58.

FIG. 8 illustrates one embodiment of a subassembly of the axle assembly 182. The axle assembly 182 is one example of a slider assembly. The axle assembly 182 when fully assembled with wheels is a modification of a structure sometimes known as a bogie. The axle assembly 182 includes axle bearings 184. In the illustrated embodiment the axle assembly 182 includes four axle bearings 184 (two per axle) supporting multiple sets of wheels. The axle assembly 182 and the suspension system 186 which can include the leaf-spring 188 can be disposed in the first portions 192 of the first slider rail 190A and the second slider rail 190B. Transverse frame members extend between the first slider rail 190A and the second slider rail 190B to provide a rigid frame structure. Dashed lines show the second portion 193 disposed forward of the first portion 192 coupled with the wheels. As discussed above, the second portion 193 can extend forwardly from the first portion 192. A continuous outside surface of the first portion 192 to the second portion 193 can allow for greater volume in the housing 200 for battery units 228. Dashed lines show the third portion 194 extending rearward from the first portion 192. The third portion 194 can extend from the outer surface of the first portion 192, e.g., a continuous surface from the first portion 192 to the third portion 194. The lateral outside surface of the second portion 193 and the third portion 194 can be disposed closer the central axis of the axle assembly 182 than is the lateral outside surface of the first portion 192 of the first slider rail 190A. The second portion 193 can be a separate rail of the axle assembly 182 from the first portion 192 such that the portions 192, 193 can even overlap in the longitudinal axis LA of the cargo trailer assembly 100.

The stop member 450 of the axle assembly 182 is configured to allow and to prevent relative movement of the first slider rail 190A and the second slider rail 190B along the first body rail 124A and the second body rail 124B. The stop member 450 can be extended out of the lateral outer surface of the first slider rail 190A and the second slider rail 190B. The stop member 450 can be retracted from the first slider rail 190A and the second slider rail 190B to a position closer to a central portion of the axle assembly 182 along the longitudinal axis LA than is the extended position. The retracted position is one which the stop member 450 does not block movement of the first body rail 124A or the second body rail 124B.

Movement of the stop member 450 can be provided by an actuator 454. The actuator 454 can include a hand operated mechanism. The actuator 454 can include a crank member that can pivot an axle coupled with the stop member 450. The actuator 454 can be accessible from beneath the floor structure 108 of the van assembly 104. In one variation, the actuator 454 can be operated remotely by a stop actuator motor 572 or electrically driven actuator as discussed further below. In another variation, the actuator 454 comprises a pneumatic actuator that employs compressed air or other gas to drive the stop member 450. A switch in the cab 60 of the tractor 54 triggers remote actuation in one embodiment.

FIG. 9 schematically illustrates components that can be integrated into one embodiment of the auxiliary component assembly 350. As discussed above, the auxiliary component assembly 350 can be configured to be upfitted and in some cases underslung beneath the van assembly 104. The auxiliary component assembly 350 can include a frame arrangement 500. The frame arrangement 500 can be disposed in one or more housings to protect electronic components of the auxiliary component assembly 350. The frame arrangement 500 can include a generally horizontal structure, e.g., including one or more horizontal trays to support components in one or more generally horizontal arrangements. The frame arrangement 500 can have a vertical structure in which components are spaced apart vertically. The frame arrangement 500 can be configured as a single unit to mount to a truck 50. The frame arrangement 500 can include first and second portions that can be mounted to the truck 50 remotely or separately. For example, some components of the auxiliary component assembly 350 can be disposed in the control module 110 and/or in the power distribution module 66. Also, some components of the power distribution module 66 and/or the control module 110 can be disposed in the auxiliary component assembly 350.

The frame 500 can include a first component module 504 and a second component module 508. The first component module 504 can include components focused on managing the thermal behavior of one or more components of the truck 50, e.g., a component mounted to the cargo trailer assembly 100 or to the tractor 54. The first component module 504 can include a thermal management system 512.

The thermal management system 512 can include a heater 516, a chiller 518, and a condenser 520 in one embodiment. The heater 516 can add heat to a component such as one or more of the battery assemblies 196A, 196B to improve performance in cold environments. The chiller 518 and the condenser 520 can combine to remove heat from a component, e.g., from one or more of the battery assemblies 196A, 196B to improve performance in hot environments and/or to remove heat generated by the operation of the battery units 228 disposed therein. The thermal management system 512 can include a radiator 521 to remove heat from the thermal management fluid. The thermal management system 512 can communicate with other components via a thermal system junction 522. The thermal system junction 522 can enable connection of one or more coolant hoses to circulate coolant between the first component module 504 and one or more components to be thermally managed. The thermal system junction 522 can include a return side connection to receive a thermal management fluid from a component that generates heat and is to be cooled or that is warmed by the thermal management fluid. The thermal system junction 522 can include a supply side connection to output thermal management fluid to a component to be cooled or heated in a cold environment. The thermal management system 512 can include a pump 524 to cause thermal management fluid to flow through the supply side and the return connections and through conduit disposed therebetween.

The second component module 508 can be disposed in a separate area of the frame 500 from the first component module 504. The first component module 504 and the second component module 508 can be mounted on separate trays of the frame 500, one disposed generally above the other. In some configurations the first component module 504 and the second component module 508 are intermingled on the frame 500 with their position selected at least partially to enhance compactness. The second component module 508 can include an electrical circuit system 534. The electrical circuit system 534 can be configured to control the electrical operation of one or more components of the truck 50, e.g., an electric powertrain component of the tractor 54 or the cargo trailer assembly 100. The electrical circuit system 534 can include a power distribution unit 536. The power distribution unit 536 can include circuits that distribute current supplied from any of the battery assemblies 196A, 196B and in some cases the battery assemblies 70A, 70B to the vehicle. The power distribution unit 536 can also control the flow of current to these battery assemblies to replenish the stored power therein. The power distribution unit 536 can also direct current to one or more loads, e.g., to power consuming component in the auxiliary component assembly 350, to the electric motor 64 of the tractor 54 or to a low or a high voltage component of the cargo trailer assembly 100.

The electrical circuit system 534 can include a charge circuit 537 configured to receive power from an external charger. In one configuration, the charge circuit 537 can receive and process current from a low voltage AC source or a high voltage DC source. The charge circuit 537 can be operationally coupled with a user interface component 574 configured to convey the charge status of one or more of the battery units 228 and/or of one or more of the battery assembly 196A, the battery assembly 196B, and/or additional battery assemblies. The user interface component 574 can include an array of lights conveying a percentage or status of charge. The user interface component 574 can output one or more numbers conveying a percentage or status of charge. The user interface component 574 can output one or more audible messages conveying a percentage or status of charge. The user interface component 574 can output an indication that the cargo trailer assembly 100 is coupled with an external charge component, such as mechanically by way of the high voltage junction 560 and/or the low voltage junction 564. The indication can warn an operator of the tractor 54 to which the cargo trailer assembly 100 is to be coupled not to drive away prior to disconnecting the external charge component from the high voltage junction 560 or the low voltage junction 564.

FIGS. 1, 4, and 9 show various locations for the user interface component 574. The user interface component 574 can include a display mounted on a forward facing side of the enclosure 112 of the cargo trailer assembly 100. The user interface component 574 can include a display mounted on a driver side of the enclosure 112 of the cargo trailer assembly 100. The user interface component 574 can integrated into the control module 110 disposed on or mounted to the forward side of the cargo trailer assembly 100. The user interface component 574 can be disposed on a forward or lateral side of the control module 110. In some example, multiple user interface components 574 can be provided, e.g., one near the front of the cargo trailer assembly 100 and one near the high voltage junction 560 or low voltage junction 564 if these junctions are spaced away from the front of the cargo trailer assembly 100. The user interface component 574 can be provided on or near a frame 500 of the auxiliary component assembly 350, which can be mounted rearward o the rear axle of the cargo trailer assembly 100.

The auxiliary component assembly 350 can have one or more electrical junctions to facilitate the flow of power to and from the battery assemblies on the truck 50, e.g., on the cargo trailer assembly 100. The auxiliary component assembly 350 can include a trailer high voltage junction 526 that can be coupled with the high voltage conveyance 198, e.g. with the trailer side conveyance 198A, or with another high voltage conveyance disposed between one or more of the battery assembly 196A, battery assembly 196B and the auxiliary component assembly 350. The auxiliary component assembly 350 can include a redundant trailer high voltage junction 528 that can enable one or a plurality of battery units or battery assembly to operate independently. The auxiliary component assembly 350 also can include a high voltage junction 560 can also connect to a high voltage load on the cargo trailer assembly 100 such as the liftgate 118. The auxiliary component assembly 350 can include a low voltage junction 564 configured to be coupled with a low voltage conveyance coupled with a low voltage load on the cargo trailer assembly 100, such as the lights 119. In some applications the liftgate 118 is a low voltage component that can be coupled with the low voltage junction 564. In some embodiments, the control module 110 is connected to one or both of the high voltage junction 560 and the low voltage junction 564 to power loads incorporated therein or supported thereby.

As discussed above, the cargo trailer assembly 100 can have a range extender component configured to replenish the stored power in the battery assembly 196A and/or the battery assembly 196B. The range extender component can include the solar cells 116. The solar cells 116 can coupled with the auxiliary component assembly 350 via a power generation junction 568. The power generation junction 568 can allow current from the solar cells 116 to flow through a conveyance between the cells and the auxiliary component assembly 350 and to be processed and routed therein. For example, in some applications, the auxiliary component assembly 350 includes one or more inverter 540 configured to reconfigure the current derived by the solar cell 116 for storage in the battery assembly 196A and/or the battery assembly 196B. If the range extender components comprise a fuel cell and/or a motor driven generator the power generation junction 568 can be coupled with such component(s) to receive the current generated thereby.

The cargo trailer assembly 100 can be configured for stationary external recharging in addition to charging through a range extender component. The cargo trailer assembly 100 can include a receiving inductive coil circuit 538 that is configured to generate current when in the presence of a sending inductive coil circuit 539 to facilitate wireless charging. The sending inductive coil circuit 539 can be integrated into a loading dock or parking zones of a trailer fleet storage facility. The high voltage junction 560 and the low voltage junction 564 also can be used to recharge the battery assemblies 196A, 196B by connecting a high voltage or a low voltage cable to these junctions e.g., via junction sockets. In some embodiments, the auxiliary component assembly 350 includes dedicated trailer high voltage junction 526, 528 for connecting to the battery assembly 196A, battery assembly 196B.

FIG. 9 illustrates that one or more components of the electrical circuit system 534, including all of the circuits in the electrical circuit system 534 can be duplicated so that the control of power to and from one or more of the battery assemblies 196A, 196B (or from subsets of battery units 228 therein) can be operated independently. By providing independent operation, the truck 50 can operate on a subset of battery units 228 (e.g., part of one of the battery assembly 196A and the battery assembly 196B or only one of the battery assembly 196A or battery assembly 196B). In one implementation, each of the components of the electrical circuit system 534 is duplicated in a parallel electrical circuit system 534A. In one arrangement, the electrical circuit system 534 can be electrically coupled to the battery assembly 70A via a first set of sockets of the high voltage junction 560 and the electrical circuit system 534A can be electrically coupled to the battery assembly 70B via a second set of sockets of the high voltage junction 560. In another arrangement, the electrical circuit system 534 can be electrically coupled to a first subset of the battery units 228 of the battery assembly 70A via a first set of sockets of the high voltage junction 560 and the electrical circuit system 534A can be electrically coupled to a second subset of the battery units 228 of the battery assembly 70B via a second set of sockets of the high voltage junction 560. Each of the electrical circuit system 534 and the electrical circuit system 534A can include a derate circuit 570, 570A configured to modulate power flowing through a particular system. In one example, the power can flowing through a system can modulated to deliver the power in a more range efficient manner. For example, the maximum acceleration and/or maximum speed can be regulated to prevent an operator from operating the truck 50 to inefficiently consume power given the mass being carried by the truck 50, the route and access to recharge facilities available to the truck 50 along its route, and other factors affecting consumption of power. In another example, if a condition is detected that could lead to a breakaway the power flowing through the system can be reduced or even eliminated such that driver controlled movement of the tractor 54 can be reduced or even prevented. For example if an impending break-away event is sensed, detected or determined to be imminent, the derate circuits 570, 570A can prevent the tractor 54 from accelerating even if an acceleration pedal in the cab 60 is depressed. These are non-limiting examples of actions that the derate circuit 570, derate circuit 570A can provide or control. These are some non-limiting examples of components that can be included in the auxiliary component assembly 350, e.g. in thermal management system 512 and the electrical circuit system 534.

Figure 9A:
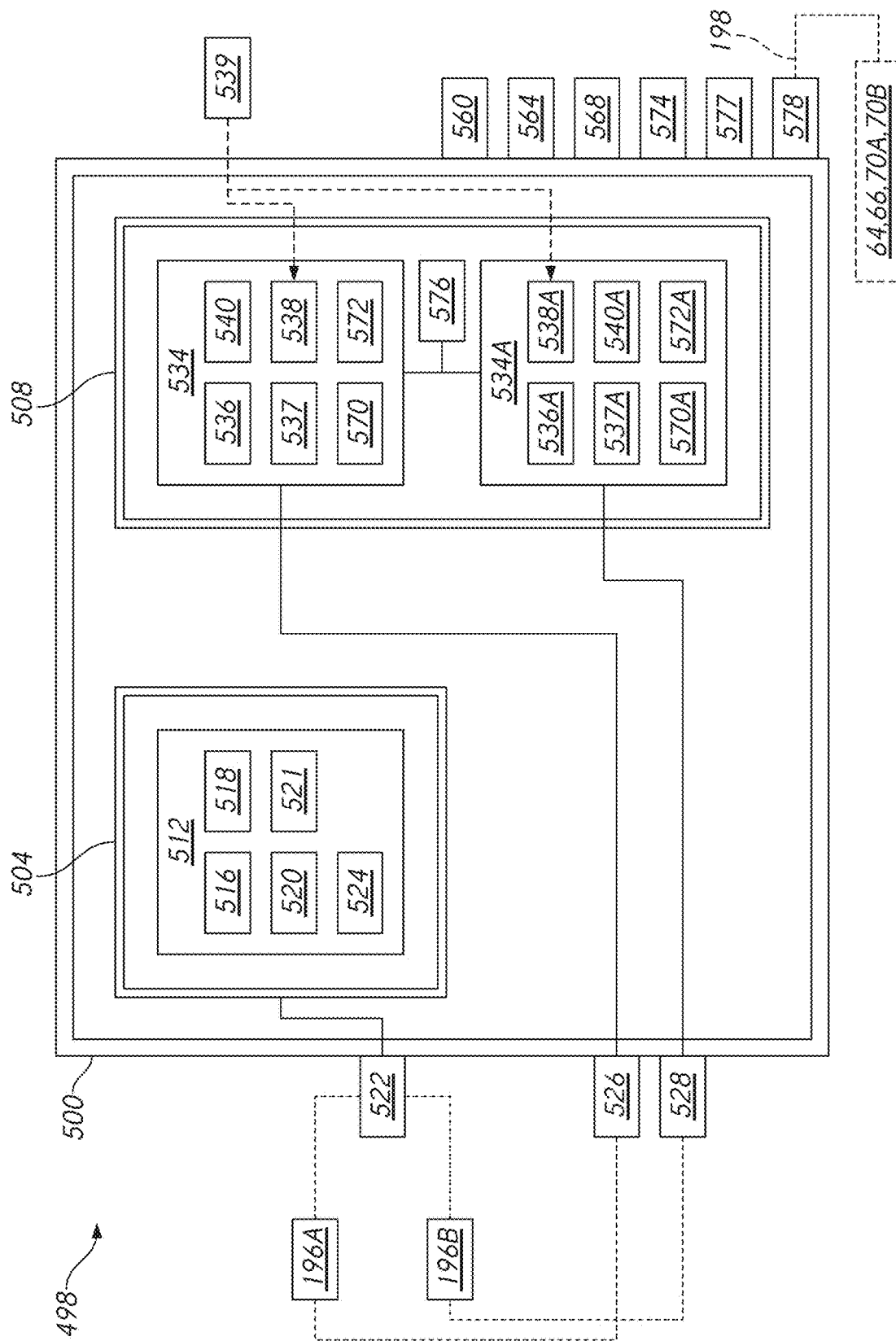
FIG. 9A is a schematic view of components of another embodiment of a trailer mountable power storage and distribution system.

FIG. 9 also illustrates a trailer mountable power storage and distribution system 498. The system 498 can facilitate a modular fitting of powertrain components to the cargo trailer assembly 100. The system 498 can be upfitted to the chassis 120 by coupling the frame 500 to the first body rail 124A, second body rail 124B, the slider assembly 128, the axle assembly 182 or another chassis assembly component. The frame 500 supports the first component module 504 and the second component module 508. The first component module 504 can include thermal management components of the thermal management system 512, as discussed above, that can be coupled with heat generating components mounted on the trailer unit 58 or the cargo trailer assembly 100. The pump 524 can pump coolant through a conduit connected to a thermal system junction 522 of the auxiliary component assembly 350. The conduit can couple to a coolant inflow port of the battery assembly 196A. If more than one battery assembly is provided a second coolant conduit can convey coolant to the second battery assembly. FIG. 9A shows that a second conduit can be connected in parallel to the thermal system junction 522. In another embodiment, a second conduit can extend in series from the battery assembly 196A to the battery assembly 196B.

As discussed above, the auxiliary component assembly 350 can receive power from the battery assembly 196A through the trailer high voltage junction 526. Current can flow through the trailer high voltage junction 526 to the electrical circuit system 534. In one system providing redundancy, a second trailer high voltage junction 528 is provided that can be coupled with the battery assembly 196A. The trailer high voltage junction 528 can receive current from a subset of battery units 228 in the battery assembly 196A that is distinct from a subset of battery units 228 electrically coupled to the trailer high voltage junction 526. As a result, the failure of one of the subsets connected with the trailer high voltage junction 526 would not prevent current from flowing through the trailer high voltage junction 528. Also, the failure of one of the subsets connected with the trailer high voltage junction 528 would not prevent current from flowing through the trailer high voltage junction 526. As discussed above, the derate circuit 570, 570A can modulate the operation of the truck 50 if current is interrupted through either of the trailer high voltage junctions 526, 528.

FIG. 9A illustrates another example of redundancy. In this case, the battery assembly 196A is coupled to the trailer high voltage junction 526 and the battery assembly 196B is coupled to the trailer high voltage junction 528. If the operation of the battery assembly 196A is interrupted, then the truck 50 can be powered from current flowing from the battery assembly 196B through the trailer high voltage junction 528. In that case, the electrical circuit system 534A can deploy the derate circuit 570A to modulate the operation of the truck 50. If the operation of the battery assembly 196B is interrupted, then the truck 50 can be powered from current flowing from the battery assembly 196A through the trailer high voltage junction 526. In that case, the electrical circuit system 534 can deploy the derate circuit 570 to modulate the operation of the truck 50.

FIGS. 9-9A show that the auxiliary component assembly 350 also includes a number of junctions, discussed above. The auxiliary component assembly 350 includes receiving inductive coil circuits 538, 538A that can detect inductive charging fields and can generate current to charge the battery assembly 196A, 196B and other batteries. The high voltage junction 560 and the low voltage junction 564 can provide for connection to high and low voltage loads on the cargo trailer assembly 100 or can be used to export power off the cargo trailer assembly 100 to the tractor 54 or for other uses. The auxiliary component assembly 350 can receive power through the power generation junction 568. The power can come from a range extender module, such as one or more of a solar cell, an array of solar cells, a fuel cell, or a generator. The auxiliary component assembly 350 can distribute that power as needed, e.g., to the battery assembly 196A, 196B to recharge the battery units 228 therein. Power received through the power generation junction 568 can directly supply a load in the auxiliary component assembly 350, in the trailer mountable power storage and distribution system 498, on the cargo trailer assembly 100, or on the truck 50. The frame 500 of the auxiliary component assembly 350 can support the user interface component 574, which can be visible behind the rear wheels of the cargo trailer assembly 100 when the auxiliary component assembly 350 is mounted thereto. The user interface component 574 can instead be coupled with another part of the trailer mountable power storage and distribution system 498, can be provided on a mobile device such as a cell phone or other computer, or mounted to the tractor 54 (e.g., within the cab 60) or to the trailer unit 58 or the cargo trailer assembly 100.

The auxiliary component assembly 350 can include the low voltage junction 577 and high voltage junction 578 to electrically connect the trailer mountable power storage and distribution system 498 to a load on the tractor 54. The high voltage junction 578 can be coupled to the high voltage conveyance 198, which can be coupled to the power distribution module 66 and thereby to the electric motor 64 or another high voltage load. The low voltage junction 577 can be connected to the power distribution module 66 and can support operation of a low voltage component therein or elsewhere on the tractor 54.

The trailer mountable power storage and distribution system 498 provides a number of advantages. For example, the system 498 can enable the operation of a thermal system to remove heat from the battery assembly 196A, battery assembly 196B and other batteries or heat generating loads on the cargo trailer assembly 100 independently of the operation of the tractor 54. The thermal management of the cargo trailer assembly 100 can thus be self-contained. Heat generating components of the trailer mountable power storage and distribution system 498 can be in operation while the tractor 54 is separated from the trailer unit 58 or the cargo trailer assembly 100. This can allow the battery units 228 in the battery assembly 196A, 196B to be recharged after the trailer unit 58, cargo trailer assembly 100 has been delivered to a loading/unloading dock. Battery charging and unloading and loading can be conducted while the tractor 54 is in use to deliver another trailer unit.

Also, providing thermal management on the cargo trailer assembly 100 separate from the tractor 54 eliminates the need for a coolant hoses to span between the tractor 54 and the cargo trailer assembly 100. Eliminating the coolant hoses reduces maintenance and a failure mode and simplifies operation of the truck 50. At the same time, the trailer mountable power storage and distribution system 498 provides liquid cooling of heat generating components, e.g., the battery assembly 196A, battery assembly 196B. This allows for faster charging of the battery units 228 compared to other thermal management structures, such as air cooling.

Figure 10:
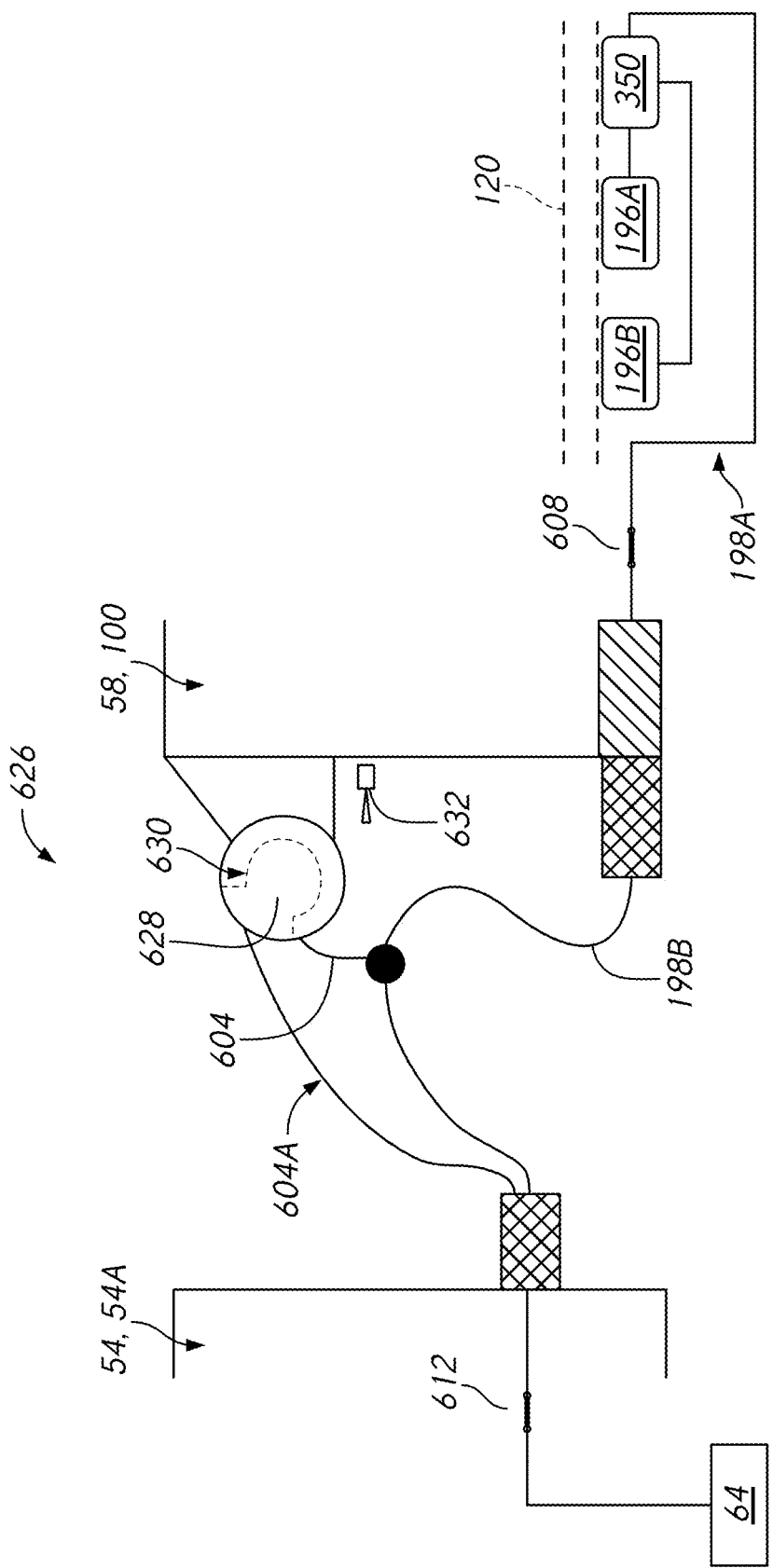
FIG. 10 is a schematic view of a breakaway detection system that can be used with a truck having a cargo trailer assembly fitted with one or more battery assemblies.

FIG. 10 illustrates the breakaway detection system 624 in greater detail according to one embodiment. The breakaway detection system 624 can provide enhanced safety in protecting the truck 50 from suffering an accidental separation of the trailer unit 58 from the tractor 54. The breakaway detection system 624 can provide warning of impending separation or can mitigate the exposure of personnel around the tractor 54 and the trailer unit 58 when or once these units are accidentally separated from each other. For simplicity, the breakaway detection system 624 will be discussed in connection with the trailer unit 58 but the system 624 can also be applied to the cargo trailer assembly 100 in a similar manner.

The breakaway detection system 624 includes an extendable tether 604 located on or coupled with the tractor 54 or the trailer unit 58. The extendable tether 604 can be supported on spool assembly 626. The spool assembly 626 can include a bracket 627 coupled with a forward facing side of the trailer unit 58. The bracket 627 can be coupled with a rearward facing side of the tractor 54 to support the extendable tether 604. The spool assembly 626 can include a spool body 628 configured to wind and unwind the extendable tether 604. The spool body 628 can be rotatably coupled with the bracket 627 such that the rotation of the spool body 628 winds or unwinds the extendable tether 604. The spool assembly 626 can include a spring 630 configured to operate the spool body 628. The spring 630 can be mounted between the spool body 628 and the bracket 627. The spring 630 can be configured to be loaded (e.g., deflected or compressed to store strain energy) by rotation of the spool body 628 in a first direction and can be unloaded (e.g., undeflected or relaxed to release strain energy) by rotation of the spool body 628 in a second direction opposite the first direction.

The extendable tether 604 can have a first end coupled with the spool body 628 and a second end opposite the first end. The second end of the extendable tether 604 can be coupled with a component that can move relative to the bracket 627. FIG. 10 illustrates that in one embodiment, the second end of the extendable tether 604 can be coupled with the tractor 54 and supported by the bracket 627 disposed on the trailer unit 58. In this approach the extendable tether 604 can provide information about the relative position of the tractor 54 and the trailer unit 58. Alternatively or in addition, a second extendable tether can be coupled with the spool body 628 at one end and with the spanning conveyance 198B at an opposite end. In one embodiment, a sensor 632 is provided to detect the amount of extension of the extendable tether 604 from the spool body 628. The sensor 632 can detect the amount of extension of an extendable tether 604A extending from the spool body 628 and coupled with the tractor 54. The sensor 632 can provide a signal indicative of the amount by which the spool body 628 has unwound the extendable tether 604 and/or the extendable tether 604A. The amount of unwinding of the spool body 628 indicated by the extendable tether 604A can indicate a separation distance between the tractor 54 and the trailer unit 58 independent of the behavior of the spanning conveyance 198B. Such an indication can be an early sign of a breakaway, e.g., before the extendable tether 604 extends by an amount indicative of possible breakage of the high voltage conveyance 198. Where the extendable tether 604A and the extendable tether 604 provide different signals, the spool body 628 may incorporate first and second portions configured to unwind a different times or at different rates. The sensor 632 can be coupled with the tractor 54 in one embodiment. The sensor 632 can be coupled with the trailer unit 58 in one embodiment. The sensor 632 can comprise an encoder that provides a signal indicative of increments of extension of the extendable tether 604 and/or the extendable tether 604A. The sensor 632 can communicate with a controller 636 by a wire connection or wirelessly, as discussed below. In some variations, the sensor 632 comprises a potentiometer. In some variations, the sensor 632 includes a camera.

The breakaway detection system 624 can employ a comparison of the amount of extension of the extendable tether 604 to one or more threshold levels to indicate an impending breakaway event. When a threshold is exceeded the breakaway detection system 624 can initiate a countermeasure to mitigate the possible breakaway event. The countermeasure can include opening one or both of a high voltage switch 608 coupled with the trailer unit 58 and a high voltage switch 612 coupled with the tractor 54. FIG. 10 shows that the high voltage switch 608 and the high voltage switch 612 can be disposed along a current path between a power source disposed on the trailer unit 58 and a load disposed on the tractor 54. FIG. 10 shows that the high voltage switch 608 and the high voltage switch 612 can be disposed between the auxiliary component assembly 350 and the electric motor 64. The high voltage switch 608 and the high voltage switch 612 can be disposed along the high voltage conveyance 198. The high voltage switch 608 can be disposed in the trailer side conveyance 198A. The high voltage switch 612 can be disposed in the high voltage conveyance 72. The high voltage switch 612 can be disposed along a current path between the spanning conveyance 198B and the electric motor 64 or other load. The high voltage switch 608 and/or the high voltage switch 612 can be operated by a controller 636 configured to receive signals from the sensor 632. The countermeasure can include dissipating any voltage from the battery assemblies 196A, 196B in the high voltage conveyance 198, e.g., in the spanning conveyance 198B or segments thereof that could be exposed during a breakaway event.

Figure 10A:
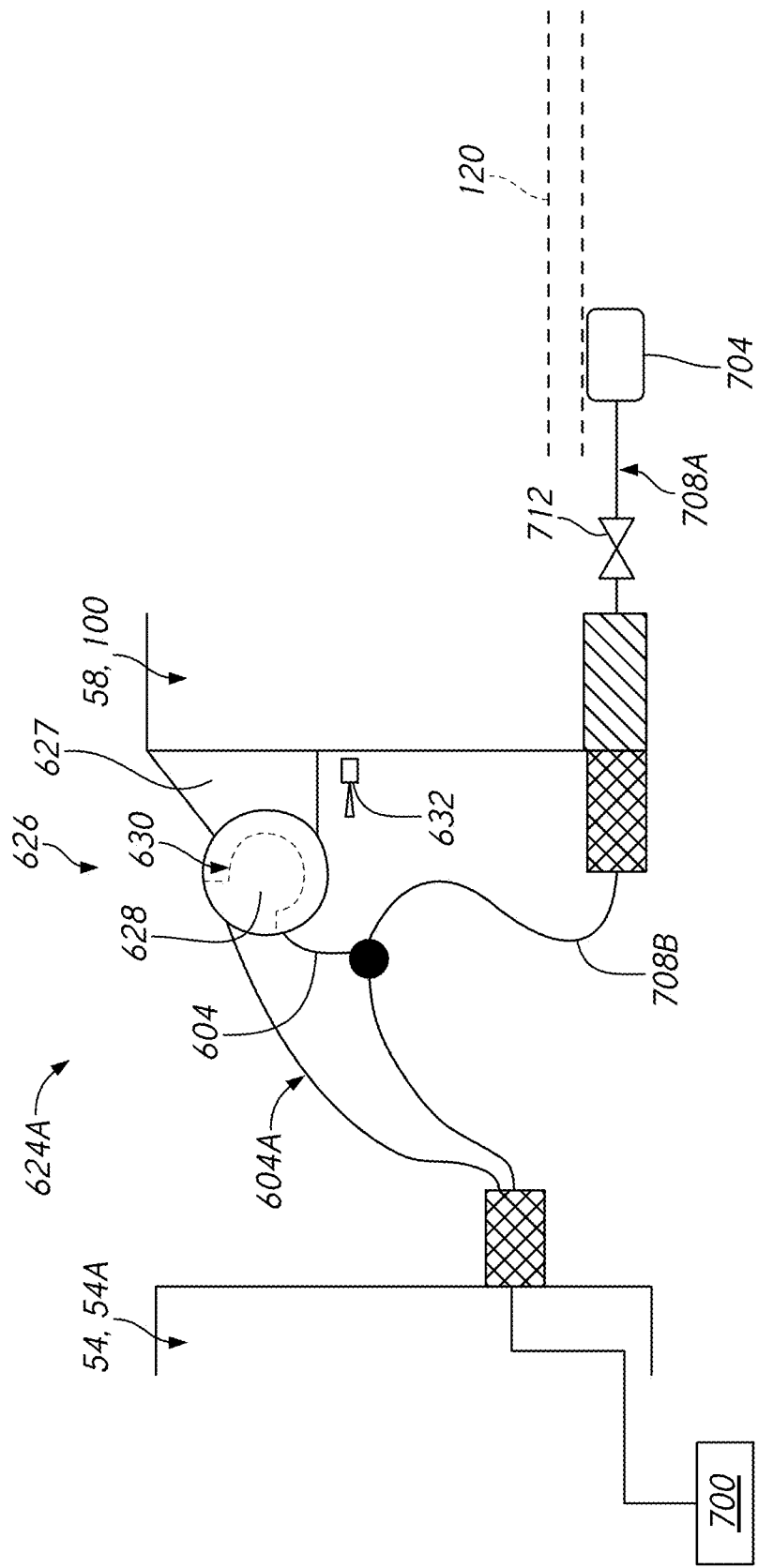
FIG. 10A is a schematic view of a breakaway mitigation system that can be used with a truck having a cargo trailer assembly fitted with a fuel tank and a tractor fitted with an internal combustion engine.

FIG. 10A illustrates another application of a breakaway detection system 624A in which the truck 50 includes an internal combustion engine 700 and the trailer unit 58 (or the cargo trailer assembly 100) is configured to support a fuel tank 704 thereon. The fuel tank 704 can be placed in fluid communication with the internal combustion engine 700 to supply fuel thereto. The trailer unit 58 can include a trailer side fuel hose segment 708A disposed between the fuel tank 704 and a spanning fuel hose segment 708B configured to be connected to the tractor 54 when the trailer unit 58 is coupled with the tractor 54 forming the truck 50. The tractor 54 can include a fuel hose segment to be placed in fluid communication with the spanning fuel hose segment 708B. A valve 712 can be provided in one or more fuel hose segments of the truck 50, e.g., in the trailer side fuel hose segment 708A. The valve 712 can be a solenoid valve operated by a controller 636 of the breakaway detection system 624 configured to receive signals from the sensor 632.

FIG. 11 schematically illustrates the operation of the breakaway detection system 624. The sensor 632, which is disposed on the front portion of the trailer unit 58 (or elsewhere on the truck 50) detects the extension of the extendable tether 604. The extendable tether 604 can be extended if a breakaway is beginning to occur. As the tractor 54 moves away from the trailer unit 58 in a breakaway, the extendable tether 604 begins to extend outward from the spool body 628. The spool body 628 unwinds to cause a greater length of the extendable tether 604 to extend. The greater length of the extendable tether 604 can correspond to any slack length of the spanning conveyance 198B (or the spanning fuel hose segment 708B in the case of an internal combustion engine 700 variant of the tractor 54) being straightened as a separation distance between the back of the tractor 54 and the front of the trailer unit 58 increases.

The breakaway detection system 624 can include a memory 638 configured to store one or more threshold values that can provide a basis for any one of a variety of countermeasures. In one embodiment, a breakaway threshold value 640 is provided that can correspond to a condition such as when a slack length of the spanning conveyance 198B (or the spanning fuel hose segment 708B) is fully taken up, e.g., the spanning conveyance 198B (or the spanning fuel hose segment 708B) is completely straightened. The breakaway threshold value 640 can be indicative of when the spanning conveyance 198B (or the spanning fuel hose segment 708B) would break should the spanning conveyance be inextendable, e.g., not at all stretchy beyond a length corresponding to the breakaway threshold value 640. In one approach, the controller 636 can be configured to implement a method in which the controller 636 receives a signal from the sensor 632 indicating the amount of extension of the extendable tether 604. The controller 636 determines the amount of extension from the signal. The controller 636 compares the determined amount of extension with the breakaway threshold value 640. If the amount of extension equals or is greater than the breakaway threshold value 640 the controller 636 implements a countermeasure. In one approach, the controller 636 causes the high voltage switch 608 to open. The controller 636 can cause any voltage in the high voltage conveyance 198 (or pressure in the spanning fuel hose segment 708B), e.g. in the spanning conveyance 198B to be dissipated. The controller 636 can cause the high voltage switch 608 to open and can cause any voltage in the high voltage conveyance 198 (or pressure in the fuel hose), e.g. in the spanning conveyance 198B (or pressure in the spanning fuel hose segment 708B) to be dissipated. The controller 636 can cause the high voltage switch 612 to open. The controller 636 can cause the high voltage switch 612 to open and can cause any voltage in the high voltage conveyance 198 (or pressure in the fuel hose), e.g. in the spanning conveyance 198B (or pressure in the spanning fuel hose segment 708B) to be dissipated. The controller 636 can cause the high voltage switch 608 and the high voltage switch 612 to open. The controller 636 can cause the high voltage switch 608 and the high voltage switch 612 to open and can cause any voltage in the high voltage conveyance 198 (or pressure in the fuel hose), e.g. in the spanning conveyance 198B (or pressure in the spanning fuel hose segment 708B) to be dissipated.

In another approach, the controller 636 can be configured to receive a signal from the sensor 632 and to determine an amount of extension of the extendable tether 604 from the signal. The controller 636 can compare the amount of extension of the extendable tether 604 to an alarm threshold value 644. The controller 636 can retrieve the alarm threshold value 644 from the memory 638. The alarm threshold value 644 can be a value that is about 95% of the value of the breakaway threshold value 640 in one embodiment. The alarm threshold value 644 can be a value that is about 90% of the value of the breakaway threshold value 640 in one embodiment. The alarm threshold value 644 can be a value that is about 85% of the value of the breakaway threshold value 640 in one embodiment. The alarm threshold value 644 can be a value that is about 80% of the value of the breakaway threshold value 640 in one embodiment. The alarm threshold value 644 can be a value that is between 75% and 100% of the value of the breakaway threshold value 640 in one embodiment. The controller 636 can be configured to implement an alarm module 664. The alarm module 664 can execute a breakaway countermeasure, such as illuminating a warning light and/or an audible alarm on an alarm device 660 in the cab 60. The alarm module 664 can execute a multi-sensory alarm, such as a warning light and an audible alarm on the alarm device 660. The alarm module 664 can execute multiple alarms, such as a light or textual message in the cab 60 on the alarm device 660 and on a mobile device such as a cell phone that can be in the cab 60 or at a remote site such as at a fleet management location. Personnel at the fleet management location can contact the operator of the tractor 54.

In one variation, the alarm module 664 can be configured to also execute current disruption and voltage dissipation countermeasures, such as by opening the high voltage switch 608 and/or the high voltage switch 612 and/or dissipating voltage in the high voltage conveyance 198 (or fuel hose), e.g., in the spanning conveyance 198B (or pressure in the spanning fuel hose segment 708B) if the operator of the tractor 54 does not respond to any of the forms of alarms.

FIG. 11 shows that the breakaway detection system 624 also can implement a protocol in which the controller 636 retrieves a stretch threshold value 648 from the memory 638. The controller 636 can determine an amount of extension of the extendable tether 604 from a signal generated by the sensor 632. The controller 636 can compare the amount of extension to the stretch threshold value 648. The stretch threshold value 648 can take into consideration an amount that the spanning conveyance 198B (or the spanning fuel hose segment 708B) can be stretched beyond a fully extended configuration corresponding to the breakaway threshold value 640. In some cases, the stretch threshold value 648 can be 105% of the breakaway threshold value 640. The stretch threshold value 648 can be 110% of the breakaway threshold value 640. The stretch threshold value 648 can be 115% of the breakaway threshold value 640. The stretch threshold value 648 can be 120% of the breakaway threshold value 640. The stretch threshold value 648 can be between 105% and 140% of the breakaway threshold value 640. The stretch threshold value 648 can be between 110% and 125% of the breakaway threshold value 640.

Figure 12:
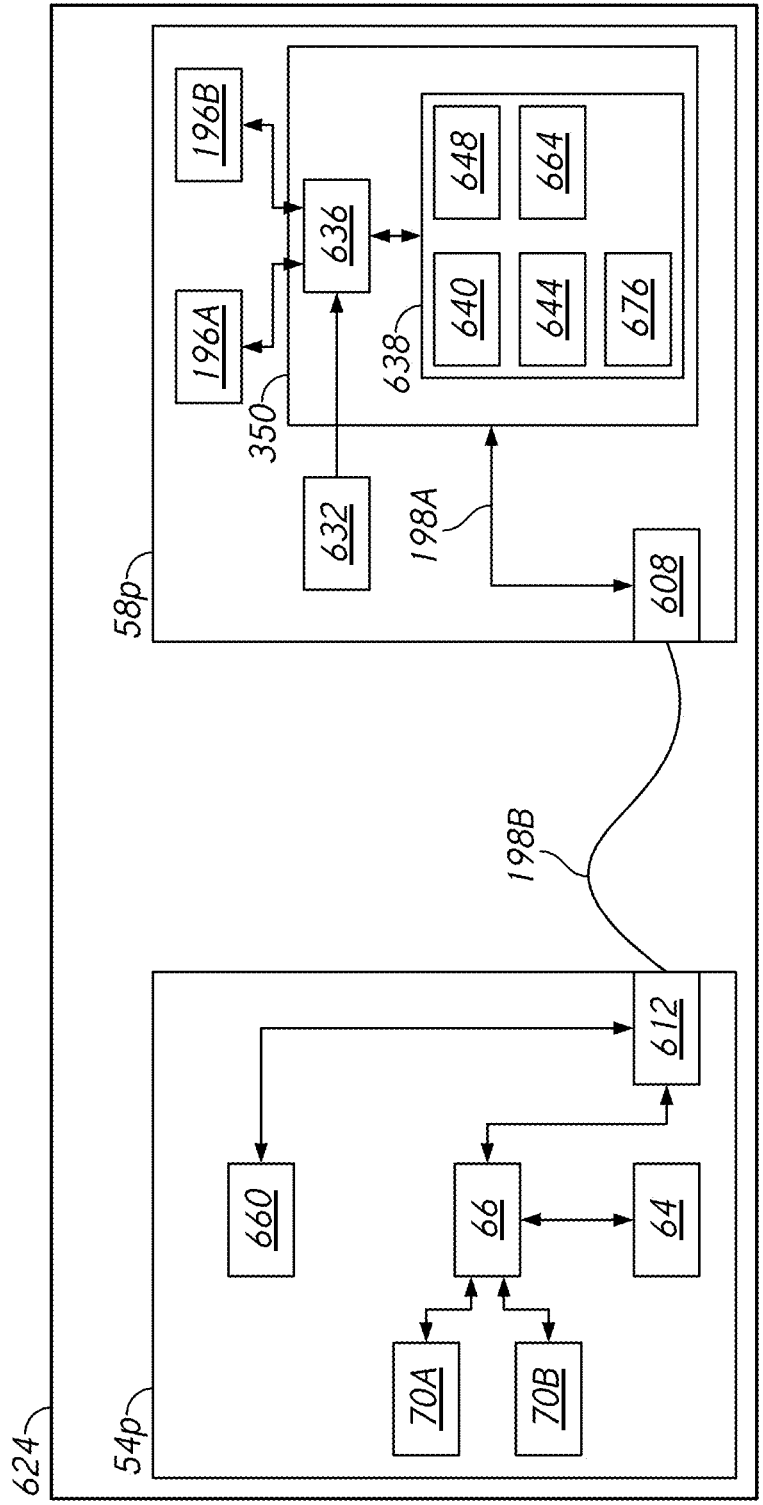
FIG. 12 is a schematic of the breakaway detection system, illustrating system components mounted or mountable to the tractor and/or the trailer unit of the truck.

FIG. 12 shows the breakaway detection system 624 in accordance with one embodiment. The breakaway detection system 624 can include a tractor portion 54p on the tractor 54 and a trailer portion 58p on the trailer unit 58. The portions 54p, 58p are electrically coupled in one embodiment by the spanning conveyance 198B. The spanning conveyance 198B can extend between the high voltage switch 608 on the trailer unit 58 and the high voltage switch 612 on the tractor 54. The trailer side conveyance 198A can be electrically connected to the high voltage switch 608 and to the auxiliary component assembly 350. The auxiliary component assembly 350 can be electrically coupled with the battery assembly 196A and the battery assembly 196B as discussed above. The auxiliary component assembly 350 can house the memory 638, which is electrically coupled to the controller 636. The breakaway threshold value 640, the alarm threshold value 644, and the stretch threshold value 648 can be stored in the memory 638 and accessed by the controller 636 in order to compare extension amounts determined from the signals generated by the sensor 632 mounted on the trailer unit 58. As discussed above the sensor 632 can be mounted to the tractor 54. The sensor 632 can communicate by wire or wirelessly with the controller 636. The memory 638 can store the alarm module 664 to be accessed and executed by the controller 636. The alarm module 664 can provide an alarm or a progression of alarms to be provide to the operator of the tractor 54 in the cab 60 or via a separate device such as a cell phone.

The memory 638 can also store a derate module 676 that can operate in conjunction with the alarm module 664. In some cases, the operator of the tractor 54 may not respond to alarms. The operator may be distracted by activity in or around the cab 60 such that the alarms are not heard, seen or otherwise detected or understood. Accordingly, the controller 636 can implement the derate module 676 to reduce or prevent motion of the tractor 54. For example, the derate module 676 can interrupt a signal from an acceleration pedal or controller to prevent the operator from causing the electric motor 64 (or the internal combustion engine 700) from applying or increasing torque to a drive axle of the tractor 54. The derate module 676 can send a signal to one or more break actuators to cause the wheels of the tractor 54 to be slowed or stopped or prevented from moving. The controller 636 can communicate with a circuit in the power distribution module 66 to reduce or prevent current from flowing from the battery assembly 70A or the battery assembly 70B to the electric motor 64. The controller 636 can communicate with a circuit in the power distribution module 66 to reduce or prevent current from flowing from the battery assemblies 196A, 196B to the electric motor 64. The controller 636 can cause the auxiliary component assembly 350 to reduce or prevent current from flowing from the battery assemblies 96A, 196B to the electric motor 64. The controller 636 can communicate with the power distribution module 66 via the spanning conveyance 198B or via a separated parallel wired connection or a wireless transmitter disposed in the auxiliary component assembly 350 or elsewhere in or on the trailer unit 58.

FIG. 12 shows an implementation for an electric motor. One embodiment of an implementation for the internal combustion engine 700 includes a solenoid valve control circuit for closing the valve 712 where the valve 712 is a solenoid valve. A magnetic coil can be energized by the controller 636 to cause the valve 712 to move from an open position to a closed position to prevent fuel from flowing from the fuel tank 704 to the internal combustion engine 700 via the spanning fuel hose segment 708B of the fuel hose. The valve 712 and the solenoid control circuit can be located on the trailer unit 58. The valve 712 can be located adjacent to the internal combustion engine 700. The solenoid control circuit can be located in the auxiliary component assembly 350.

Figure 13:
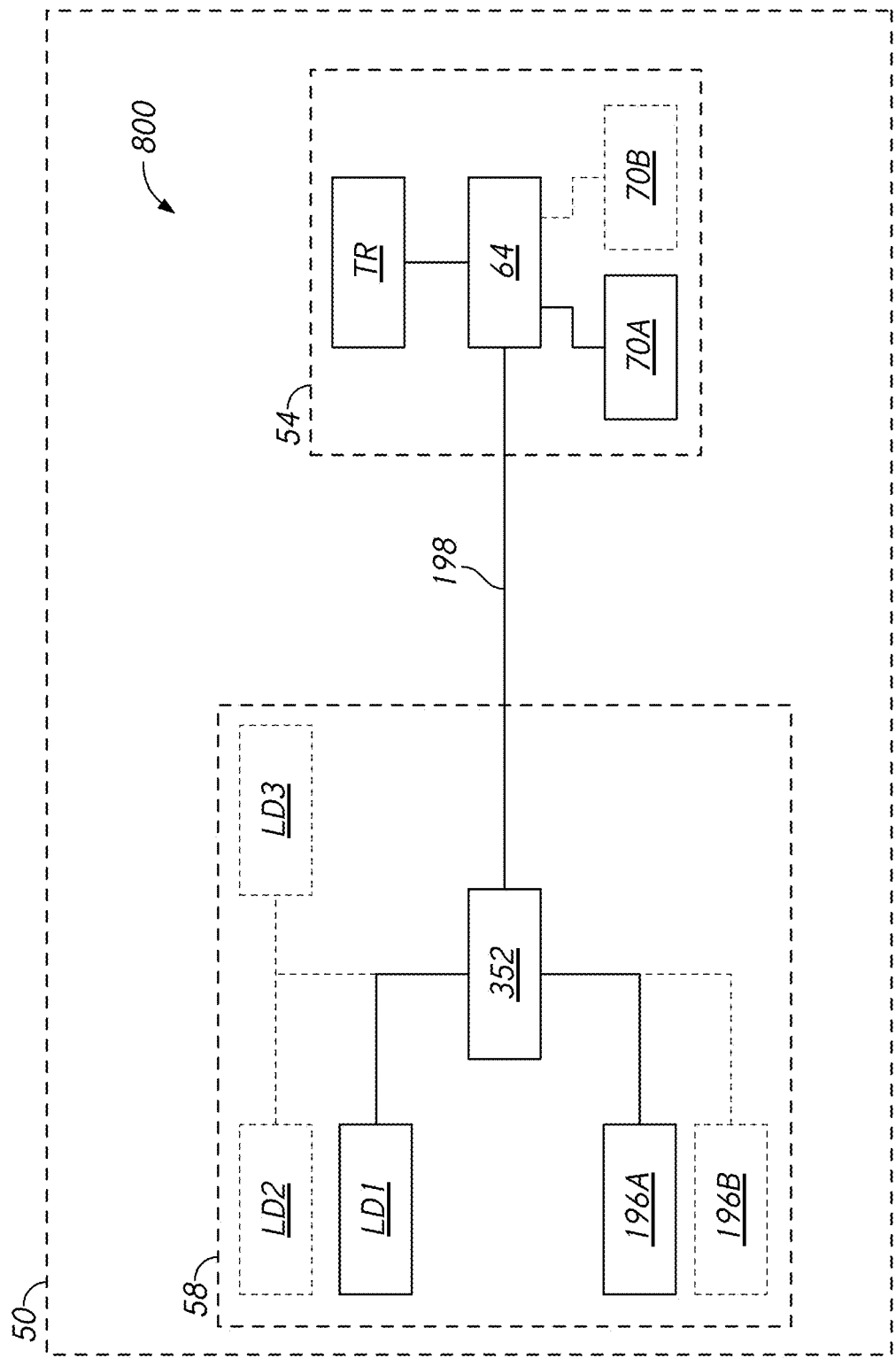
FIG. 13 is a schematic view of an energy dissipation system for a heavy duty truck.

FIG. 13 shows an embodiment of an energy dissipation system 800 that can be used on a truck 50 or another heavy duty vehicle. Although shown in the context of a tractor trailer, the energy dissipation system 800 can be applied to any heavy duty vehicle expected to traverse steep grades with heavy loads. As discussed above, the truck 50 can include the tractor 54 coupled with the trailer unit 58 to pull the trailer unit. The energy dissipation system 800 can include some components disposed on the tractor 54 and some components disposed on the trailer unit 58. The tractor 54 includes one or more electric motors 64 coupled with axles to drive wheels of the tractor 54. A transmission TR can couple the electric motor 64 with the wheels to cause the wheels to rotate in one mode. The electric motor 64 can be operated by drawing current from the battery assembly 70A. In some cases, the tractor 54 can be coupled with the battery assembly 70A and the battery assembly 70B. The transmission TR can transfer torque from the wheels to cause the electric motor 64 to generate current in another mode. The current can be directed to a load by a power distribution unit 352. This current and/or energy generation can maintain or reduce the rotational speed of the wheels to reduce the rate of acceleration of the truck 50, maintain the speed of the truck or slow the truck down. The energy dissipation system 800 can operate without requiring the use of service brakes, which may also be provided on the truck 50.

In one embodiment, the trailer unit 58 is configured to support the power distribution unit 352. The power distribution unit 352 can be housed in the auxiliary component assembly 350. The power distribution unit 352 can be coupled with the electric motor 64 by the high voltage conveyance 198. In one embodiment, the power distribution unit 352 is also coupled with the battery assembly 196A. The power distribution unit 352 can draw current from the battery assembly 196A and supply the current to the electric motor 64 or to other loads on the tractor 54 or the trailer unit 58. In some cases, a second battery assembly 196B can be disposed on the trailer unit 58. The battery assembly 196B can be electrically connected to the power distribution unit 352 to supply current to loads through the power distribution unit 352.

In the energy dissipation system 800, the power distribution unit 352 is connected to one or more loads. The power distribution unit 352 can be coupled to a load LD1 in one embodiment. The load LD1 can be any load that is able to draw current through the high voltage conveyance 198 that is generated by the electric motor 64. The load LD1 can comprise an energy dissipation circuit, e.g., including one or more resistors capable of receiving current from the electric motor 64 and dissipating this energy through a means such as generating heat, emitting light or other work.

Placing the load LD1 in the form of an energy dissipation circuit to provide braking function in the energy dissipation system 800 is advantageous. The energy dissipation system 800 is particularly useful on a hill or steep grade. The energy dissipation system 800 allows the gravitational potential energy of the truck 50 on a hill or steep grade to be converted to something other than kinetic energy. By converting some of this gravitational potential energy to thermal energy (heat) there is less energy available to convert to kinetic energy (vehicle speed). The energy dissipation system 800 can convert gravitational potential energy to heat at the load LD1 (or at another load on the truck 50).

Placing the energy dissipation system 800 at least partially on the trailer unit 58 is advantageous in certain embodiments. The tractor 54 has limited space for coupling additional components thereto. The trailer unit 58 has more space and thus can more easily accommodate the auxiliary component assembly 350 or other assembly including the power distribution unit 352. The trailer unit 58 has more space for energy consuming components, such as an energy dissipation circuit as in the load LD1 (or another load as discussed herein). Furthermore, the tractor 54 is much lighter than the truck 50 when the tractor 54 is coupled with the trailer unit 58 and when the trailer unit 58 is fully loaded. Being lighter, the truck 50 has less potential energy on a steep hill or grade. Thus, the need for the energy dissipation system 800 to supplement service brakes is not as great.

FIG. 13 shows that in one case, the trailer unit 58 can be coupled with more than one load. The load LD1 can include an energy dissipation circuit. The load LD2 can include a power storage component, such as an auxiliary battery. The load LD3 can include a power generation component, such as the solar cells 116. In one mode, the solar cells 116 can be configured to generate current in one mode in response to incident solar energy and to be able to receive current from the power distribution unit 352 to perform some work via the cells, e.g., to generate light as the current flows into the solar cells 116.

Many power control and distribution techniques can be provided by the power distribution unit 352. The power distribution unit 352 can assess the charge status of the battery assembly 196A on the trailer unit 58 and when the energy dissipation system 800 is generating current direct such current to the battery assembly 196A. If more than one battery assembly is on the trailer unit 58, the power distribution unit 352 can direct current generated by the energy dissipation system 800 to the battery assemblies serially to achieve a high percentage of charge a first battery before charging another battery on the trailer unit 58. The power distribution unit 352 can charge multiple battery assemblies on the trailer unit 58 in parallel to achieve comparable levels of charge of each battery assembly. The power distribution unit 352 can direct current generated by the energy dissipation system 800 to any and all battery assemblies on the truck 50 charging any of the battery assembly 70A, battery assembly 70B, battery assembly 196A, battery assembly 196B or other battery assemblies as may be provided (e.g., where one of the loads LD1, LD2, LD3 is a battery assembly) in series, in parallel or some in series and some in parallel. Charging in parallel is advantageous in providing more uniform duty cycle for all of the battery units or assemblies.

As discussed above, the load LD1 can include an energy dissipation circuit. Where multiple loads are provided, the load LD2 can comprise an auxiliary battery and the load LD3 can comprise a solar cell or solar array. Other energy consuming loads can be provided that enable the energy dissipation system 800 to convert some gravitational potential energy of a heavy load or mass on a hill or steep grade into something other than kinetic energy where charging batteries or battery cells of battery assemblies is not needed.

Although the energy dissipation system 800 has been described in connection with one possible function of slowing the truck 50 on a steep grade, the energy dissipation system 800 can also be employed in any braking scenario to enable the electric motor 64 to convert kinetic energy into another form of energy, such as storing energy in any of the battery assemblies 70A, 70B, 196A, 196B.

In some cases, the energy dissipation system 800 can be entirely disposed on the tractor 54. For example, the power distribution unit 352 can be electrically coupled with the electric motor 64, e.g., disposed in the power distribution module 66 or elsewhere on the tractor. The potential or kinetic energy to be dissipated can be used to perform the work of charging the battery assembly 70A, the battery assembly 70B or to perform other useful work on the tractor 54. If no work is needed, the load LD1 including an energy dissipation circuit can be disposed on the tractor 54.

Figure 14:
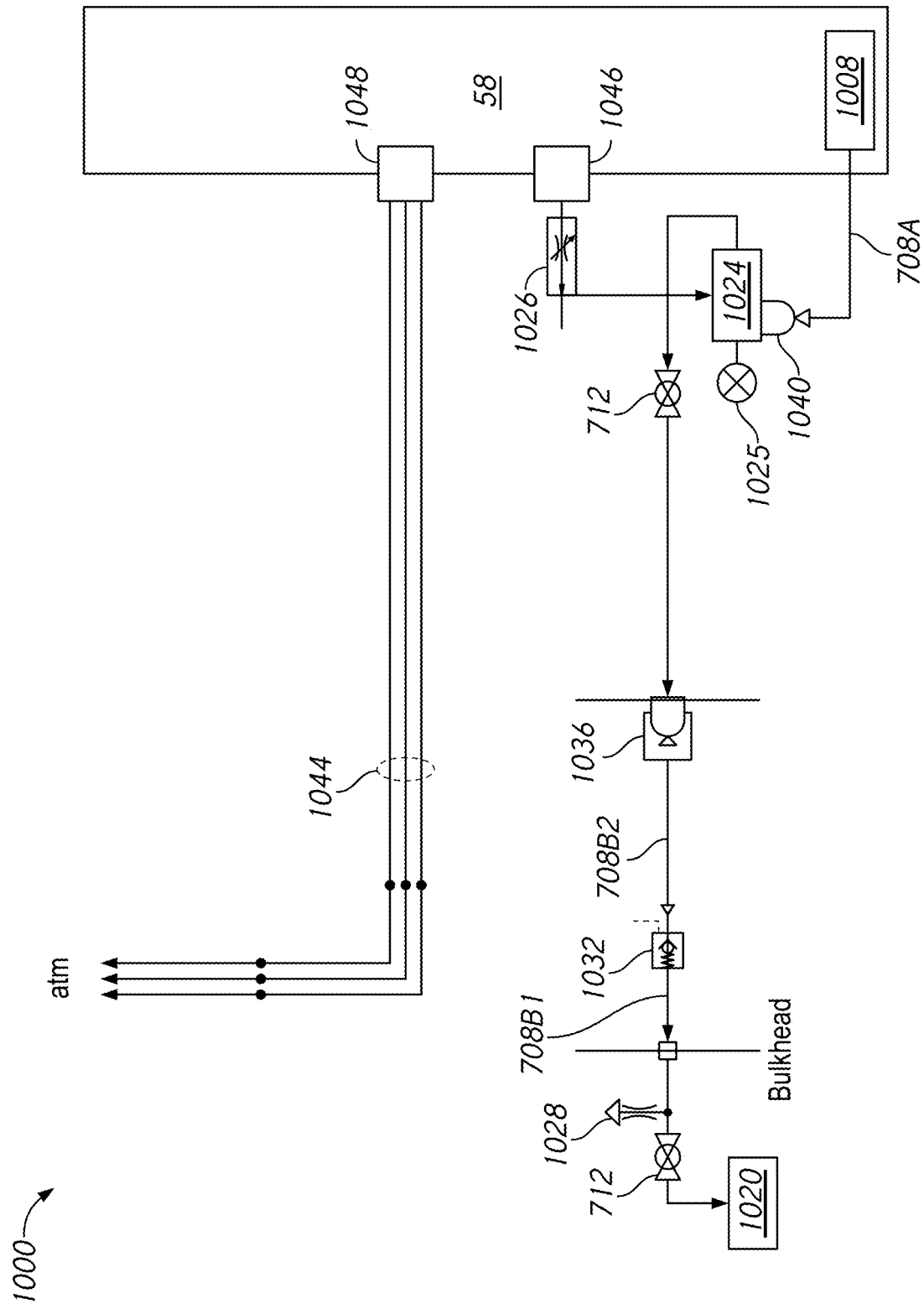
FIG. 14 is a schematic of a breakaway detection and/or mitigation system, illustrating system components mounted or mountable to the tractor and/or the trailer unit of a truck.

FIG. 14 shows a general layout of a vehicle fuel system 1000 configured to be partly mounted on a trailer unit and partly on a tractor. The general layout allows a significant amount of fuel to be stored on the trailer unit. The components of the cargo trailer assembly 100 enable safe transfer of the fuel from the trailer unit to the tractor as well as a breakaway mitigation system able to counteract emergency conditions such as jackknifing or separation of the trailer from the tractor due to another type of accident such as a rollover or other incident.

The fuel system 1000 can include a fuel management module 1020. The fuel management module 1020 can be coupled with the tractor 54, e.g., behind a cab thereof. The fuel management module 1020 can be connected to a valve 712 and a pressure release device 1028. The valve 712 and the pressure release device 1028 can be coupled to a first end of a first portion 708B1 of a spanning fuel hose segment 708B. The first portion 708B1 of the spanning fuel hose segment 708B can be coupled at a second end to a quick connect coupler 1032. The quick connect coupler 1032 can be coupled to a first end of a second portion 708B2 of spanning fuel hose segment 708B. The second portion 708B2 of spanning fuel hose segment 708B can be coupled at a second end to a quick connect coupler 1036. In some embodiments, the spanning fuel hose segment 708B can be a single segment. The quick connect coupler 1036 can be coupled to a valve 712 and a fuel management module 1024. The fuel management module 1024 can be coupled with a trailer unit, such as the trailer unit 58 as discussed further below.

One or both of the quick connect coupler 1032 and the quick connect coupler 1036 can be configured to separate in the event of an accident. For example, if the tractor 54 and the trailer unit 58 separate from each other in a breakaway incident the quick connect coupler 1032 can decouple the first portion 708B1 of spanning fuel hose segment 708B from the second portion 708B2 of spanning fuel hose segment 708B in a manner that stops flow in the spanning fuel hose segment 708B. In a breakaway, the quick connect coupler 1036 can allow the second portion 708B2 of spanning fuel hose segment 708B to separate from the trailer unit 58. The separation at the quick connect coupler 1032 or at the quick connect coupler 1036 can be due to a mechanical load exceeding a threshold value. For example, the separation at quick connect coupler 1032 can be due to a mechanical load exceeding an example threshold value of between about 50 pounds to about 150 pounds. The separation at quick connect coupler 1032 can be due to a mechanical load of about 50 pounds, about 75 pounds, about 100 pounds, about 125 pounds, about 150 pounds or more than 150 pounds, e.g., not exceeding about 500 pounds. For example, the separation at quick connect coupler 1036 can due to a mechanical load exceeding an example threshold value of between about 500 pounds to about 1,000 pounds, a threshold exceeding 500 pounds and up to about 1000 pounds, a threshold of about 500 pounds, and/or a threshold of about 500 pounds. This approach advantageously reduces the need for sensing the impending breakaway and reliance on an electrically controlled valve. While a solenoid or other electrically controlled valve may also be present separation above a threshold load has the advantage of operating in the absence of power. Also, the mechanical separation can act as a fail-safe should a solenoid or other electrically actuated valve fail.

The fuel management module 1024 can include a high pressure gauge 1025 and a receptacle 1040. The receptacle 1040 can be coupled to a fuel module 1008 by a trailer side fuel hose segment 708A. The fuel management module 1024 can include or be coupled to an excess flow valve 1026 configured to provide for venting in certain circumstances. The excess flow valve 1026 can be coupled with a first bulkhead plate 1046 of a trailer unit 58. A second bulkhead plate 1048 can be coupled to the trailer unit 58 and can provide a mount location for a vent 1044 that leads to the atmosphere atm. The outlet of the vent 1044 can be disposed at the end of gas tubing that is disposed toward a top portion of or above the trailer unit 58.

As discussed above, the valve 712 mounted to the trailer unit 58 can be configured to close in the event of a breakaway event. If the spanning fuel hose segment 708B (e.g., one or both of the first portion 708B1 of spanning fuel hose segment 708B and the second portion 708B2 of spanning fuel hose segment 708B) becomes excessively stretched or severed due to disconnection of or extreme angulation between the trailer unit 58 and a tractor the valve 712 can be made to close. The valve 712 can be made to close by way of the operation of a solenoid actuator or other controllable component, as discussed above.

The pressure release device 1028 can be operated to reduce the pressure in the spanning fuel hose segment 708B and/or in the quick connect coupler 1032 such that the spanning fuel hose segment 708B can be safely decoupled therefrom.

Figure 15:
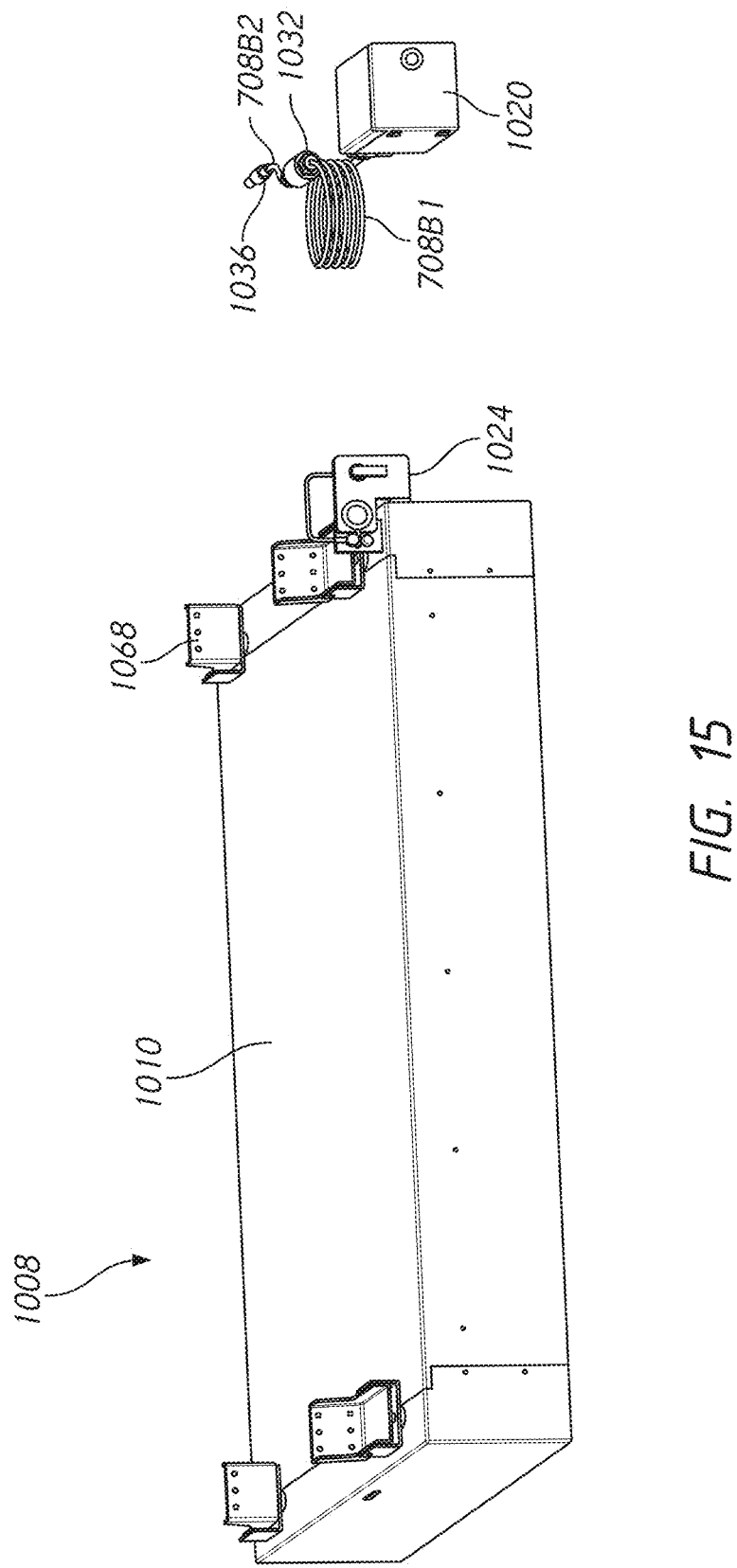
FIGS. 15-16 show components of the breakaway detection and/or mitigation system including a fuel module and a spanning fuel hose configured to extend from a fuel management module on a tractor side to a fuel management module on a trailer side.
Figure 16:
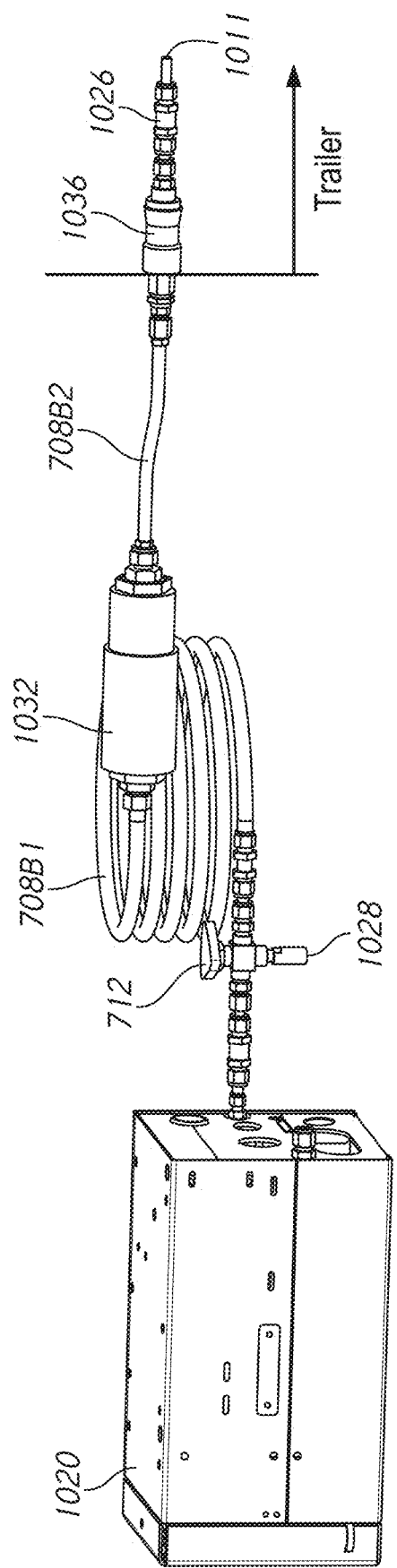

FIGS. 15-17 show components of a breakaway mitigation system 1004 that can be integrated into the vehicle fuel system 1000. The breakaway mitigation system 1004 can be configured to control a portion of a fuel line that extends between the tractor 54 and the trailer unit 58, e.g., from a fuel management module 1020 on the tractor 54 to the fuel management module 1024 on the trailer unit 58. The breakaway mitigation system 1004 can employ any feature or component of the breakaway detection system 624 and variant thereof described herein in combination with the features and components described below.

In one embodiment, the breakaway mitigation system 1004 includes the spanning fuel hose segments 708B1, 708B2 and the quick connect coupler 1032 configured to be disposed between the tractor 54 and the trailer unit 58. The breakaway mitigation system 1004 can include a fuel hose management system 1100 configured to support the spanning fuel hose segment 708B as described below. The breakaway mitigation system 1004 also can include a valve configured to prevent or reduce flow of pressurized fuel in the event of a breakaway or similar accident risking fuel line breakage or leaking. The breakaway mitigation system 1004 can also include the fuel management module 1020, the fuel management module 1024, the pressure release device 1028, the quick connect coupler 1036, and the excess flow valve 1026.

The fuel management module 1020 can be coupled to a first end of the first portion 708B1 of spanning fuel hose segment 708B. The pressure release device 1028 can be disposed in fluid communication with the second portion 708B2 of spanning fuel hose segment 708B to enable the pressure therein to be relieved as needed. A second end of the first portion 708B1 of spanning fuel hose segment 708B can be coupled to a quick connect coupler 1032. The first portion 708B1 of spanning fuel hose segment 708B can be coupled at a first end to the quick connect coupler 1032. The second portion 708B2 of spanning fuel hose segment 708B can be coupled at a second end to the quick connect coupler 1036. The quick connect coupler 1036 can be coupled to the shut-off valve 712 and to the excess flow valve 1026. A hose segment 1011 can be coupled at a first end to the excess flow valve 1026 and coupled at a second end to the fuel management module 1024. The hose segment 1011 can extend between the quick connect coupler 1036 and the fuel management module 1024. In some embodiments, the quick connect coupler 1036 and/or excess flow valve 1026 can be coupled to a trailer unit (e.g., trailer unit 58) or to the fuel management module 1024 as described herein.

FIG. 14 shows that the fuel management module 1024 and the fuel module 1008 can be connected to the trailer unit 58 at different locations. A trailer side fuel hose segment 708A can connect the fuel management module 1024 to the fuel module 1008. In some embodiments, the fuel management module 1024 can be coupled to a housing 1010 of a fuel module 1008. The housing 1010 of the fuel module 1008 can be coupled to the trailer unit (e.g., trailer unit 58) via any number of brackets 1068. The brackets 1068 can couple the housing 1010 to frame body rails (e.g., body rails 124A, 124B). The fuel module 1008 can be positioned above the body rails. The fuel module 1008 can be positioned between or below the body rails.

Figure 17B:
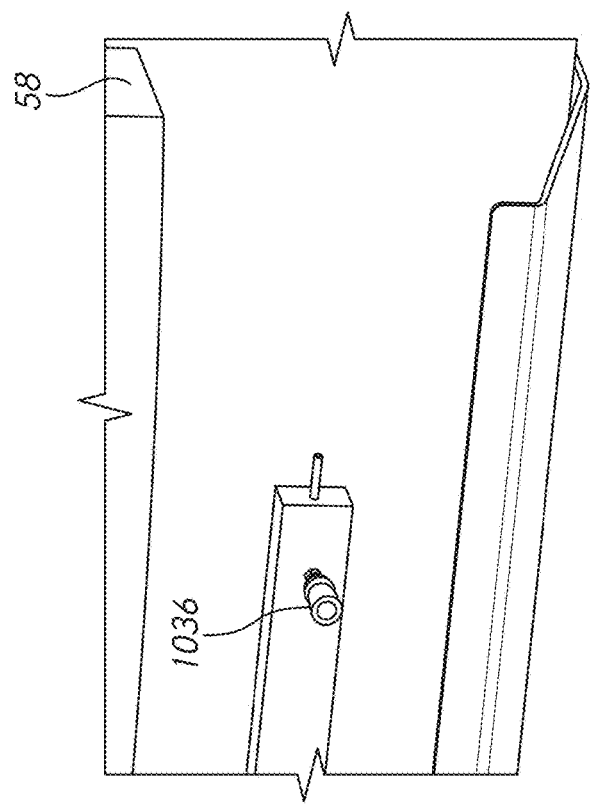
FIG. 17-17B show components of FIG. 15 coupled with a tractor and a trailer unit.
Figure 17A:
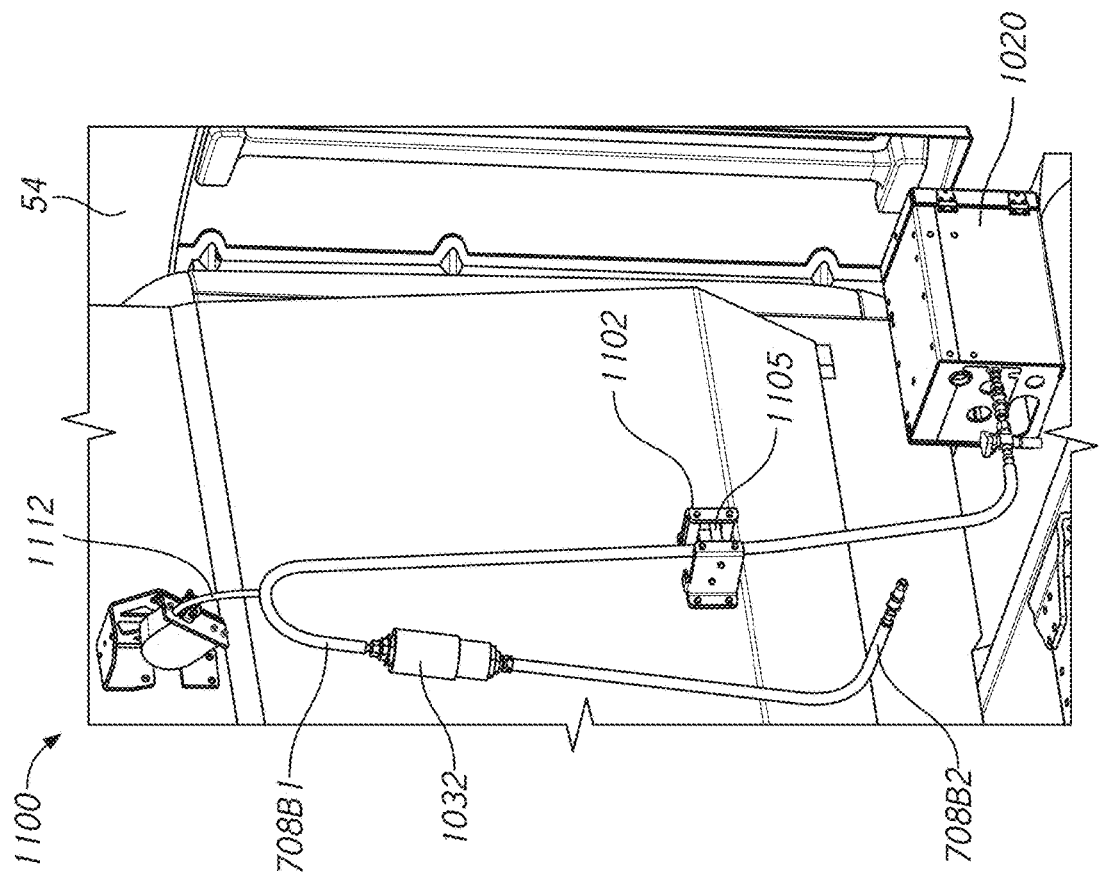
FIG. 17C-17D show the tractor and trailer unit in an aligned configuration.
FIGS. 17E-17H show the tractor and the trailer unit in first and second angled configurations.
Figure 17F:
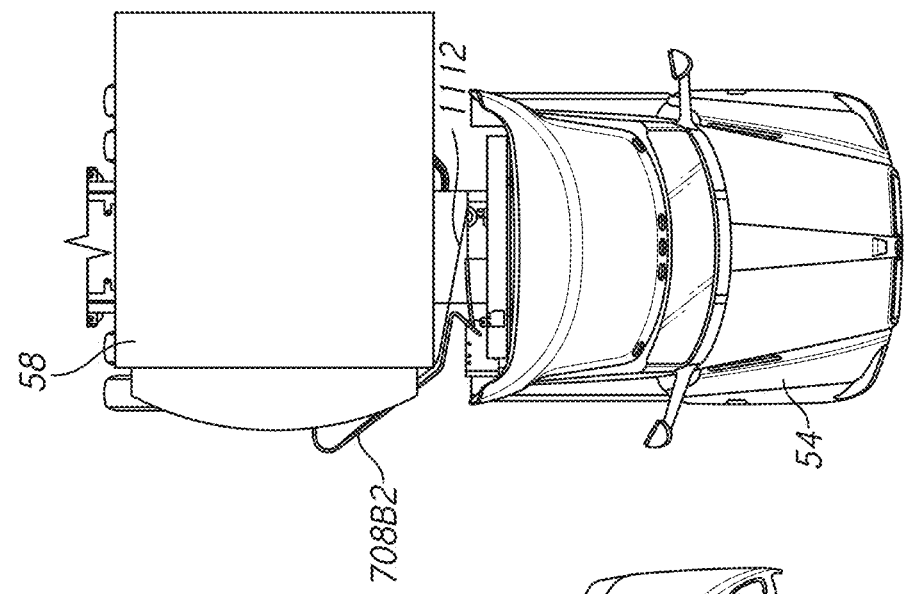

FIGS. 17-17H show the components of the breakaway mitigation system 1004 coupled with the tractor 54 and the trailer unit 58. As described herein, the breakaway mitigation system 1004 can support the spanning fuel hose segment 708B between the tractor 54 and the trailer unit 58. The breakaway mitigation system 1004 can releasably connect the first portion 708B1 of spanning fuel hose segment 708B to the second portion 708B2 of spanning fuel hose segment 708B. The breakaway mitigation system 1004 can be coupled with or can include one or more of the fuel management module 1020, the quick connect coupler 1032, a fuel hose management system 1100, and the quick connect coupler 1036. The fuel management module 1020 can be positioned behind or adjacent to a rear wall or a bulkhead of the tractor 54. The fuel hose management system 1100 can be coupled to the rear wall of the tractor 54 in one embodiment.

The first portion 708B1 of spanning fuel hose segment 708B can couple the fuel management module 1020 at one end and at another end to the quick connect coupler 1032. The first portion 708B1 of spanning fuel hose segment 708B can extend from the fuel management module 1020 up or near the rear wall of the tractor 54 connected to a tether 1112 of the fuel hose management system 1100 and down to the quick connect coupler 1032. The positioning of the first portion 708B1 of spanning fuel hose segment 708B can correspond to the location of components of the fuel hose management system 1100. The tether 1112 can be extended or retracted in response to the position of either portion 708B1, 708B2 of the spanning fuel hose segment 708B. The second portion 708B2 of spanning fuel hose segment 708B can couple the quick connect coupler 1032 to the quick connect coupler 1036. The second portion 708B2 of spanning fuel hose segment 708B can extend down and away from the rear wall of the tractor 54. The positioning of the second portion 708B2 of spanning fuel hose segment 708B can correspond to the positioning of the fuel hose management system 1100. For example, the fuel hose management system 1100 can be used to position or angle either portion 708B1, 708B2 of the spanning fuel hose segment 708B.

The fuel hose management system 1100 of the breakaway mitigation system 1004 can include a lower roller guide 1102. The lower roller guide 1102 can be coupled to the rear wall of the tractor 54 or the back of the cab. The first portion 708B1 of spanning fuel hose segment 708B can extend through the lower roller guide 1102. The lower roller guide 1102 can have one or more rollers 1105. The first portion 708B1 of spanning fuel hose segment 708B can extend through an opening of the lower roller guide 1102 over or between one or more of the rollers 1105. In some embodiments, the lower roller guide 1102 is instead used to guide the second portion 708B2 of spanning fuel hose segment 708B, e.g., the second portion 708B2 of spanning fuel hose segment 708B can extend through the lower roller guide 1102. In another embodiment, more than one lower roller guide 1102 can be provided on a rear-facing wall of the tractor 54 to guide one or both of segments of the spanning fuel hose segment 708B, e.g., the first portion 708B1 and the second portion 708B2 of spanning fuel hose segment 708B.

The rollers 1105 can help maintain the positioning of the first portion 708B1, second portion 708B2, or the first portion 708B1 and the second portion 708B2 of spanning fuel hose segment 708B. The lower roller guide 1102 can be positioned between the fuel management module 1020 and the tether 1112 of the fuel hose management system 1100. For example, the first portion 708B1 of spanning fuel hose segment 708B can pass through the lower guide 1102 when extending between the fuel management module 1020 and the tether 1112 of the fuel hose management system 1100. The lower roller guide 1102 can be used to align and position either portion 708B1, 708B2 of the spanning fuel hose segment 708B.

FIGS. 17E-H show the tractor 54 and the trailer unit 58 in first and second angled configurations. The first and second angled configurations can be representative of "jackknifing." In FIGS. 17E and 17F, the trailer unit 58 has angled toward the right side of the tractor 54. The right side of the tractor 54 may be the driver side in some embodiments. In FIGS. 17G and 17H, the trailer unit 58 has angled toward the left side of the tractor 54. The left side of the tractor 54 may be the passenger side in some embodiments. The trailer unit 58 is shown at an almost 90 degree angle as compared to the tractor 54 but any angled position is possible.

Figure 17E:
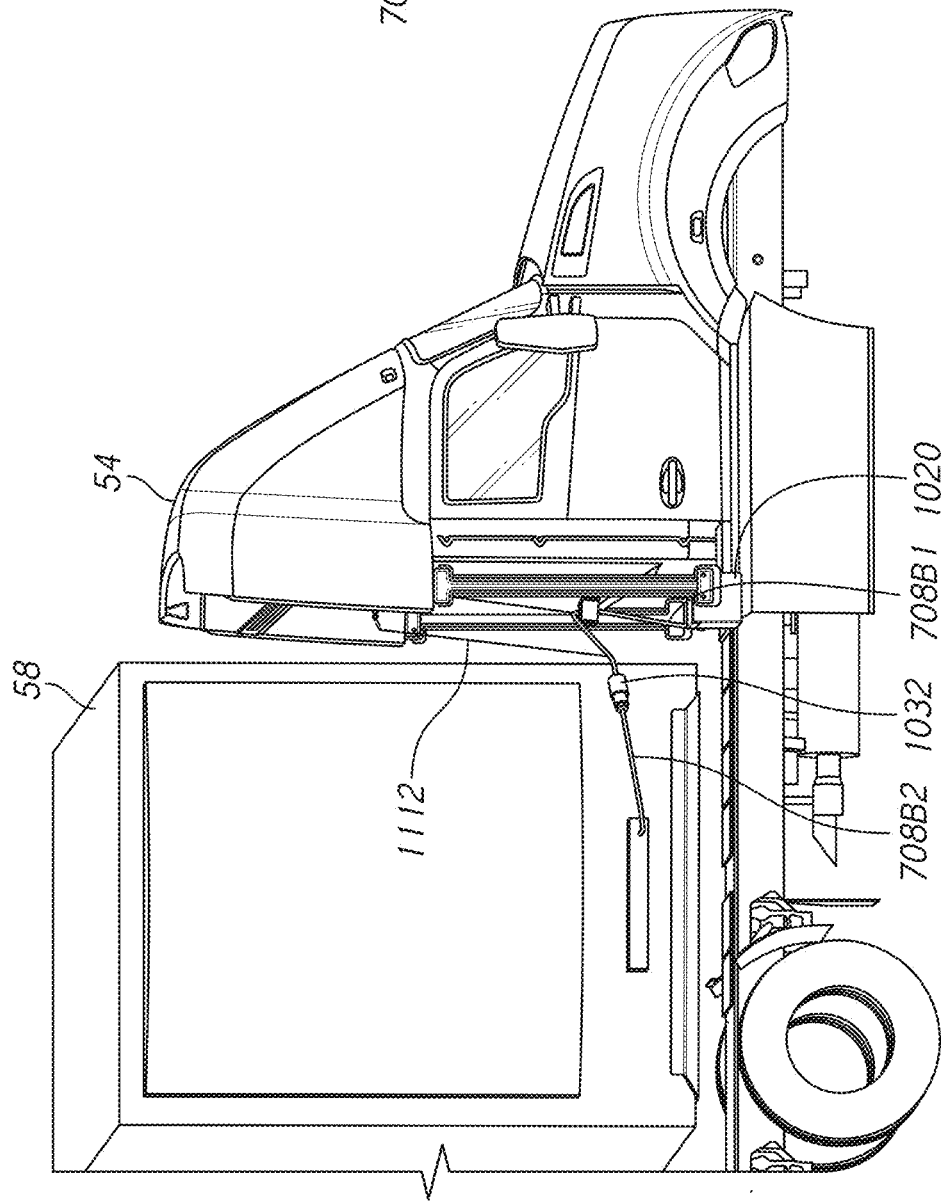

In the event of "jackknifing", the tether 1112 can be extended to allow a change of position for the spanning fuel hose segment 708B. For example, as shown in FIGS. 17E and 17G the first portion 708B1 of spanning fuel hose segment 708B has changed positions to not extend as far up the rear side of the tractor 54. In response to this change of position, the tether 1112 has extended in length.

The fuel hose management system 1100 can prevent the tether 1112 from contacting the trailer unit 58 when the tractor 54 and trailer unit 58 are in any angled configuration.

For example, as shown in FIGS. 17E and 17G, only second portion 708B2 of spanning fuel hose segment 708B contacts the trailer unit 58. This can prevent wear and tear on trailer unit 58 by the tether 1112. The spanning fuel hose segment 708B can be made of a material, such as plastic or rubber, that can cause less wear and tear on the trailer unit 58 than a cable or cord.

When the trailer unit 58 is re-aligned with the tractor 54 the tether 1112 is retracted pulling the first portion 708B1 of spanning fuel hose segment 708B upward from the lower roller guide 1102 along the back wall of the cab of the tractor 54.

Figure 18E:
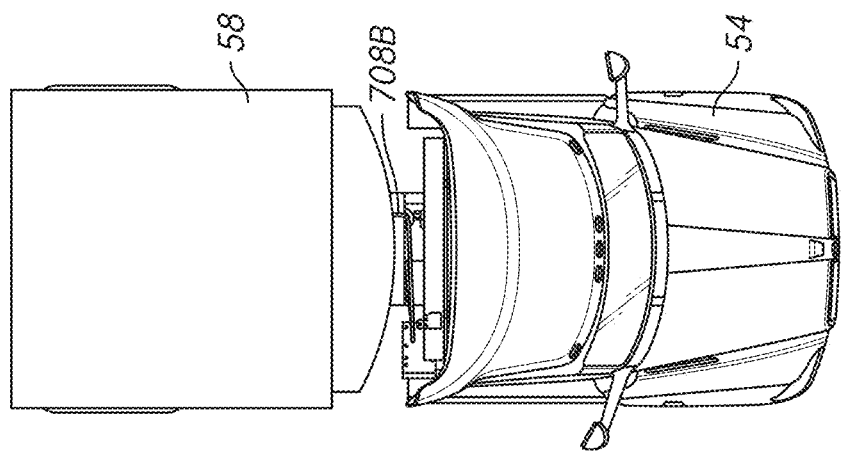
Figure 18D:
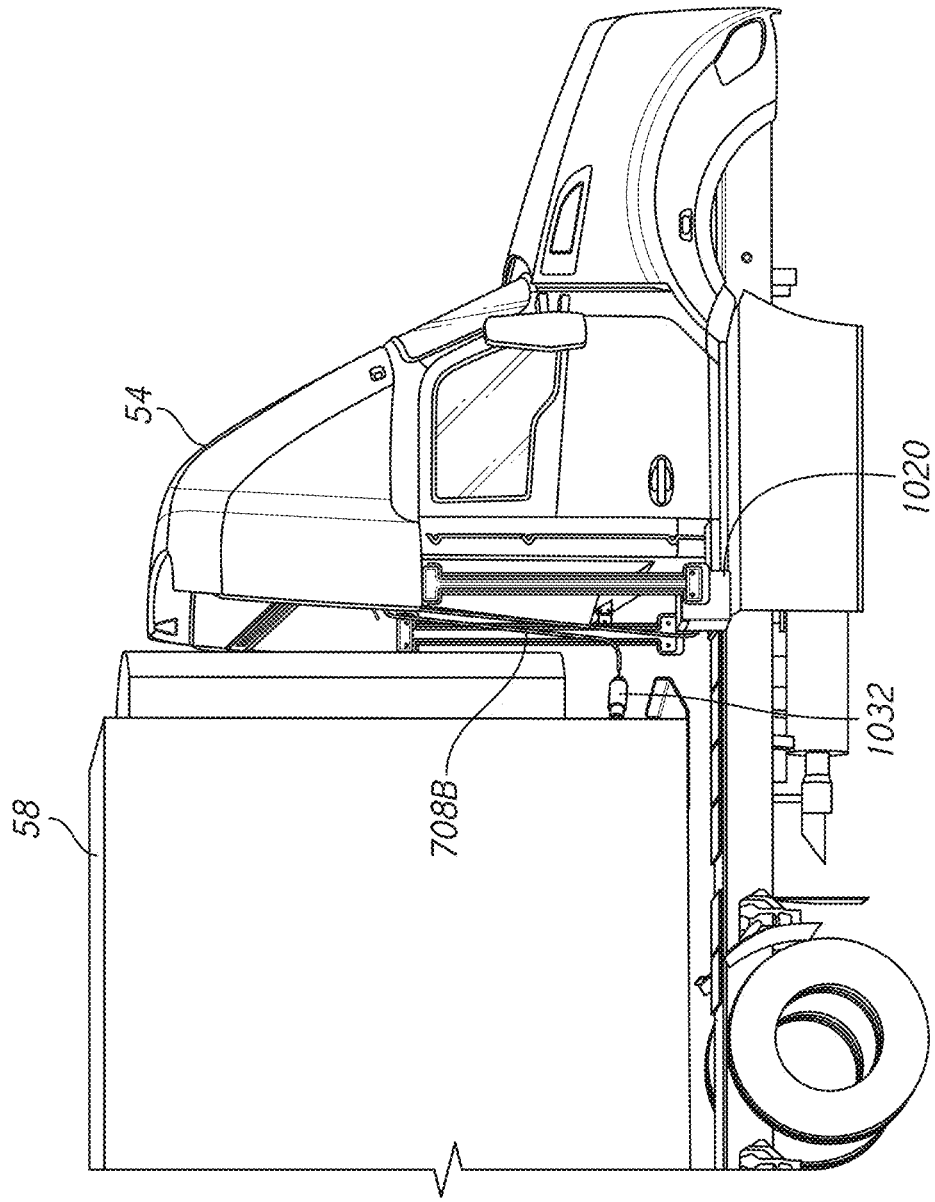
Figure 18G:
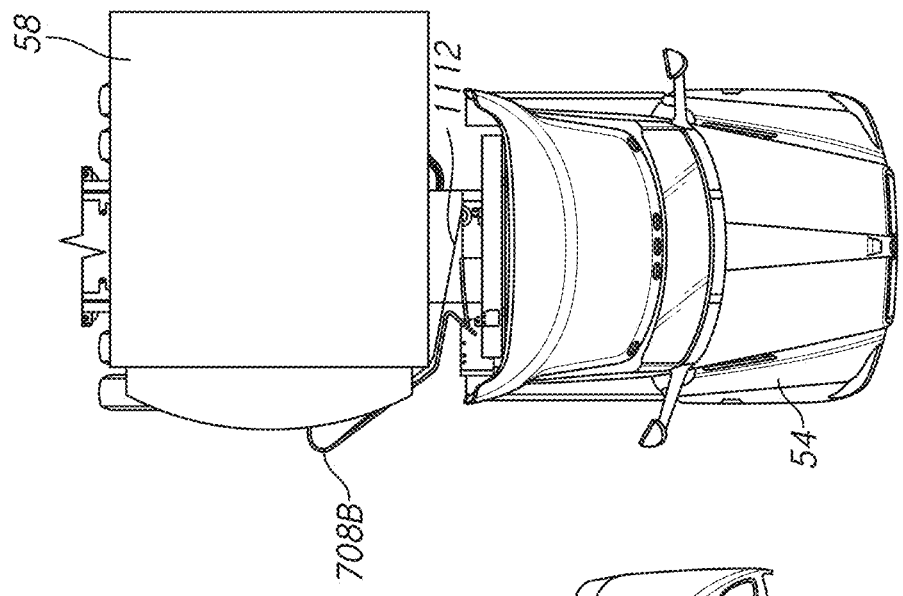
Figure 18F:
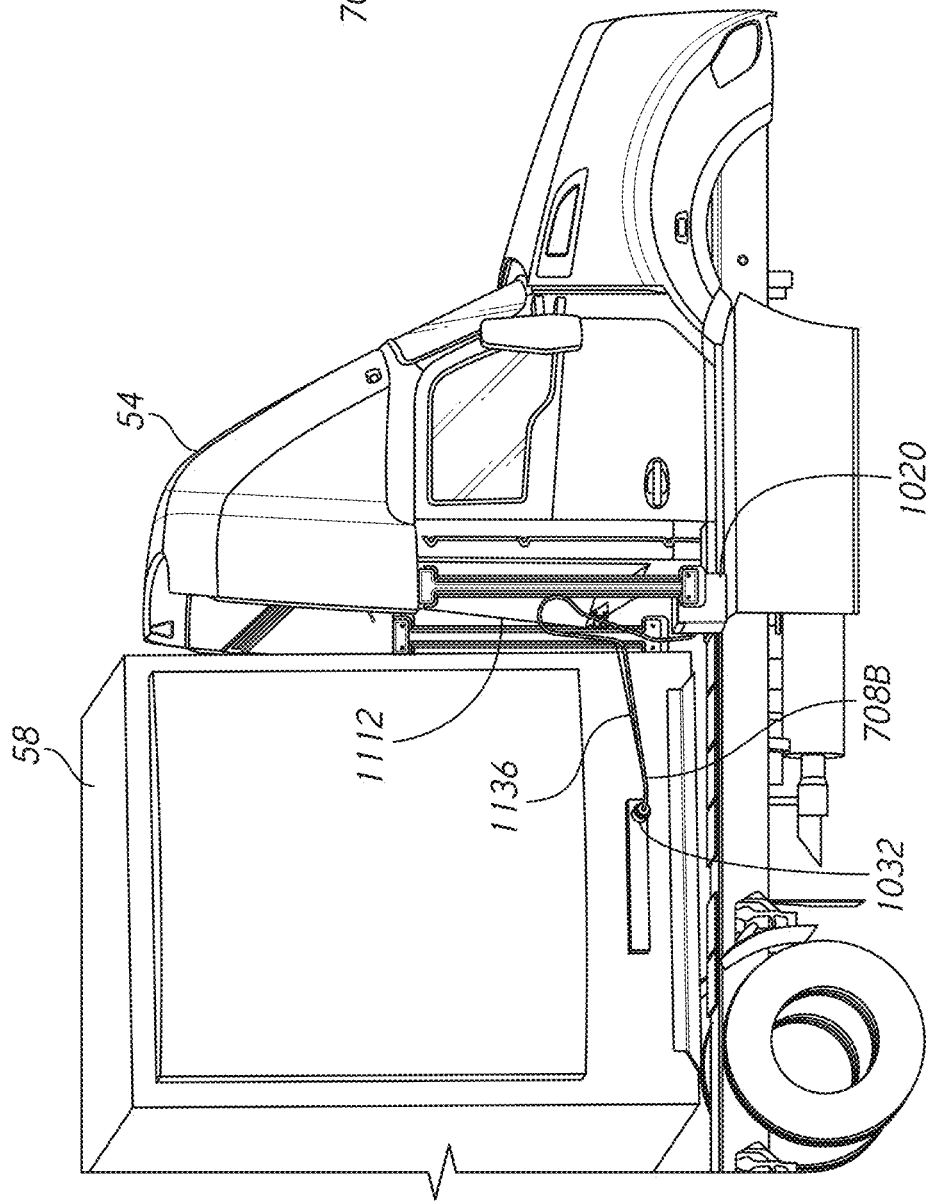
Figure 18H:
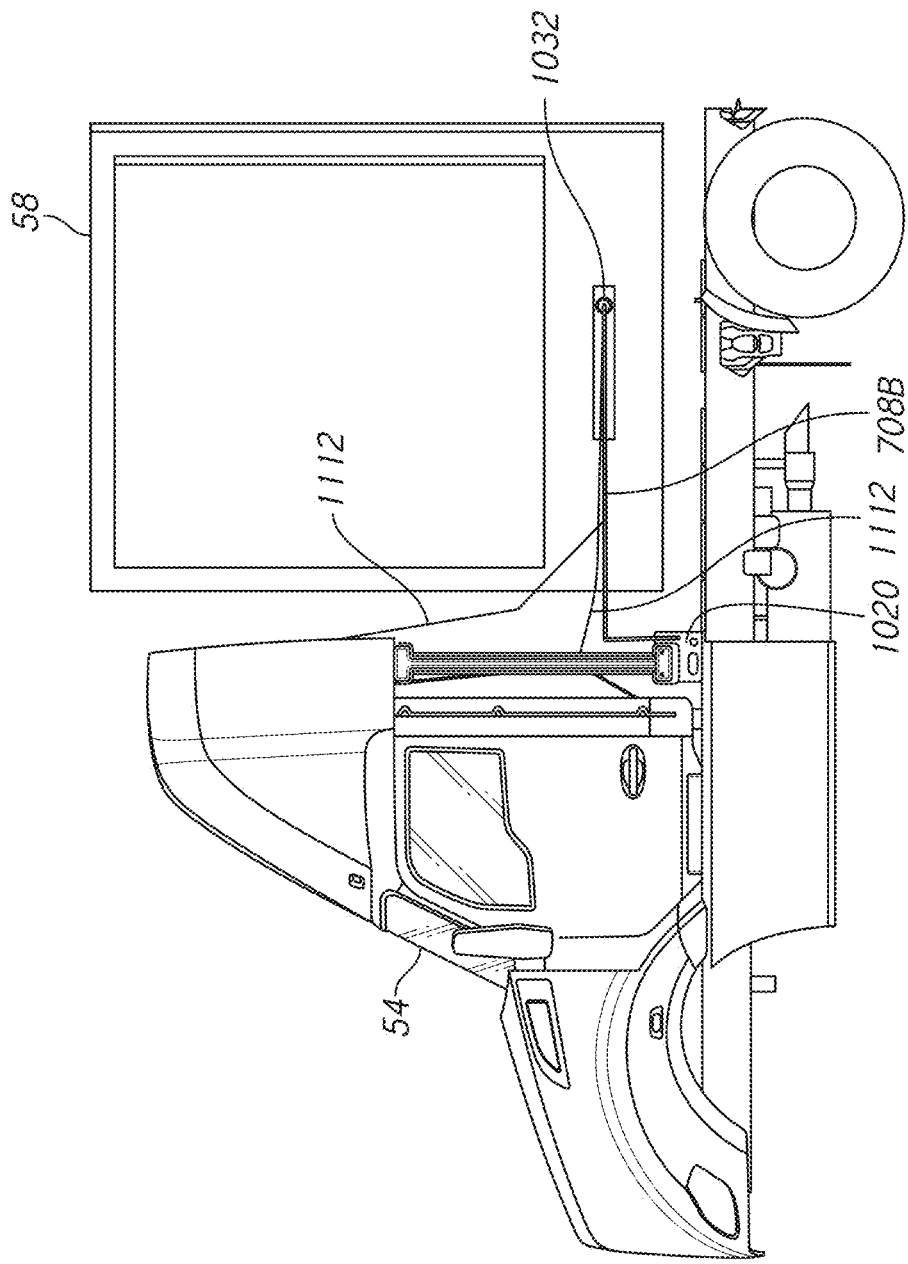
Figure 18I:
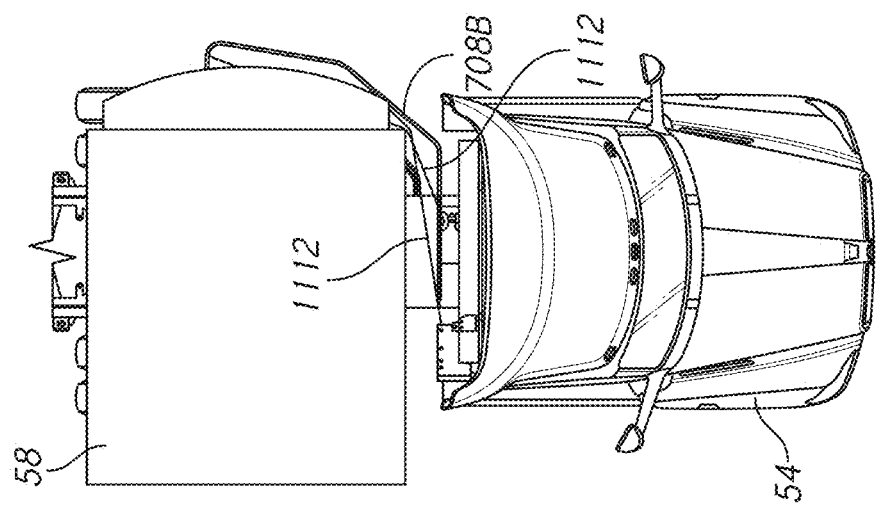

FIGS. 18-18I show another embodiment of a breakaway mitigation system coupled with the tractor 54 and the trailer unit 58. The fuel hose management system 1100 can be coupled to an upper portion of the rear wall of the tractor 54 and off to a side or off center. A lower guide 1103 can be coupled to a lower portion of the rear wall of the tractor 54 on a side or off center position that can be opposite the location of the fuel hose management system 1100. The relationship between the position of the fuel hose management system 1100 and the lower guide 1103 can allow the spanning fuel hose segment 708B to extend diagonally across the rear wall of the tractor 54. For example, depending on the required or preferred location of the spanning fuel hose segment 708B, the location of the fuel hose management system 1100 and/or the location of the lower guide 1103 can be altered.

The fuel hose management system 1100 can have a tether 1112 that is connected to the spanning fuel hose segment 708B. The lower guide 1103 can have a tether 1112 that is connected to the spanning fuel hose segment 708B. The tethers 1112 can assist in maintaining the position of the spanning fuel hose segment 708B. One or both of the tethers 1112 can be used.

In some embodiments, the breakaway mitigation system can exclude a second portion of spanning fuel hose segment (e.g., second portion 708B2 of spanning fuel hose segment 708B), for example, as shown in FIGS. 18-18I. The spanning fuel hose segment 708B can extend from the fuel management module 1020 to the quick connect coupler 1032. The quick connect coupler 1032 can be coupled to the quick connect coupler 1036. The quick connect coupler 1036 can be coupled to the trailer unit 58 or a component (e.g., fuel module 1008) that is coupled to the trailer unit 58.

FIGS. 18F-18I show the tractor 54 and the trailer unit 58 in first and second angled configurations. The first and second angled configurations can be representative of "jackknifing" similar to the configurations of FIGS. 17E-H.

When the tractor 54 and the trailer unit 58 are in angled configurations, the position of the spanning fuel hose segment 708B can change. In response to the change in position, the tethers 1112 may extend or retract. A first or lower tether 1112 can extend generally horizontally from the lower guide 1103. A second or upper tether 1112 can extend from the fuel hose management system 1100. In the extended position of the tethers 1112, the first or lower tether 1112 can be spooled out generally horizontally from the position of the lower guide 1103 and the second or upper tether 1112 can be spooled out diagonally downwardly from the position of the fuel hose management system 1100.

The fuel hose management system 1100 and/or the lower guide 1103 can prevent the tethers 1112 from contacting the trailer unit 58 when the tractor 54 and trailer unit 58 are in any angled configuration. For example, only the spanning fuel hose segment 708B can contact the trailer unit 58. This can prevent wear and tear on trailer unit 58 by the tethers 1112. The spanning fuel hose segment 708B can be made of a material, such as plastic or rubber, that can cause less wear and tear on the trailer unit 58 than a cable or cord.

Figure 19:
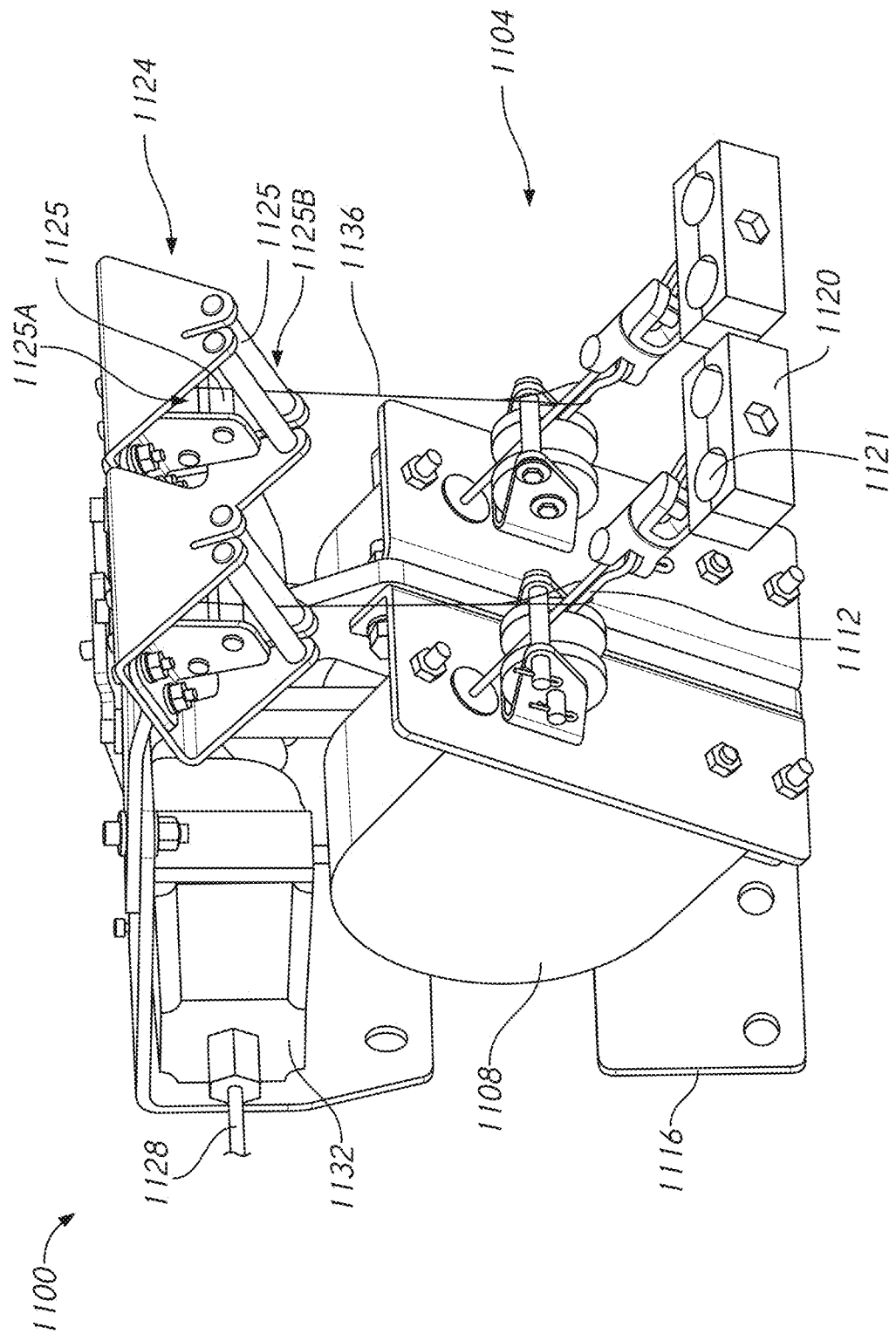
FIGS. 19-20B show details of embodiments of fuel hose management systems.

FIG. 19 shows an example embodiment of a fuel hose management system 1100 that can be used with any breakaway mitigation system or vehicle fuel system described herein. The fuel hose management system 1100 can include an extendable tether assembly 1104, a spool assembly 1108, at least one tether 1112, and at least one extendable support cable 1136. The fuel hose management system 1100 also can include at least one bracket 1116 and at least one fuel hose holder 1120. The fuel hose management system 1100 can include one or more roller guides or a roller assembly 1124. While FIG. 19 shows an example embodiment including two of many elements, for example two spool assemblies 1108, the fuel hose management system 1100 does not require two of each element and can in some cases have more than two, e.g., three, four, five, six, more than six or in a class of embodiments multiples of two of some or all of the components.

The spool assembly 1108 can store an unextended length of the tether 1112. The tether 1112 can be extendable by unwinding a portion from its stored position in the spool assembly 1108. For example, in the event of a breakaway, rollover, or jackknife, or other separation incident, the tether 1112 can extend to account for the change in positions of the fuel hoses (e.g., spanning fuel hose segments 708B1, 708B2). The fuel hose holder 1120 can be coupled to the end of the tether 1112. The fuel hose holder 1120 can be configured to hold or couple a fuel hose segment (e.g., spanning fuel hose segments 708B1, 708B2) to the tether 1112. The fuel hose holder 1120 can have an opening 1121 that the fuel hose segment can extend through. The fuel hose holder 1120 can be configured to cinch or clamp to a fuel hose segment (e.g., the first portion 708B1, 708B2). In one embodiment the fuel hose holder 1120 is a two part assembly in which each of the two parts includes a portion, e.g., one-half, of the opening 1121. The two parts can be separated from each other to allow the spanning fuel hose segment 708B (or portion thereof) to be placed between the two portions of the opening 1121. The two parts of the fuel hose holder 1120 can be brought together (cinched or clamped) to close the opening 1121 around the spanning fuel hose segment 708B (or portion thereof).

The extendable support cable 1136 can be coupled at a first end to the tether 1112. In one embodiment, the extendable support cable 1136 has an end portion that loops around the tether 1112 and that is secured to retain the tether 1112 such that a vertical load can be applied by the extendable support cable 1136 to the tether 1112. The loop, if provided may allow the tether 1112 to slide therethrough as one or both of the tether 1112 and the extendable support cable 1136 are extended and retracted. The extendable support cable 1136 can be coupled at a second end or along a length thereof to the roller guide 1124. The roller guide 1124 can include rollers 1125. In some embodiments, two pairs of rollers 1125 can be used. The first set of rollers 1125a can be positioned generally perpendicular to the second set of rollers 1125b. Each set of rollers 1125a, 1125b can have a space between the individual rollers 1125. The extendable support cable 1136 can extend through each set of rollers 1125a, 1125b. The roller guide 1124 can be used to help maintain and control the position of the tethers 1112 and therefor also the positioning of the fuel hose segments (e.g., spanning fuel hose segments 708B1, 708B2). For example, as the fuel hose segment that is coupled to the fuel hose holder 1120 begins to change position, the tether 1112 can extend from the spool assembly 1108. As the tether 1112 extends, the extendable support cable 1136 can extend to account for the change in position. The roller guide 1124 can help limit and control the degree and/or direction the extendable support cable 1136 and the tether 1112 move relative to their original position. The roller guide 1124 can limit movement of the extendable support cable 1136 away from a central vertical plane of the tractor. For example, the movement away from a central vertical plane of the truck can be limited to less than 10 degrees, less than 15 degrees, less than 20 degrees, less than 25 degrees, or more. The extendable support cable 1136 can apply a vertical load to the tether 1112 to provide a space between or reduce the load between the spanning fuel hose segment (e.g., segments 708B1, 708B2) and the tractor or trailer unit in the event of a jackknife, separation, rollover, or breakaway or other accident or incident.

The fuel hose management system 1100 can include a sensor 1128. The sensor 1128 can be used to monitor the extension of the tether 1112 and/or the extendable support cable 1136. The sensor 1128 can provide a signal indicative of the amount by which the spool assembly 1108 has unwound the tether 1112 and/or the extendable support cable 1136. The sensor 1128 can be coupled with the tractor 54 in one embodiment. The sensor 1128 can comprise an encoder that provides a signal indicative of increments of extension of the tether 1112 and/or the extendable support cable 1136. The sensor 1128 can communicate with a controller by a wire connection or wirelessly. In some variations, the sensor 1128 comprises a potentiometer 1132. The sensor 1128 can output a signal to a controller configured to actuate a valve to prevent or reduce flow of high pressure gas from a fuel tank of a fuel module (e.g., fuel module 1008). In some variations, the sensor 1128 includes a camera. The position and functional use of the sensor 1128 can incorporate that of the sensor 632. The descriptions of the sensor 632 are incorporated into the disclosure of the sensor 1128.

The fuel hose management system 1100 can be coupled to a tractor (e.g., tractor 54) via the at least one bracket 1116. The at least one bracket 1116 can be coupled to the rear wall of the tractor 54. The location of the fuel hose management system 1100 on the rear of the tractor 54 can correspond to the required positions of the fuel hose segments (e.g., spanning fuel hose segments 708B1, 708B2). For example, in some embodiments the fuel hose management system 1100 can be positioned centrally on the rear wall of the tractor 54. In some embodiments the fuel hose management system 1100 can be positioned closer to either side of the rear wall of the tractor 54. In some embodiments, the fuel hose management system 1100 can be positioned closer to the top or the bottom of the tractor 54.

Figure 20A:
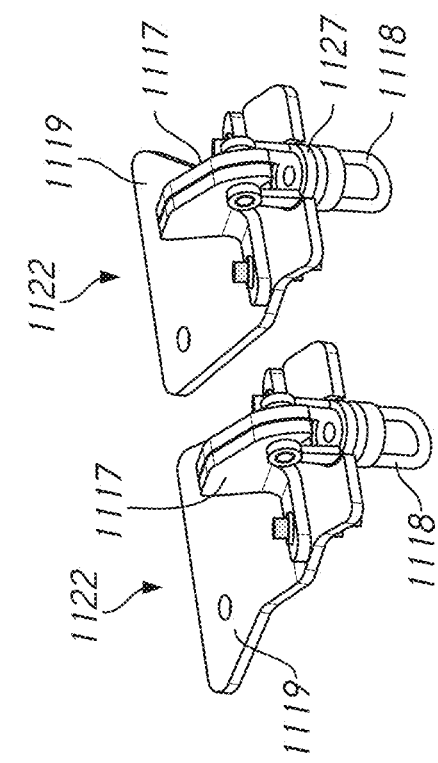
Figure 20B:
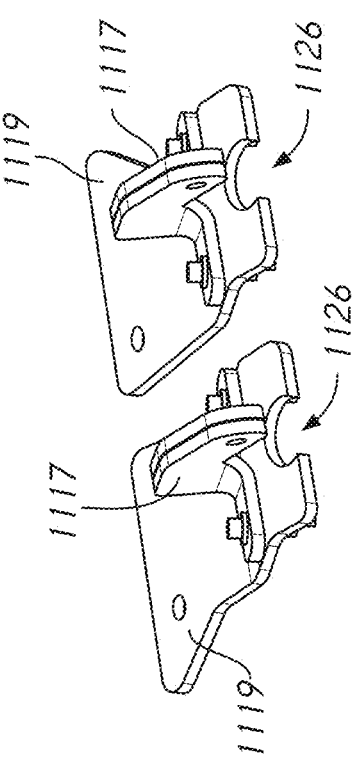
Figure 20:
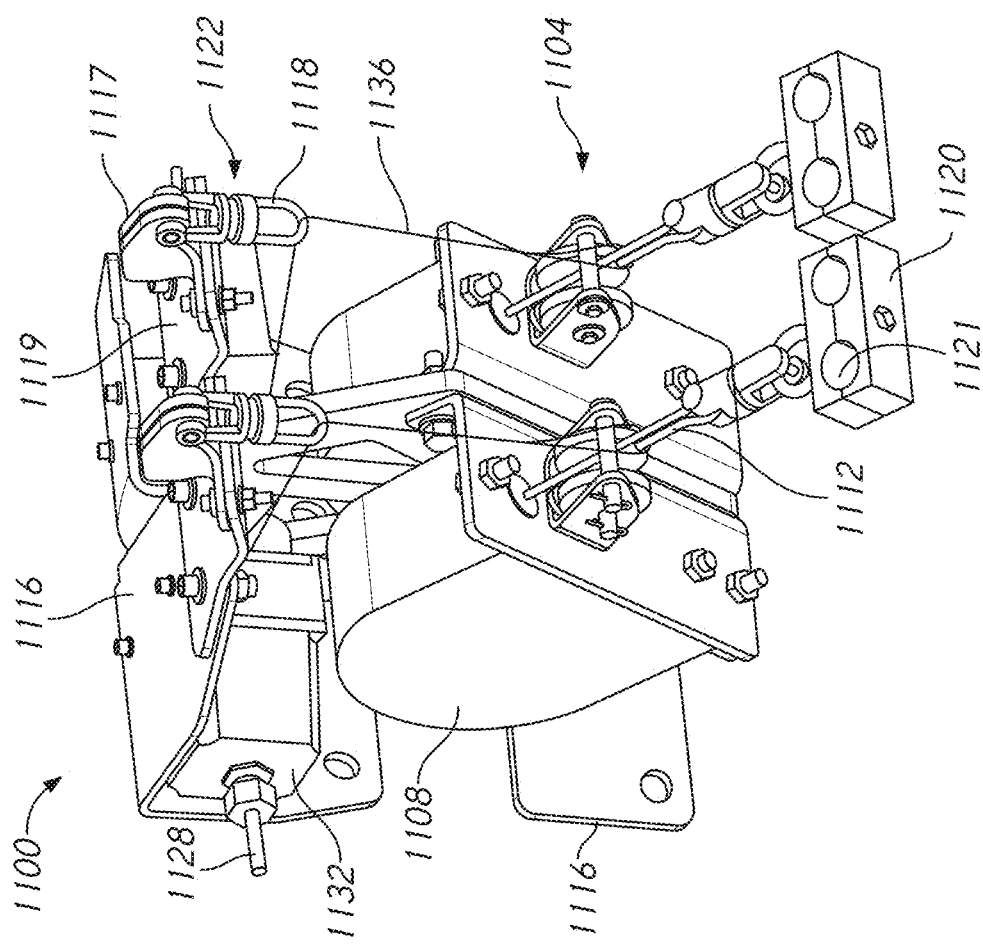

FIGS. 20-20B show an additional example embodiment of a fuel hose management system 1100 that can be used with any breakaway detection system, breakaway mitigation system, or vehicle fuel system described herein.

The fuel hose management system 1100 can include one or more eyelet guides 1122. The extendable support cable 1136 can extend through the eyelet guide 1122 to the tether 1112. The eyelet guide 1122 can be coupled to the bracket 1116 via an extension bracket 1119. The eyelet guide 1122 can have an enclosed opening 1118. The extendable cable guide 1136 can extend through the enclosed opening 1118. The eyelet guide 1122 can assist in maintaining the position of the corresponding tether 1112, which can assist in maintaining the position of the corresponding fuel hose segment (e.g., spanning fuel hose segments 708B1, 708B2). The enclosed opening 1118 of the eyelet guide 1122 can hang or extend from a connector 1117. The connector 1117 can be coupled to the enclosed opening 1118 and the extension bracket 1119.

The extension bracket 1119 can include a cutout 1126. The cutout 1126 can correspond in size and shape to the eyelet guide 1122. FIG. 20B shows the extension bracket 1119 with the eyelet guide 1122 removed. The eyelet guide 1122 can have an indentation 1127 that can correspond in height with the thickness of the extension bracket 1119. The indentation 1127 and the thickness of the extension bracket 1119 can work together to maintain the position of the eyelet guide 1122.

Figure 21F:
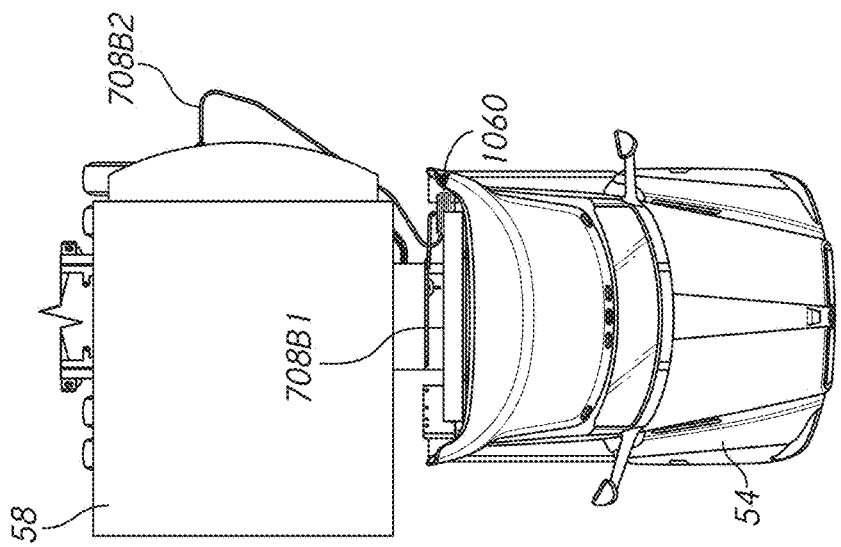
FIGS. 21-21F show another variation of the vehicle fuel system seen in FIGS. 17-17H.

FIGS. 21-21F show another embodiment of a vehicle fuel system. The vehicle fuel system can include a hose spool assembly 1060. The hose spool assembly 1060 can be mounted at or near the rear of the tractor 54. The hose spool assembly 1060 can be used to store, maintain, organize, etc. the spanning fuel hose segment 708B.

Figure 21E:
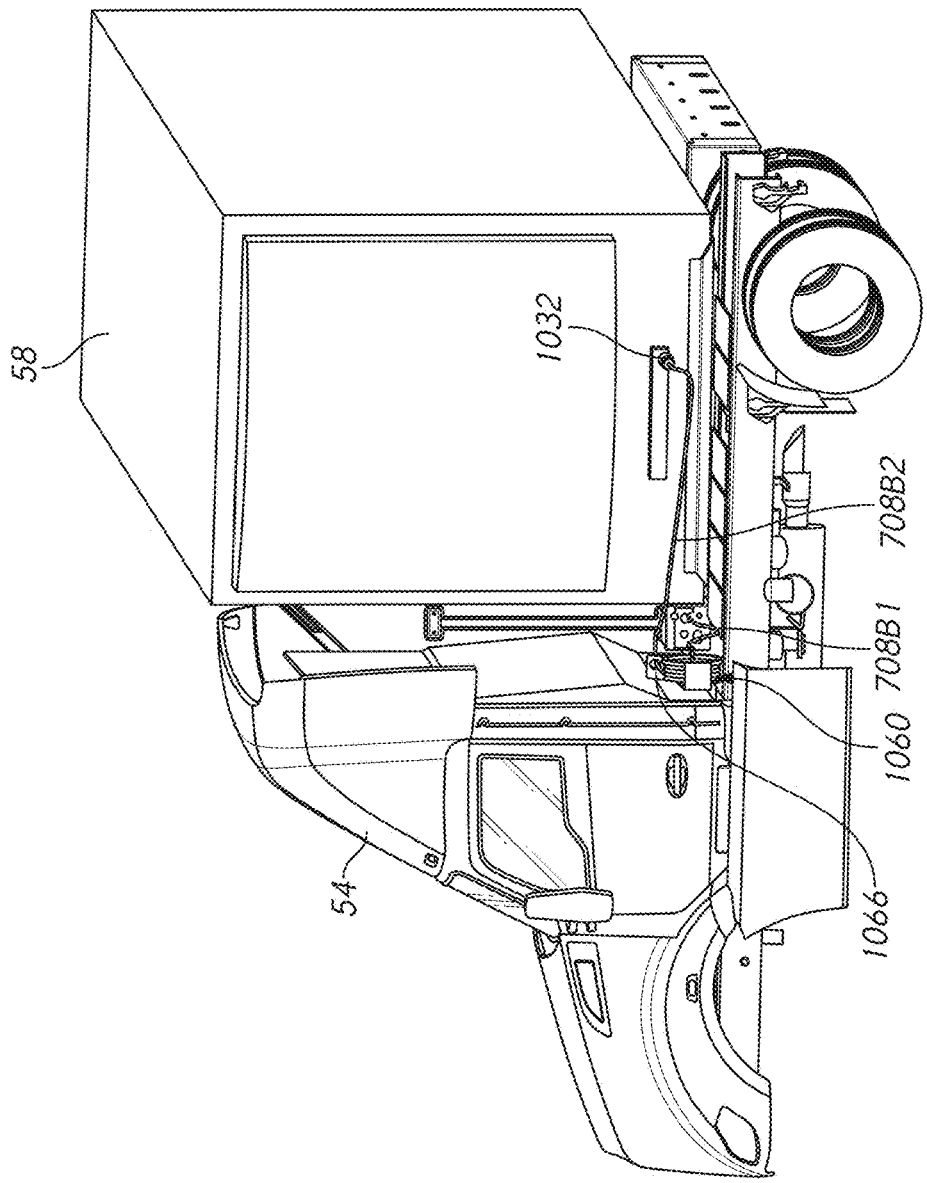

The vehicle fuel system can include the fuel management module 1020. The fuel management module 1020 can be positioned behind the rear of the tractor 54. The first portion 708B1 of spanning fuel hose segment 708B can be coupled at a first end to the fuel management module 1020. The first portion 708B1 of spanning fuel hose segment 708B can be coupled at a second end the hose spool assembly 1060. The second portion 708B2 of spanning fuel hose segment 708B can be coupled at a first end to the hose spool assembly 1060. The second portion 708B2 of spanning fuel hose segment 708B can be coupled at a second end to the quick connect coupler 1032. The quick connect coupler 1032 can be coupled to a second quick connect coupler 1036. The second quick connect coupler 1036 can be coupled to the trailer unit 58. The hose spool assembly 1060 can be coupled to the rear side of the tractor 54 via brackets 1063. In some embodiments, the bracket 1063 can have an extension with an opening 1066. FIG. 21A shows nothing disposed in the opening 1066 for clarity of illustrating the structure. However, the second portion 708B2 of spanning fuel hose segment 708B can extend through the opening 1066 to the spool 1061 as seen in FIG. 21E. The opening 1066 can assist in maintaining the proper positioning of the second portion 708B2 of spanning fuel hose segment 708B.

The hose spool assembly 1060 can include a spool 1061. The spool 1061 can have side walls 1064 that create an open interior 1065. The first portion 708B1 of spanning fuel hose segment 708B and/or the second portion 708B2 of spanning fuel hose segment 708B can be at least partially stored in the open interior 1065. The fuel hose segments 708B1, 708B2 can be wrapped around the spool 1061 and rest in the open interior 1065. The first portion 708B1 of spanning fuel hose segment 708B can extend from the fuel management module 1020 to the center wall 1062 of the hose spool assembly 1060. The first portion 708B1 of spanning fuel hose segment 708B can be coupled to an outward facing side of the center wall 1062. The second portion 708B2 of spanning fuel hose segment 708B can be coupled to an inner portion, e.g., to an inward facing side of the center wall 1062 opposite the first portion 708B1 of spanning fuel hose segment 708B. In some embodiments, only the second portion 708B2 of spanning fuel hose segment 708B is stored in the open interior 1065 of the hose spool assembly 1060.

FIGS. 21C-21F show the tractor 54 and the trailer unit 58 in first and second angled configurations. The first and second angled configurations can be representative of "jack-knifing" similar to the configurations of FIGS. 17E-H and 18F-I described herein. The hose spool assembly 1060 can assist the second portion 708B2 of spanning fuel hose segment 708B in extending when the tractor 54 and trailer unit 58 transition to an angled configuration. The second portion 708B2 of spanning fuel hose segment 708B will be able to unwind around the open interior 1065 of the spool 1061. In some embodiments, the length of the first portion 708B1 of spanning fuel hose segment 708B can remain fixed. The second portion 708B2 of spanning fuel hose segment 708B can be configured to extend the necessary length depending on the degree of the angled configuration. For example, depending on the direction the trailer unit 58 has turned or angled and the extent of the turn or angle can impact the length of the second portion 708B2 of spanning fuel hose segment 708B needed to unwind from the hose spool assembly 1060. As a breakaway, jackknifing situation, or similar incident begins to occur the second portion 708B2 of spanning fuel hose segment 708B can begin to unwind as needed to account for the required extended length. In some embodiments, the first portion 708B1 of spanning fuel hose segment 708B can be stored in the hose spool assembly 1060 and unwind as needed, similar to the second portion 708B2 of spanning fuel hose segment 708B. In some embodiments, the spanning fuel hose segment 708B can be a single portion that can be stored and unwound from the hose spool assembly 1060.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A breakaway mitigation system, comprising:
a fuel module configured to be supported on a trailer unit of a truck, the fuel module including a high pressure gas fuel tank;
a fuel hose configured to be fluidly coupled to the fuel module and to extend from the trailer unit to a tractor; and
a fuel hose management system configured to at least partially support the fuel hose away from the tractor or the trailer unit and to extend at least a portion of a length of the fuel hose away from a rear wall of a tractor to accommodate a greater separation of the trailer unit from the tractor, the fuel hose management system including a tether configured to be secured to the fuel hose and to be extended to extend the portion of the length of the fuel hose away from the tractor in the event of an accident.

2. The breakaway mitigation system of claim 1, wherein the fuel hose management system includes an extendable support cable disposed over the tether to apply a vertical load to the tether to provide a space between or reduce a load between the fuel hose and the truck in the event of an accident.

3. The breakaway mitigation system of claim 2, wherein the fuel hose management system includes a roller assembly comprising a roller configured to control an orientation of the extendable support cable.

4. The breakaway mitigation system of claim 3, wherein the roller assembly limits movement of the extendable support cable in directions away from a central vertical plane of the truck to less than 25 degrees.

5. The breakaway mitigation system of claim 3, wherein the roller assembly is configured to maintain space between the extendable support cable and edges of the trailer unit in the event of an accident.

6. The breakaway mitigation system of claim 1, further comprising a hose spool assembly comprising a spool configured to wind a portion of fuel hose therearound and to allow extension of the portion from the spool and a bracket having an opening for guiding the fuel hose therethrough.

7. The breakaway mitigation system of claim 1, further comprising a first coupler configured to be secured to the tractor and a second coupler configured to be secured to the trailer unit, the fuel hose disposed between the first coupler and the second coupler.

8. The breakaway mitigation system of claim 7, further comprising a quick connect coupler configured to be disposed within the fuel hose to connect a first portion of the fuel hose to a second portion of the fuel hose, the first portion of the fuel hose disposed between the first coupler and the quick connect coupler and the second portion of the fuel hose disposed between the second coupler and the quick connect coupler.

9. The breakaway mitigation system of claim 7, further comprising a quick connect coupler configured to be disposed within the fuel hose to connect a first portion of the fuel hose to a second portion of the fuel hose.

10. The breakaway mitigation system of claim 1, wherein the high pressure gas fuel tank is configured to store hydrogen.

11. The breakaway mitigation system of claim 1, wherein the high pressure gas fuel tank is configured to store compressed natural gas.

12. A breakaway mitigation system, comprising:
- a fuel module configured to be supported on a trailer unit of a truck, the fuel module including a high pressure gas fuel tank;
- a fuel hose configured to be fluidly coupled to the fuel module and to extend from the trailer unit to a tractor;
- a fuel hose management system configured to at least partially support the fuel hose away from the tractor or the trailer unit, and extend at least a portion of a length of the fuel hose away from a rear wall of a tractor to accommodate a greater separation of the trailer unit from the tractor; and
- a sensor configured to detect an amount of extension of the fuel hose and to implement a mitigation in the event of an accident.

13. The breakaway mitigation system of claim 12, wherein the sensor outputs a signal to a controller configured to actuate a valve to prevent or reduce flow of high pressure gas from a fuel tank of the fuel module.

14. The breakaway mitigation system of claim 12, wherein the fuel hose management system comprises a tether configured to be secured to the fuel hose and to be extended to extend the portion of the length of the fuel hose away from the tractor in the event of an accident.

15. The breakaway mitigation system of claim 14, wherein the sensor detects the amount of extension of the fuel hose based on an amount of extension of the tether from a spool body coupled to the tether.

16. The breakaway mitigation system of claim 15, wherein the sensor comprises an encoder configured to provide a signal corresponding to the amount of extension of the tether.

17. The breakaway mitigation system of claim 12, wherein the sensor is coupled with the tractor.

18. The breakaway mitigation system of claim 12, wherein the sensor is coupled with the trailer unit.

19. The breakaway mitigation system of claim 12, further comprising a controller configured to compare the amount of extension of the fuel hose to one or more threshold values to determine whether to implement the mitigation.

20. The breakaway mitigation system of claim 19, wherein the one or more threshold values include a breakaway threshold value corresponding to a breakaway event and an alarm threshold value that is less than the breakaway threshold value.

21. A breakaway mitigation system, comprising:
- a fuel module configured to be supported on a trailer unit of a truck, the fuel module including a high pressure gas fuel tank;
- a fuel hose configured to be fluidly coupled to the fuel module and to extend from the trailer unit to a tractor;
- a fuel hose management system configured to at least partially support the fuel hose away from the tractor or the trailer unit, the fuel hose management system configured to extend at least a portion of a length of the fuel hose away from a rear wall of a tractor to accommodate a greater separation of the trailer unit from the tractor;
- a first coupler configured to be secured to the tractor;
- a second coupler configured to be secured to the trailer unit, the fuel hose disposed between the first coupler and the second coupler; and
- a quick connect coupler configured to be disposed within the fuel hose to connect a first portion of the fuel hose to a second portion of the fuel hose,
wherein at least one of the first coupler, the second coupler, and the quick connect coupler is configured to allow the fuel hose to detach therefrom upon application of a load above a threshold in the event of an accident.

22. The breakaway mitigation system of claim 21, wherein the threshold is above 50 pounds.

23. The breakaway mitigation system of claim 21, wherein the threshold is between 50 pounds and 1000 pounds.

24. The breakaway mitigation system of claim 21, further comprising a pressure release device configured to reduce pressure in the fuel hose when the at least one of the first coupler, the second coupler, and the quick connect coupler are detached.

25. The breakaway mitigation system of claim 21, wherein the second coupler is coupled to a shut off valve and an excess flow valve, the excess flow valve configured to provide for venting, and the shut off valve configured to close in the event of an accident.

26. A breakaway mitigation system, comprising:
- a fuel module configured to be supported on a trailer unit of a truck, the fuel module including a high pressure gas fuel tank;
- a fuel hose configured to be fluidly coupled to the fuel module and to extend from the trailer unit to a tractor;
- a fuel hose management system configured to at least partially support the fuel hose away from the tractor or the trailer unit, the fuel hose management system configured to extend at least a portion of a length of the fuel hose away from a rear wall of a tractor to accommodate a greater separation of the trailer unit from the tractor;
- a first coupler configured to be secured to the tractor;
- a second coupler configured to be secured to the trailer unit, the fuel hose disposed between the first coupler and the second coupler; and
- a fuel management module configured to be mounted to the trailer unit, the fuel management module comprising the second coupler and a port for providing fluid communication between the fuel hose connected to the second coupler and a fuel tank of the fuel module.

27. The breakaway mitigation system of claim 26, further comprising a trailer side fuel hose segment having a first end fluidly coupled to the port of the fuel module and a second end fluidly coupled to a tank of the fuel module.

28. The breakaway mitigation system of claim 27, further comprising a fuel management module configured to be mounted to the tractor, the fuel management module comprising a fueling port on an outboard side and the first coupler on an inboard side.

* * * * *